US010423567B2

(12) United States Patent
Khan et al.

(10) Patent No.: US 10,423,567 B2
(45) Date of Patent: Sep. 24, 2019

(54) UNIDIRECTIONAL CLOCK SIGNALING IN A HIGH-SPEED SERIAL LINK

(71) Applicant: QUALCOMM Incorporated, San Diego, CA (US)

(72) Inventors: Raheel Khan, Tustin, CA (US); Scott Cheng, Foothill Ranch, CA (US); Pascal Philippe, Laguna Hills, CA (US); Joaquin Romera, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/422,263

(22) Filed: Feb. 1, 2017

(65) Prior Publication Data

US 2017/0220517 A1 Aug. 3, 2017

Related U.S. Application Data

(60) Provisional application No. 62/373,246, filed on Aug. 10, 2016, provisional application No. 62/290,309, (Continued)

(51) Int. Cl.
H04L 12/931 (2013.01)
G06F 13/42 (2006.01)
(Continued)

(52) U.S. Cl.
CPC ........... *G06F 13/4291* (2013.01); *G06F 9/00* (2013.01); *G06F 13/364* (2013.01); *H04B 1/40* (2013.01);
(Continued)

(58) Field of Classification Search
None
See application file for complete search history.

(56) References Cited

U.S. PATENT DOCUMENTS 5,237,322 A * 8/1993 Heberle ............... H04L 12/4135
340/870.13
5,602,843 A  2/1997 Gray
(Continued)

FOREIGN PATENT DOCUMENTS

CN 1998144 A 7/2007
CN 102141969 A 8/2011
(Continued)

OTHER PUBLICATIONS

Fogg A., "DigRF Baseband/RF Digital Interface Speci Fication", Internet Citation, Feb. 20, 2004 (Feb. 20, 2004), XP002325710, Retrieved from the Internet: URL: http://146.101.169.51/DigRF%20Standard%20v112.pdf [retrieved on Feb. 20, 2004].
(Continued)

Primary Examiner — Elias Mamo
(74) Attorney, Agent, or Firm — Arent Fox, LLP

(57) ABSTRACT

Transmission of data over a serial link based on a unidirectional clock signal is provided. A unidirectional clock signal is generated based on a first clock of a master device. The unidirectional clock signal is sent to a slave device that is connected to the serial link. The master device transmits data to the slave device over the serial link based on the first clock. The slave device receives the unidirectional clock signal from a master device. The slave device transmits data over the serial link to the master device based on the unidirectional clock signal.

20 Claims, 42 Drawing Sheets

Related U.S. Application Data filed on Feb. 2, 2016, provisional application No. 62/290,357, filed on Feb. 2, 2016, provisional application No. 62/289,874, filed on Feb. 1, 2016.

(51) Int. Cl.
| | |
|---|---|
| G06F 13/364 | (2006.01) |
| G06F 9/00 | (2006.01) |
| H04B 1/40 | (2015.01) |
| H04L 7/00 | (2006.01) |
| H04L 29/06 | (2006.01) |
| H04L 29/08 | (2006.01) |
| H04L 7/04 | (2006.01) |

(52) U.S. Cl.
CPC .......... *H04L 7/0008* (2013.01); *H04L 29/06* (2013.01); *H04L 49/35* (2013.01); *H04L 67/2823* (2013.01); *H04L 69/00* (2013.01); *H04L 69/22* (2013.01); *H04L 7/046* (2013.01)

(56) References Cited

U.S. PATENT DOCUMENTS

| | | |
|---|---|---|
| 6,535,926 B1 | 3/2003 | Esker |
| 6,772,251 B1 | 8/2004 | Hastings et al. |
| 6,977,960 B2 | 12/2005 | Takinosawa |
| 7,089,379 B1 * | 8/2006 | Sharma .............. G06F 12/0607 |
| | | 365/230.03 |
| 7,111,208 B2 | 9/2006 | Hoang et al. |
| 7,142,557 B2 | 11/2006 | Dhir et al. |
| 7,275,195 B2 | 9/2007 | Martinez |
| 7,343,535 B2 | 3/2008 | Lai et al. |
| 7,363,563 B1 | 4/2008 | Hissen et al. |
| 7,953,162 B2 | 5/2011 | Shetty |
| 8,144,810 B2 | 3/2012 | Gronemeyer et al. |
| 8,175,173 B2 | 5/2012 | Shetty |
| 8,203,976 B2 | 6/2012 | Komoda |
| 8,307,235 B2 | 11/2012 | Patel et al. |
| 8,325,767 B2 | 12/2012 | Burch et al. |
| 8,719,613 B2 * | 5/2014 | Neben .................. G06F 1/12 |
| | | 713/401 |
| 8,724,758 B2 | 5/2014 | Meltser et al. |
| 8,737,456 B2 | 5/2014 | Hollis |
| 8,737,552 B1 | 5/2014 | Sawyer |
| 8,787,471 B1 | 7/2014 | Lifshitz |
| 8,824,543 B2 | 9/2014 | Wu et al. |
| 8,908,779 B2 | 12/2014 | Douglass |
| 9,026,069 B2 | 5/2015 | Bellaouar et al. |
| 9,047,934 B1 | 6/2015 | Ng et al. |
| 9,065,580 B2 | 6/2015 | Silverman et al. |
| 9,077,527 B2 | 7/2015 | Wu et al. |
| 9,141,577 B2 | 9/2015 | Wagh et al. |
| 9,225,507 B1 | 12/2015 | Lye et al. |
| 9,239,810 B2 | 1/2016 | Chen et al. |
| 9,280,510 B2 | 3/2016 | Ranganathan et al. |
| 9,432,298 B1 | 8/2016 | Smith |
| 9,490,791 B2 | 11/2016 | Liu et al. |
| 9,582,454 B2 | 2/2017 | Hsueh et al. |
| 9,647,852 B2 | 5/2017 | Berke et al. |
| 9,678,552 B2 | 6/2017 | Ahmed et al. |
| 9,785,604 B2 | 10/2017 | Mejia et al. |
| 2004/0001050 A1 | 1/2004 | Fievre |
| 2004/0100909 A1 | 5/2004 | Lee et al. |
| 2004/0267947 A1 | 12/2004 | Sheahan et al. |
| 2005/0010685 A1 | 1/2005 | Ramnath et al. |
| 2005/0032533 A1 | 2/2005 | Pilgram et al. |
| 2005/0068987 A1 | 3/2005 | Schaik et al. |
| 2007/0176919 A1 | 8/2007 | Yamashita et al. |
| 2008/0212551 A1 | 9/2008 | Wu et al. |
| 2009/0257445 A1 | 10/2009 | Chan et al. |
| 2009/0274207 A1 | 11/2009 | O'Keeffe et al. |
| 2010/0052743 A1 | 3/2010 | Kamizuma et al. |
| 2010/0074383 A1 | 3/2010 | Lee et al. |
| 2011/0014918 A1 | 1/2011 | Padfield et al. |
| 2011/0206143 A1 | 8/2011 | Reinhardt et al. |
| 2011/0299537 A1 | 12/2011 | Saraiya et al. |
| 2011/0310978 A1 | 12/2011 | Wu et al. |
| 2012/0224491 A1 | 9/2012 | Norair |
| 2014/0010317 A1 | 1/2014 | Oshikiri et al. |
| 2014/0334582 A1 | 11/2014 | Bock et al. |
| 2015/0043398 A1 | 2/2015 | Fwu et al. |
| 2015/0074306 A1 * | 3/2015 | Ayyagari ............ G06F 13/4072 |
| | | 710/110 |
| 2015/0078501 A1 | 3/2015 | Olejarz et al. |
| 2015/0100713 A1 | 4/2015 | Sengoku |
| 2015/0121149 A1 | 4/2015 | Cooke et al. |
| 2015/0180803 A1 | 6/2015 | Li et al. |
| 2015/0199290 A1 * | 7/2015 | Mathewson ........ G06F 13/4068 |
| | | 710/110 |
| 2015/0326504 A1 | 11/2015 | Yu et al. |
| 2016/0029385 A1 | 1/2016 | Shapira et al. |
| 2016/0055114 A1 | 2/2016 | Freiwald et al. |
| 2017/0041086 A1 | 2/2017 | Park et al. |
| 2017/0060808 A1 | 3/2017 | Randell et al. |
| 2017/0222684 A1 | 8/2017 | Khan et al. |
| 2017/0222685 A1 | 8/2017 | Khan et al. |
| 2017/0222686 A1 | 8/2017 | Khan et al. |
| 2017/0223646 A1 | 8/2017 | Romera et al. |

FOREIGN PATENT DOCUMENTS

| | | |
|---|---|---|
| WO | 2015035338 A1 | 3/2015 |
| WO | 2015148992 A1 | 10/2015 |
| WO | 2015191875 A1 | 12/2015 |

OTHER PUBLICATIONS

Dickson T.O., et al., "A 1.4 pJ/bit, Power-Scalable 16×12 Gb/s Source-Synchronous I/O With DFE Receiver in 32 nm SOI CMOS Technology", IEEE Journal of Solid-State Circuits, IEEE Service Center, Piscataway, NJ, USA, vol. 50, No. 8, Aug. 1, 2015, pp. 1917-1931, XP011664156, ISSN: 0018-9200, DOI: 10.1109/JSSC. 2015.2412688 [retrieved on Jul. 24, 2015].
Cypress, "Programmable Radio-on-Chip with Bluetooth Low Energy (PRoC BLE)," CYBL10X6X Family Datasheet, Document No. 001-90478, Aug. 19, 2015, pp. 1-42.
Eftimakis M., et al., "High-Speed Serial Fully Digital Interface between WLAN RF and BB Chips", Retrieved from Internet on Nov. 15, 2016, https://www.design.reuse.com/articles/9472/high-speed-serial-fully-digi-..., pp. 1-37.
Xilinx, "Zynq-7000 All Programmable SoC Overview," DS190 (V1.10), Sep. 27, 2016, pp. 1-25.
International Search Report and Written Opinion—PCT/US2016/068441—ISA/EPO—dated Apr. 12, 2017.

\* cited by examiner

UNIDIRECTIONAL CLOCK SIGNALING IN A HIGH-SPEED SERIAL LINK

CROSS-REFERENCE TO RELATED APPLICATIONS

This application claims the benefit of U.S. Provisional Application Ser. No. 62/289,874, entitled "SCALABLE, HIGH-EFFICIENCY, HIGH-SPEED SERIALIZED INTERCONNECT" and filed on Feb. 1, 2016, and the benefit of U.S. Provisional Application Ser. No. 62/290,309, entitled "TRANSCEIVER FOR WIRELESS BASEBAND DIGITAL INTERCONNECT" and filed on Feb. 2, 2016, and the benefit of U.S. Provisional Application Ser. No. 62/290,357, entitled "TESTING OF A TRANSCEIVER FOR WIRELESS BASEBAND DIGITAL INTERCONNECT" and filed on Feb. 2, 2016, and the benefit of U.S. Provisional Application Ser. No. 62/373,246, entitled "DUAL-MODE SERIAL INTERFACE FOR DIFFERENTIAL AND SINGLE-ENDED SIGNALING" and filed on Aug. 10, 2016, all of which are expressly incorporated by reference herein in its entirety.

BACKGROUND

Field

The present disclosure relates generally to interconnect systems, and more particularly, to a high-speed serial interconnect system.

Background

Electronic devices are typically made up of multiple systems built on integrated circuits (ICs), e.g., silicon chips. The different IC systems can be specialized to handle different functions of the electronic device. For example, a mobile communications device can include an IC system for processing radio frequency (RF) signals received and transmitted through various antennas. The RF antennas in a cell phone, for example, can include antennas to receive and transmit cell communication signals, to receive global positioning system (GPS) signals, etc. The task of processing RF signals received and transmitted by the cell phone can be performed by a radio frequency integrated circuit (RFIC), which may include, for example, power amplifiers (PA), low-noise amplifiers (LNAs), antenna tuners, filters, sensors, power management devices, switches, etc. On the other hand a different IC system, typically called a baseband modem or baseband IC (BBIC), can handle the task of sorting out the various incoming and outgoing RF communications and sending each one to the proper destination (e.g., an incoming GPS signal might be sent to a GPS IC, an incoming cell communication might be parsed into data and voice and sent to the appropriate data processing IC and voice processing IC).

The different IC systems communicate with each other via signal lines. For example, some IC systems can be built as separate IC chips, which can be connected together by soldering them to the same printed circuit board (PCB). In this case, the printed wires on the PCB can serve as the signal lines between the different IC systems on separate chips. In another example, multiple systems can be built on a single IC, which can be referred to as a system-on-a-chip (SoC). In this case, conductive pathways built into the IC chip can serve as the signal lines.

Communication between system ICs is performed using a communication interface, which defines how data is sent and received via the signal lines. In many applications, serial interfaces have become the preferred method for digital communication between IC systems. Serial communication is the process of sending data one bit at a time, sequentially, over a communication channel, such as signal lines. This is in contrast to parallel communication, where several bits are sent as a whole, on a link with several parallel channels. An interconnect or link is a point-to-point communication channel between two ports allowing both of them to send and receive data and messages. Serial interconnects are becoming more common at shorter distances, as improved signal integrity and transmission speeds in newer serial technologies have begun to outweigh the parallel bus's advantage of simplicity (e.g., no need for serializer and deserializer, or SERDES) and to outstrip its disadvantages (e.g., clock skew, interconnect density).

As the speed of data communication increases, so does the power needed to communicate over serial interconnects. In battery-operated devices, such as mobile devices, low power operation is critical to allow longer operation between charges. However, as the need for faster and faster data communication speeds has grown, it has become challenging for serial interconnects to provide the accuracy (e.g., low error rate) required for high-speed communication while operating at a low power.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various embodiments, unidirectional clock signaling is used for transmission of data over a serial link. A master device can generate a unidirectional clock signal based on a first clock of the master device. In some embodiments, the unidirectional clock signal can be generated to have the same rate as the first clock. In some embodiments, unidirectional clock signal is generated such that a rate of the unidirectional clock signal is a fraction of a rate of the first clock. The master device can send the unidirectional clock signal to a slave device that is connected to the serial link. The master device can transmit data to the slave device over the serial link based on the first clock. In some embodiments, the unidirectional clock signal can be sent over the serial link to the slave device. In some embodiments, the unidirectional clock signal can be sent over a sideband to the slave device.

In various embodiments, a slave device can receive a unidirectional clock signal from a master device. The unidirectional clock signal can be based on a first clock of the master device. The slave device can transmit data over the serial link to the master device based on the unidirectional clock signal. In some embodiments, the rate of the unidirectional clock can be the same as a rate of the first clock. In some embodiments, the rate of the unidirectional clock signal can be a fraction of a rate of the first clock. In some embodiments, the unidirectional clock signal can be received over the serial link from the master device. In some embodiments, the unidirectional clock signal can be received over a sideband from the master device.

In various embodiments, an apparatus that transmits data over a serial link can include a master device that includes a first clock, a clock signal generator that generates a unidirectional clock signal based on the first clock, and a transmitter component. In some embodiments, the clock signal generator can generate the unidirectional clock to have a same rate as the first clock. In some embodiments, the clock signal generator can generate the unidirectional clock such that a rate of the unidirectional clock signal is a fraction of a rate of the first clock. The transmitter component can send the unidirectional clock signal to a slave device that is connected to the serial link. The transmitter component can also transmit data to the slave device over the serial link based on the first clock. In some embodiments, the transmitter component can transmit the unidirectional clock signal over the serial link to the slave device. In some embodiments, the transmitter component can transmit the unidirectional clock signal over a sideband to the slave device.

In various embodiments, an apparatus that transmits data over a serial link can include a slave device that includes a receiver that can receive a unidirectional clock signal from a master device. The unidirectional clock signal can be based on a first clock of the master device. The slave device can also include a transmitter that can transmit data over the serial link to the master device based on the unidirectional clock signal. In some embodiments, the rate of the unidirectional clock can be the same as a rate of the first clock. In some embodiments, the rate of the unidirectional clock signal can be a fraction of a rate of the first clock. In some embodiments, the receiver can receive the unidirectional clock signal over the serial link from the master device. In some embodiments, the receiver can receive the unidirectional clock signal over a sideband from the master device.

The following description and the annexed drawings set forth in detail certain illustrative features of one or more aspects of the disclosure. These features are indicative, however, of but a few of the various ways in which the principles of various aspects may be employed, and this description is intended to include all such aspects and their equivalents.

DETAILED DESCRIPTION

Figure 1:
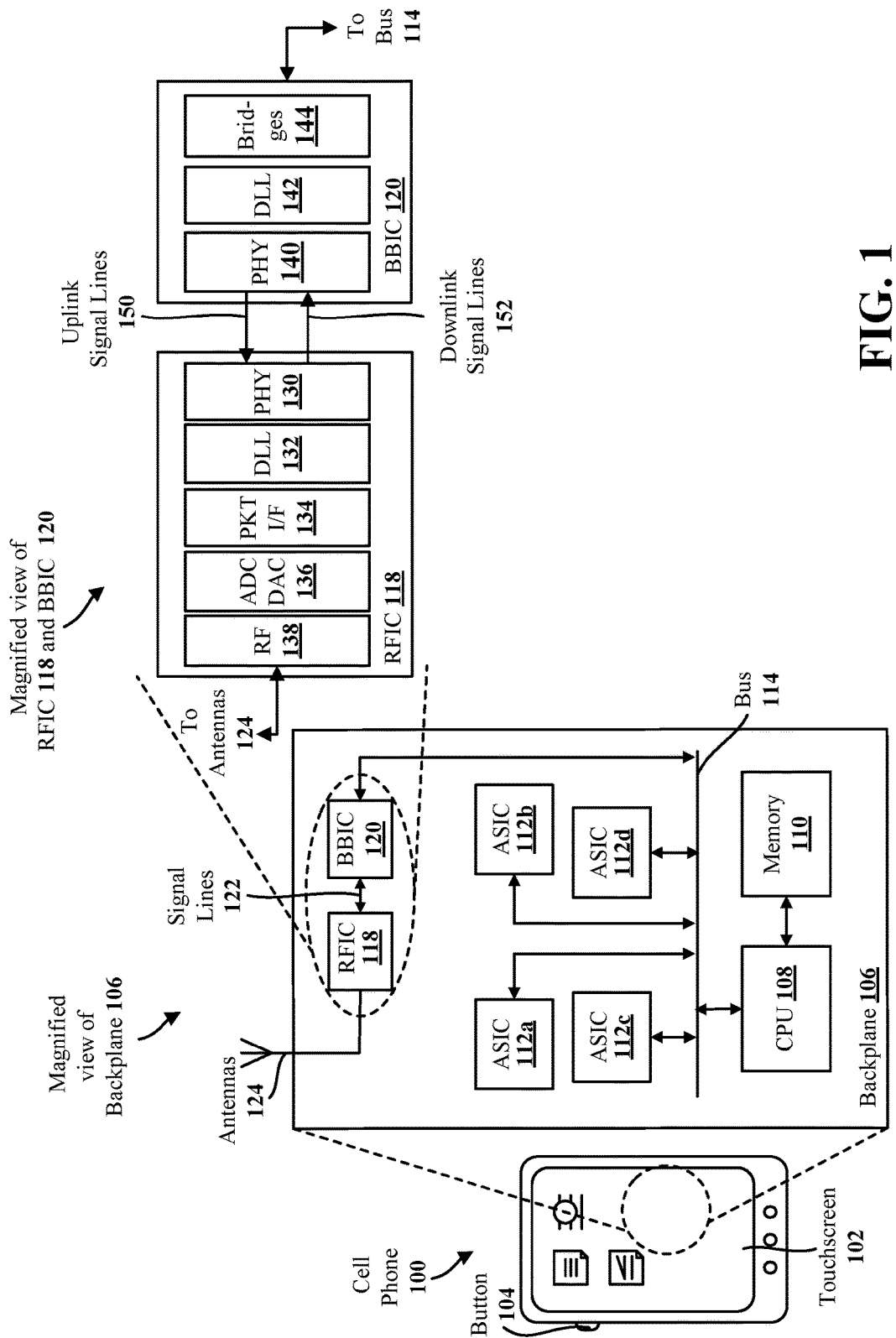
FIG. 1 illustrates various aspects of the disclosure in an example implementation of a cell phone.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of serial interconnect systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In some embodiments, some elements, or portions of some elements, or some combinations of elements may be implemented as a "processing system" that includes one or more processors, as will be appreciated by one skilled in the art in light of this disclosure. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates various aspects of the disclosure in an example implementation of a cell phone 100. Cell phone 100 can include user input components, such as a touchscreen 102, a button 104, etc. Inside cellphone 100 is a backplane 106, which is illustrated FIG. 1 in a magnified view to show details. Backplane 106 can be, for example, a printed circuit board on which various components are attached. For example, a central processing unit (CPU) 108 and memory 110 can be attached to backplane 106. CPU 108 can be responsible for general processing tasks of cell phone 100, such as displaying graphical user interfaces on touchscreen 102, processing user input from the touchscreen and button 104, running an operating system, etc. Specialized tasks can be performed by other components, such as application-specific integrated circuits (ASICs) 112a-d. For example, ASICs 112a-d can include a GPS ASIC to process GPS information, a touch ASIC to process touch-sensing data, etc. CPU 108 and ASICS 112a-d can communicate with each other through a bus 114.

The task of handling RF transmission and reception can be performed by an RFIC 118 and a BBIC 120. RFIC 118 and BBIC 120 can communicate with each other through signal lines 122, which can be, for example, metal traces on backplane 106. RFIC 118 can be connected to antennas 124 to process RF signals received by the antennas into downlink data and to process uplink data into RF signals to be transmitted by the antennas. BBIC 120 can be connected to bus 114 to communicate with the other systems on backplane 106 in order to, for example, route downlink data to the appropriate system, prioritize and schedule uplink data to be transmitted, etc.

FIG. 1 includes a magnified view of RFIC 118 and BBIC 120. RFIC 118 can include a physical layer (PHY) component (referred to herein simply as a "PHY"), such as a PHY 130, a data link layer (DLL) component (referred to herein simply as a "DLL"), such as a DLL 132, a packet interface (PKTIF) 134, an analog-to-digital/digital-to-analog (ADC/DAC) converter 136, and an RF section 138. RF section 138 can be connected to antennas 124. In other embodiments, antennas can be integral with the RF section. BBIC 120 can include a PHY 140, a DLL 142, and interconnect bridges 144. The magnified view shows signal lines 122 can include one or more uplink (UL) signal lines 150 and one or more downlink (DL) signal lines 152.

For downlink communication, i.e., cell phone 100 receiving communication from external sources such as cell towers, GPS satellites, etc., RF section 138 can process analog RF signals received through the antennas (downlink signals), and ADC/DAC converter 136 can convert the processed analog downlink signals into digital downlink signals. Packet interface 134 can packetize the digital downlink signals into data packets. Packetization is a way to provide data with protection, identification, routing information, etc., in a computerized communication environment. For example, a header can be included in the data packet to indicate a destination address, a cyclic redundancy check (CRC) can be added to the data packet to provide protection against errors during transmission, etc. Packet interface 134 packetizes the downlink signals according to a communication protocol used by interconnect bridges 144 for transmission of data over bus 114. This communication protocol is used by all of the components attached to backplane 106 to communicate over bus 114. However, before the data packets from packet interface 134 can reach interconnect bridges 144 and be transmitted over bus 114, the data packets must be transmitted from RFIC 118 to BBIC 120 over downlink signal lines 152.

Communication across downlink signal lines 152 can be governed by a different protocol, i.e., a serial link protocol. DLL 132 and PHY 130 can further packetize the downlink data according to the serial link protocol. PHY 130 can transmit the further-packetized data across downlink signal lines 152. PHY 140 can receive the further-packetized data, PHY 140 and DLL 142 can de-packetize the data packets, and interconnect bridges 144 can transmit the data packets over bus 114.

Similarly, for uplink communications, i.e., cell phone 100 transmitting communication to external sources, interconnect bridges 144 can receive uplink data packets through bus 114. DLL 142 and PHY 140 can further packetize the uplink data packets according to the serial link protocol, and PHY 140 can transmit them across uplink signal lines 150. PHY 130 can receive the uplink data packets, and PHY 130 and DLL 132 can de-packetize the data packets. Packet interface 134 can further de-packetize the uplink data packets into uplink signals so that the signals can be properly transmitted by RF section 138. ADC/DAC converter 136 can receive uplink signals from packet interface 134, convert these digital signals into analog signals, and send the analog uplink signals to RF section 138 to be transmitted. RF section 138 can process analog RF signals to be transmitted through antennas 124.

According to certain aspects disclosed herein, an advanced digital serial interface is provided. The digital serial interface can be implemented, for example, between baseband and RF integrated circuits in mobile communication devices and the like.

In various embodiments, the digital serial interface may transmit and receive based on a unidirectional clock signal between physical layers, such as PHY 130 and PHY 140 above. Unidirectional clock signaling can, for example, help to reduce the power consumption of the serial link. Examples of various aspects of unidirectional clock signaling are described below with reference to FIGS. 2-5.

In various embodiments, the digital serial interface may include a serial link protocol that is engineered to optimize RF and baseband functions to provide high-speed, low-power serial link communication. Examples of various aspects of such serial link protocols are described below with reference to FIGS. 8-12.

Furthermore, various embodiments can include a programmable distributed data processor in the physical layer of a serial link, such as PHY 130 and/or PHY 140 above. A programmable distributed data processor can add flexibility, while maintaining low-power operation, to otherwise fixed link architecture. Examples of various aspects of such programmable distributed data processors are described below with reference to FIGS. 33-37.

Furthermore, various embodiments can include embedded functionality for testing the serial link. In some embodiments, the embedded testing can be performed in part by the programmable distributed data processor. Examples of various aspects of embedded testing are described below with reference to FIGS. 38-41.

Figure 2:
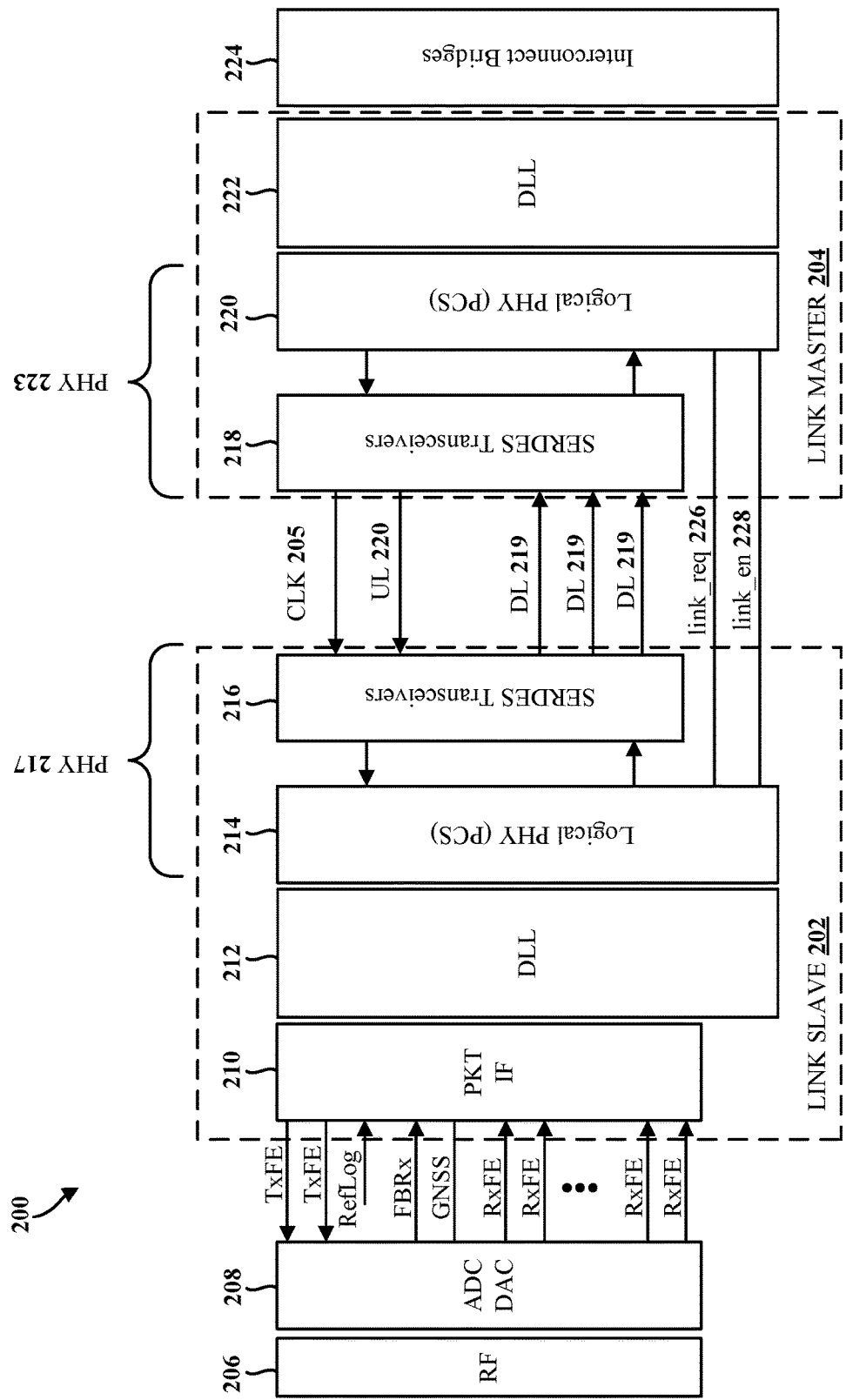
FIG. 2 illustrates an example of a transceiver apparatus that transmits and receives signals across a high-speed serial link based on unidirectional clock signaling.

FIG. 2 illustrates an example of a transceiver apparatus 200 that transmits and receives signals across a high-speed serial link based on unidirectional clock signaling. In this way, for example, power consumption of the clock signaling circuitry can be lower compared to using two clocks. The unidirectional clock signal can be used for synchronization of the communication between a master and a slave over the serial link. In this regard, transceiver apparatus 200 can include a link slave 202 and a link master 204. Link master 204 sends a clock signal (CLK) 205 to link slave 202, and communication between the link master and link slave over the high-speed serial link is based on CLK 205. However, link slave 202 does not send a clock signal that is used for communication over the high-speed serial link to link master 204. This is an example of unidirectional clock signaling.

As used herein, unidirectional clock signaling is defined by one side of a serial link sending a clock signal to the other side of the serial link, where communication over the serial link is based on the clock signal, and the other side not sending a clock signal on which communication across the serial link is based. Also, as used herein, the term "unidirectional clock signal" refers to the clock signal that is sent in unidirectional clock signaling.

Transceiver apparatus 200 can include an RF section 206. RF section 206 may include various circuitry related to the transmission and reception of RF signals. For example, RF section 106 may include one or more antennas. Additionally, RF section 206 may include one or more RF filters or other RF processing circuits. Transceiver apparatus 200 can also include an ADC/DAC 208, which may be used to convert received RF signals (analog) from RF section 206 to digital signals in the ADC portion of ADC/DAC 208. For example, RF signals may be received at an antenna in RF section 206. The received RF signals may be filtered or otherwise processed in RF section 206. The received RF signals (after any RF processing such as filtering that occurs in RF section 206) may then be converted to digital signals using the ADC in ADC/DAC 208. As illustrated in FIG. 2, in some examples, the RF signals may be converted from RF signals to digital signals or converted from digital signals to RF signals directly, rather than at baseband. The digital version of the received RF signals may then be processed digitally using the rest of the transceiver apparatus 200.

ADC/DAC 208 may also convert digital signals to analog signals in the DAC portion of the ADC/DAC. For example, digital signals received by ADC/DAC 208 from a packet interface (PKTIF) 210 may be converted to RF signals (analog) using the DAC portion of the ADC/DAC. The RF version of the digital signals received by ADC/DAC 208 from PKTIF 210 may then be processed as RF by filtering or other RF processing. The RF version of the digital signals received by ADC/DAC 208 from PKTIF 210 may be transmitted using the one or more antennas of RF section 206.

FIG. 2 illustrates various signals that can be transmitted between link slave 202 and ADC/DAC 208. For example, digital signals that are to ultimately be transmitted using the antenna or antennas of RF section 206 may be sent from PKTIF 210 using the transmit front end (TxFE) signals illustrated in FIG. 2. Digital signals that are to be further processed by the rest of the transceiver apparatus 200 may be send from ADC/DAC 208 to PKTIF 210 using the receive front end (RxFE) signals illustrated in FIG. 2. ADC/DAC 208 may provide feedback to PKTIF 210 via the feedback receiver (FBRx) signal illustrated in FIG. 2. In communications systems that include position/location functionality, ADC/DAC 208 may also provide global navigation satellite system signals (GNSS) to the rest of transceiver apparatus 200 using the GNSS signal illustrated in FIG. 2.

PKTIF 210 can be coupled to a DLL 212, and DLL 212 can provide the PKTIF with access to uplink data. Conversely, DLL 212 can provide access to downlink data to a link physical coding sublayer (PCS) 214. In this regard, link PCS 214 may be a link protocol sublayer that resides on top of a serializer-deserializer (SERDES) transceiver 216 to provide an interface between DLL 212 and SERDES transceiver 216. Together, PCS 214 and SERDES transceiver 216 make up a PHY 217 of link slave 202.

SERDES transceiver 216 can receive downlink data from link PCS 214, serialize the downlink data, and transmit the serial downlink data to a SERDES transceiver 218 of link master 204 via downlink signal lines 219. SERDES transceiver 216 can also receive serial uplink data from SERDES transceiver 218 via an uplink signal line 220, can deserialize the uplink data, and can send the deserialized uplink data to link PCS 214. As described above, this high-speed serial communication between link master 204 and link slave 202 can be based on unidirectional clock signaling. In this example, link master 204 can provide clock signal 205 to link slave 202 via the serial link between SERDES transceivers 218 and 216. In some embodiments, a clock signal from a link master to a link slave can be provided via other channels, such as a side-band communication.

SERDES transceiver 218 can be coupled to a link PCS 221. Similar to link PCS 214, link PCS 221 can be a link protocol sublayer that resides on top of SERDES transceiver 218 to provide an interface between SERDES transceiver 218 and a DLL 222 of link master 204. Together, PCS 221 and SERDES transceiver 218 make up a PHY 223 of link slave 202. DLL 222 can provide downlink data to interconnect bridges 224, and the interconnect bridges can provide uplink data to DLL 222. Interconnect bridges 224 can be connected to other devices, from which UL data may be received and to which DL data may be sent. In various embodiments, unidirectional clock signaling can provide several advantages. For example, reducing the number of components by eliminating one or more clocks can reduce the pin count and ports required, which can in turn reduce the number of wires required on a printed circuit board on which the device resides. Fewer components also can reduce the IC area and lower the noise environment. In various embodiments, unidirectional clock signaling may help reduce the power required for operation of a high-speed serial link.

Transceiver apparatus 200 can also include other power-saving functionality. For example, link master 204 can initiate a low-power mode in which the link master and link slave 202 enter a low-power state. In the low-power state, SERDES transceivers 216 and 218 do not transmit. When the link slave 202 needs to wake up link master 204, the link slave may use a link request (link_req) signal 226 that can be transmitted to the link master via a side-band (i.e. not via the serial link between SERDES 216 and 218). Likewise, link master 204 may use a link enable (link_en) signal 228 (which may be an active low signal) to enable the inter-device link slave 202 to resume serial link communication.

Figure 3:
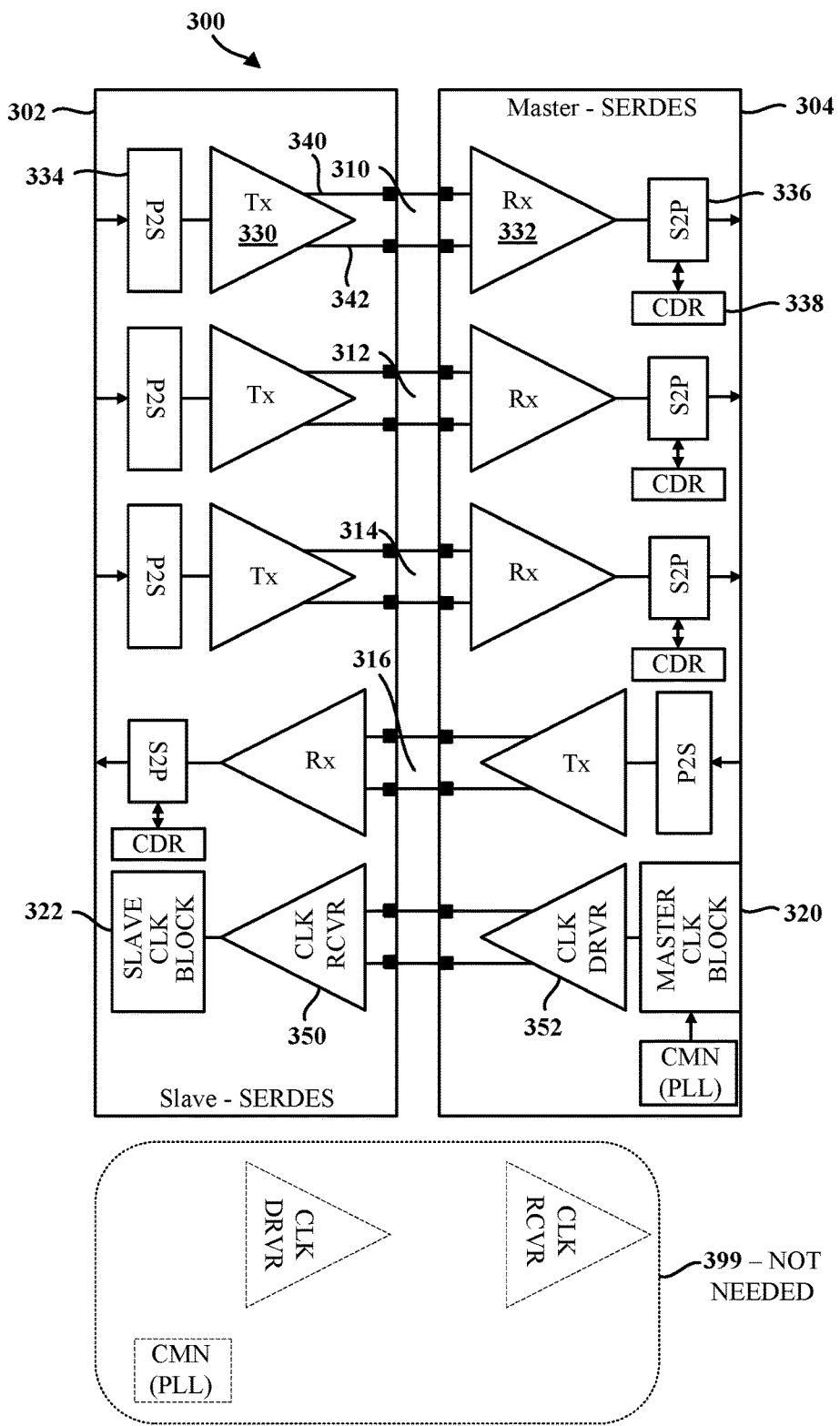
FIG. 3 illustrates an example SERDES transceiver configuration for a serial interconnect that communicates high-speed serial data based on unidirectional clock signaling.

FIG. 3 illustrates an example SERDES transceiver configuration for a serial interconnect 300 that communicates high-speed serial data based on unidirectional clock signaling according to various embodiments. Serial interconnect 300 can include a SERDES transceiver that acts as a slave 302 and a SERDES transceiver that acts as a master 304. For example, in some embodiments, SERDES transceivers 216 and 218 of FIG. 2 can operate, respectively, as slave 302 and master 304.

In some applications, bandwidth requirements are not symmetrical. In other words, a higher bandwidth may be required for data flowing in one direction versus data flowing in the other direction. For example, cell phone users typically download much more data than they upload. Therefore, the downlink data bandwidth use is typically much higher than uplink bandwidth use in cellular communication systems. In these situations, more downlink bandwidth versus uplink bandwidth can be provided by, for example, using 3 DL lanes 310, 312, 314 and 1 UL lane 316. Each lane can perform serial-to-parallel (S2P) conversion of data, parallel-to-serial (P2S) conversion of data, clock recovery, and associated functions. Furthermore, each lane can use a common block that generates clocks, bias and start-up sequences.

A lane is composed of one differential signaling pair, either for UL traffic or for DL traffic. Thus, each lane is composed of two wires, signal traces, conductive pathways, etc. For example, DL lane 310 includes two wires 340 and 342. DL lane 310 also includes a transmitter 330 and a P2S component 334 at the slave 302, and a receiver 332, a S2P component 336, and a clock/data recovery (CDR) component 338 at the master 304. Transmitter 330 sends information to receiver 332 through the two wires 340 and 342. P2S component 334 converts information from parallel to serial format in order to be transmitted serially by transmitter 330. S2P component 336 converts serial information received by receiver 332 into parallel format for further processing. CDR component 338 performs clock/data recovery.

Serial interconnect 300 may be configured to generate a data link layer packet for transmission of information to a second device. Generating a data link layer packet for transmission of information to a second device may include performing an operation described below with reference to 1202 of FIG. 12. Generating a data link layer packet for transmission of information to a second device may be performed by a processor associated with the master 304 or the slave 302.

The serial interconnect 300 may be configured to encapsulate the data link layer packet within one or more physical layer frames. Encapsulating the data link layer packet within one or more physical layer frames may include performing an operation described below with reference to 1204 of FIG. 12. Encapsulating the data link layer packet within one or more physical layer frames may be performed by a processor associated with the master 304 or the slave 302.

The serial interconnect 300 may be configured to transmit the one or more physical layer frames to the second device. Transmitting the one or more physical layer frames to the second device may be performed in an operation described below with reference to 1206 of FIG. 12. Transmitting the one or more physical layer frames to the second device may be performed by a P2S component (e.g., 334), a transmitter (e.g., 330), or wires (e.g., 340 and 342).

The serial interconnect 300 may be configured to receive a clock signal from the second device. Receiving a clock signal from the second device may be performed by the slave clock block 322 or the clock receiver 350. Transmitting the one or more physical layer frames may include operating based on the clock signal. Transmitting may further include refraining from transmission of the clock signal to the second device.

The serial interconnect 300 may be configured to send a clock signal to the second device. Sending a clock signal to the second device may be performed by the master clock block 320 or the clock driver 352. Transmitting the one or more physical layer frames may include operating based on the clock signal.

The serial interconnect 300 may be configured to refrain from receiving the clock signal from the second device. Refraining from receiving the clock signal from the second device may be performed by the master clock block 320 or the clock driver 352.

The serial interconnect 300 may be configured to receive at least one physical layer frame from the second device. Receiving at least one physical layer frame from the second device may include performing an operation described below with reference to 1208 of FIG. 12. Receiving at least one physical layer frame from the second device may be performed by a S2P component (e.g., 336), a receiver (e.g., 332), a CDR (e.g., 338), or wires (e.g., 340 and 342).

The serial interconnect 300 may be configured to obtain one or more data link layer packets based on the at least one physical layer frame. Obtaining one or more data link layer packets based on the at least one physical layer frame may include performing an operation described below with reference to 1210 of FIG. 12. Obtaining one or more data link layer packets based on the at least one physical layer frame may be performed by a processor associated with the master 304 or the slave 302.

The serial interconnect 300 may be configured to extract data or messages based on the one or more data link layer packets. Extracting data or messages based on the one or more data link layer packets may include performing an operation described below with reference to 1212 of FIG. 12. Extracting data or messages based on the one or more data link layer packets may be performed by a processor associated with the master 304 or the slave 302.

The asymmetry is introduced with the clock block. To improve the robustness of the solution, the serial interconnect 300 has synchronous operation the master SERDES 304 providing the Clock to the slave SERDES 302.

Each transmitter serializes a 20-bit parallel interface. This is driven out with an h-bridge driver that has programmable swing levels. The receiver has access to linear equalization. The design provides a maximum bit rate of 6 Gbps.

The SERDES of the serial interconnect 300 can support the following functions depending on the power, performance, and standard required: programmable Tx amplitudes; multiple TX and Rx termination settings; multiple power states; signal detection; extensive built-in testing, programmable CDR on and off times; multiple Calibrated phase lock loop (PLL) settings for fast frequency switching; multi-pattern BIST generation and BIST checking; multiplexed scan for testing of digital circuitry; multiple loopbacks; control register bus; direct current joint text action group (DC JTAG); on-chip jitter testing in association with frequency variation in parts-per-million (PPM), inter-symbol interference (ISI), and bounded uncorrelated jitter (BUJ); 20 bit parallel interfaces for Rx and Tx.

Some of the specifications of the SERDES of the serial interconnect 300 are bit error rate (BER) of 1e-16 or better (to achieve this BER specification special attention can be taken for the board layout, e.g., up to 6 inches can be the maximum length of the trace from/to RFIC to/from BBIC, and shape of the trace can remain simple, e.g., curves can be tolerated but sharp angles, via, connectors should be minimized), all lanes can be used at 6 Gbps with clock buffers running at 3 GHz in functional mode.

Clock block 320 in master SERDES 304 acts as the clock transmitter in this unidirectional clock signaling example and takes the clock provided by the PLL (high speed mode, functional) or an internal clock provided by the IC (low speed mode) and generates the needed intermediate clocks and sends the intermediate clocks to all the RX and TX blocks in the master SERDES along with sending, via a clock driver 352, a half rate clock to the slave 302.

Clock block 322 in slave SERDES 302 acts as the clock receiver in this unidirectional clock signaling example and receives, via a clock receiver 350, the clock provided by master 304, generates the needed intermediate clocks and sends the intermediate clocks to all the RX and TX blocks in slave SERDES 302. A slow clock mode (low speed mode) is provided to support slow speed operation. This mode can be used, for example, in production test to accommodate the limit of testers. Due to the high speed signals handle by the SERDES, calibration, termination setup can be needed for the Tx and Rx buffers.

For the purpose of illustrating a benefit of unidirectional clock signaling, FIG. 3 also shows some components 399 that are not needed in comparison to conventional, bi-directional clock signaling (components 399 are drawn with dashed lines to indicate the components are absent from the present design). In particular, unidirectional clock signaling can allow elimination of a PLL and a clock driver on the slave SERDES side and a clock receiver on the master SERDES side. The elimination of components 399 can result in power savings because all of these components require power to operate. In addition, elimination of components 399 can reduce the chip area of serial interconnect 300, allowing the serial interconnect to be smaller. Finally, elimination of components 399 can reduce the number of pins, number of ports, and number of wires required to connect serial interconnect 300.

Figure 4:
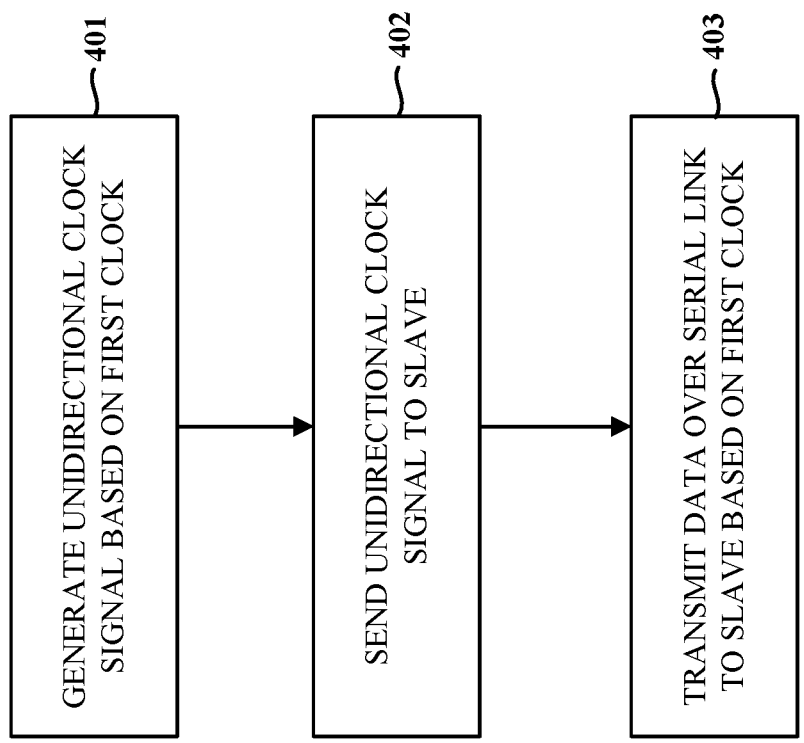
FIG. 4 is a flowchart of an example method of a master connected to a serial link for performing unidirectional clock signaling according to various embodiments.

FIG. 4 is a flowchart of an example method of a master connected to a serial link, such as master SERDES 304 of FIG. 3, for performing unidirectional clock signaling according to various embodiments. The master can generate (401) a unidirectional clock signal based on a first clock, in which the first clock is a clock in the master. For example, master SERDES 304 can generate a unidirectional clock signal based on master clock block 320. In some embodiments, the master may generate a unidirectional clock signal that is at the same rate as the first clock. In some embodiments, the master may generate a unidirectional clock signal that is a fraction of the rate of the first clock, e.g., half rate. The master can send (402) the unidirectional clock signal to a slave device that is connected to the serial link. For example, master SERDES 304 can transmit the unidirectional clock signal via clock driver 352. In some embodiments, the master can send the unidirectional clock signal over the serial link to the slave. In some embodiments, the master can send the unidirectional clock signal via another channel, such as a sideband, to the slave. The master can transmit (403) data to the slave device over the serial link based on the first clock. For example, master SERDES 304 can transmit data to link slave SERDES 302 over UL lane 316 based on master clock block 320.

In some embodiments, means for generating a unidirectional clock signal can include the first clock and a programmable distributed data processor, described in more detail below with reference to FIGS. 33-37. In other embodiments, means for generating a unidirectional clock signal can include the first clock and a fixed state machine that controls clock signaling of the link.

In some embodiments, means for sending the unidirectional clock signal can include a SERDES transceiver, such as SERDES transceiver 218. In other embodiments, means for sending the unidirectional clock signal can include a clock driver, such as clock driver 352.

In some embodiments, means for transmitting data to the slave device over the serial link can include a SERDES transceiver, such as SERDES transceiver 218.

Figure 5:
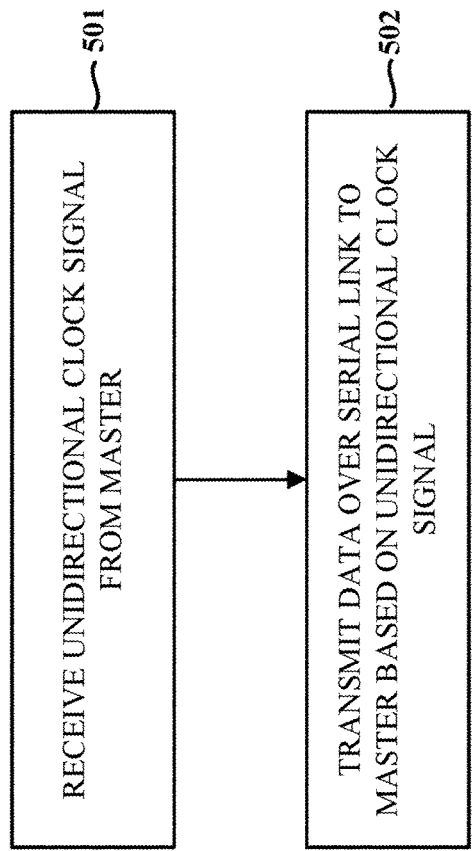
FIG. 5 is a flowchart of an example method of a slave connected to a serial link for performing unidirectional clock signaling.

FIG. 5 is a flowchart of an example method of a slave connected to a serial link, such as slave SERDES 302 of FIG. 3, for performing unidirectional clock signaling according to various embodiments. The slave can receive (501) a unidirectional clock signal from a master that is connected to the serial link. For example, slave SERDES 302 can receive a unidirectional clock signal via clock receiver 350 from master SERDES 304. In some embodiments, the unidirectional clock signal can be received over the serial link. In some embodiments, the unidirectional clock signal can be received via another channel, such as a sideband. The slave can transmit (502) data over the serial link to the master based on the unidirectional clock signal. For example, slave SERDES 302 can transmit data over DL lane 310 to master SERDES 304. In some embodiments, the slave can set an internal clock based on the unidirectional clock signal, and transmission of data over the serial link can be based on this internal clock.

It should be noted that the logical sub-block (e.g., PCS) of a physical layer can provide a means for interfacing between the DLL and the electrical sub-block (e.g., SERDES transceiver block) and can provide mechanisms to further encapsulate a data link layer packet before sending the encapsulated DLL packet to the electrical sub-block for transport (e.g., over signal lines). The logical sub-block can multiplex packet information that is multiplexed, striped across all available lanes and scrambled before being packaged into frames (e.g., 130-bit frames).

The logical sub-block can have two main sections: a transmit section that prepares outgoing information passed from the Data Link Layer for transmission by the electrical sub-block; and a receiver section that identifies and prepares received information before passing the received information to the Data Link Layer. The logical sub-block and electrical sub-block can coordinate the state of each transceiver through a status and control register interface or functional equivalent.

The physical layer of the serial interconnect can use a 128b/130b encoding scheme, which can limit the overhead to 1.5% per data frame (versus, for example, the 20% overhead required by using 8b/10b encoding). The frame size is 130 unit intervals (UIs). Each UI contains one bit of information. Out of the 130 bits, 2 bits carry a frame synchronization symbol, and the remaining 128 bits carry data symbols (i.e., 128b/130b encoding). A UI can be a constant time interval for transmission of 1 bit of information (The UI is the inverse of the bit rate. At 6 Gbps, 1 UI=0.16 ns). A frame can be 130 bits (1 frame can be transmitted in 130 UIs in a single lane, and the frame can contain 128 bits of information and 2 bit synchronization symbol). A block can be 130 bits multiplied by the number of bits per lane (1 block can be transmitted in 130 UIs (after deskew), and the block can contain 128 bits of information and 2 bit synchronization symbol per lane). A synchronization symbol can be 2 bits (the synchronization symbol can be transmitted periodically at the start of each Physical Layer frame, and the synchronization symbol can be used to differentiate between Physical Layer messaging and data link layer messaging, e.g., 01 can identify a packet burst frame (Data link layer communication), and 10 can identify a PHY burst frame (Physical Layer communication)).

In some embodiments, means for receiving a unidirectional clock signal from a master that is connected to the serial link can include a SERDES transceiver, such as SERDES transceiver 216. In other embodiments, means for receiving a unidirectional clock signal from a master that is connected to the serial link can include a clock receiver, such as clock receiver 350.

In some embodiments, means for transmitting data over the serial link to the master based on the unidirectional clock signal can include a SERDES transceiver, such as SERDES transceiver 216.

Figure 6:
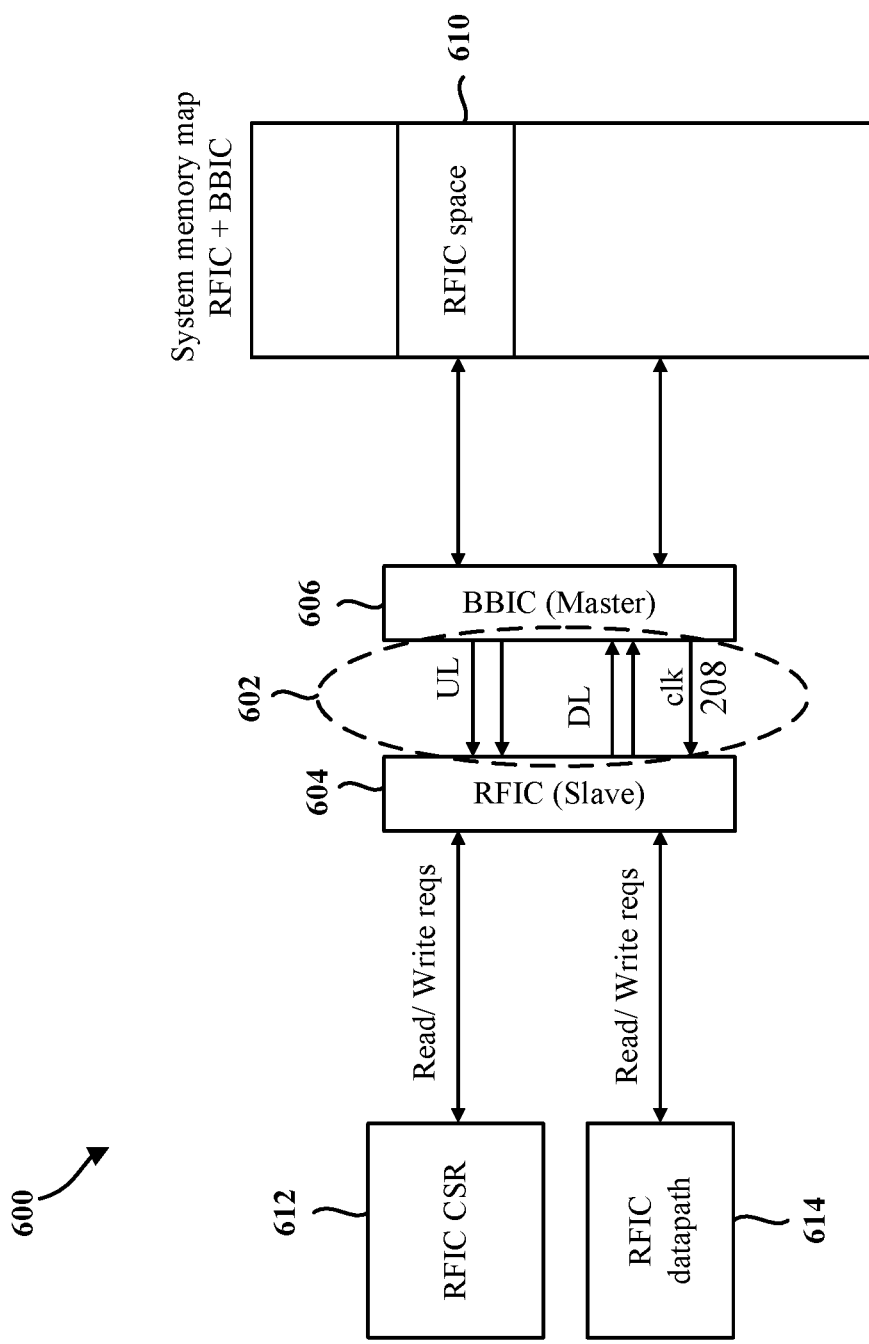
FIG. 6 is a diagram illustrating an example operation performed over a serial interconnect system.

FIG. 6 is a diagram illustrating an example operation 600 performed over a serial interconnect system 602. The serial interconnect system 602 may, for example, provide a low-latency mechanism for a BBIC to access an RFIC memory and registers. A BBIC master 606 may write up to 1024 bits of data to successive RFIC control/status registers (CSRs) 612. Similarly, a BBIC master 606 may request a read transfer of up to 1024 bits of successive RFIC CSR locations 612. All RFIC 604 initiated read and write transfers transferred across the serial interconnect system 602 using a credit based flow-control mechanism that ensures reliable transfers.

The serial interconnect system 602 provides a full-duplex interface (uplink and downlink) between RFIC 604 and BBIC 606 in a modem system. The protocol of the serial interconnect system 602 defines the transport of data and control information in a packetized format. A controller of the serial interconnect system 602 implements the protocol. The SERDES of the serial interconnect system 602 provides a high-speed serial transport mechanism.

Serial data are transported over one or more lane in uplink and downlink directions. All data lanes operate synchronously and share the same nominal bandwidth. Synchronization between transmitter and receiver side of the serial link is ensured by a shared clock 608 that is sent from the BBIC 606 to the RFIC 604. Using a unidirectional clock signal can reduce the power for transmission and reception of data over the serial link, for example, because one fewer PLL is needed. Using a unidirectional clock signal can also reduce the number of pins required for the device.

In a typical baseband, downlink data traffic requires more bandwidth than uplink data traffic. Since bandwidth scales linearly with the number of lanes, the bandwidth requirement may be met by providing more than one data lanes.

Downlink data traffic represents data samples received from an antenna, converted by an ADC in the RFIC 604, filtered, down-sampled and sent to the BBIC 606 over the serial interconnect system 602. Multiple independent data paths 614 exist, namely aggregated carriers within receiver front end (RXFE) and global navigation satellite system (GNSS). Uplink data traffic goes through the transmitter front end (TXFE) data path, which has an overall lower bandwidth requirement than the aggregate downlink data paths. The serial interconnect system 602 is concerned only with the source and the destination of the data so ingress and egress data buffers are external to the serial interconnect system 602. All data is presented to the serial interconnect system 602 via a uniform interface. The data traffic is real-time traffic.

In addition to data traffic, the serial interconnect system 602 also supports control traffic, which comprises accessing memory and CSR locations on the RFIC 604. While control traffic is given priority over the data traffic, control access to RFIC CSRs 612 is not guaranteed fixed latency.

In addition to data and control traffic, the serial interconnect system 602 also provides a link-layer messaging mechanism for exchanging flow-control and interrupt messages. Messages in the serial interconnect system 602 are not directly accessible by upper layers and are consumed in their entirety by the data link layer of the serial interconnect system 602.

Figure 7:
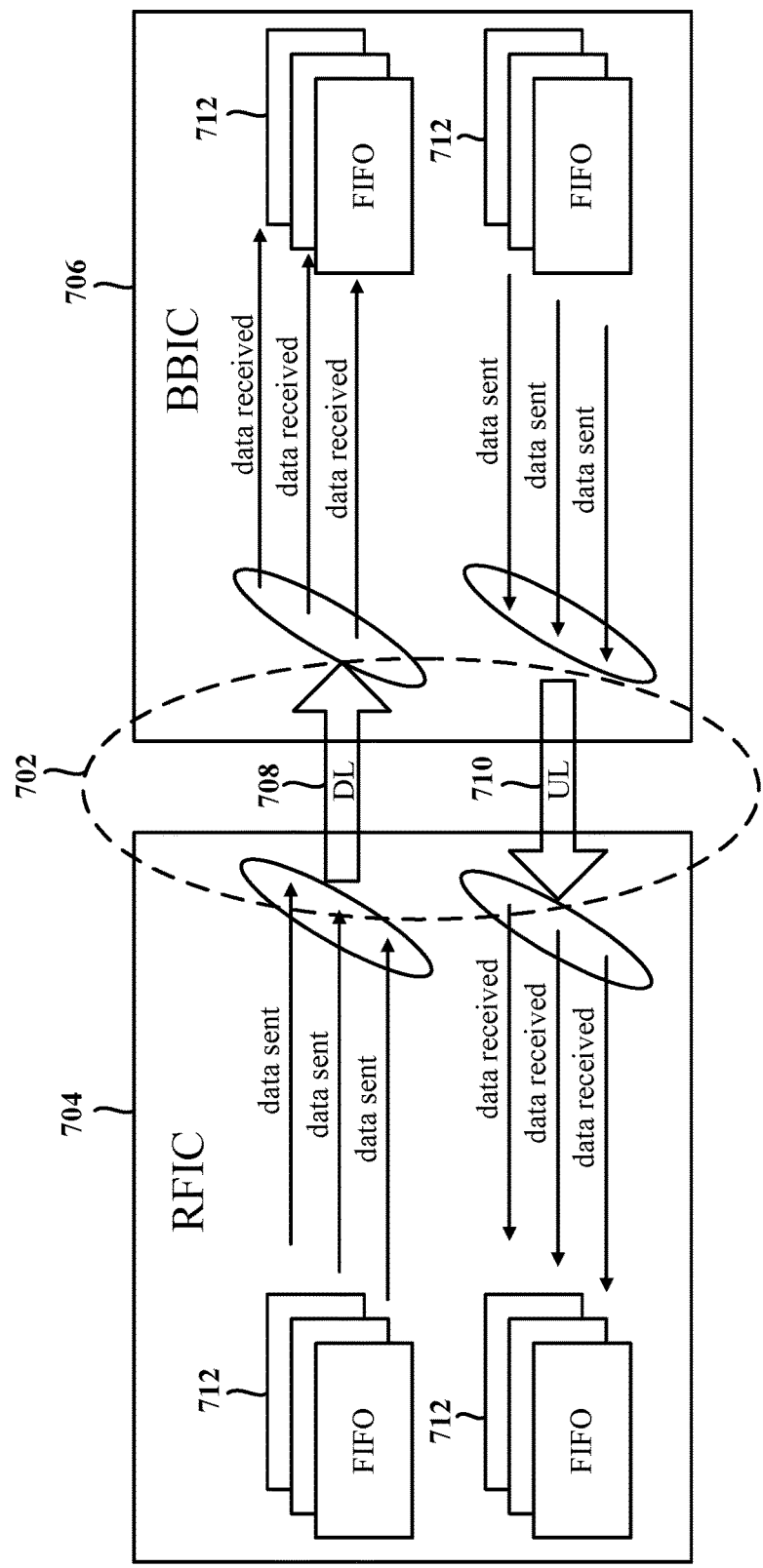
FIG. 7 is a diagram illustrating an example of a high-bandwidth, low-latency serial interconnect system.

FIG. 7 is a diagram illustrating an example of a high-bandwidth, low-latency serial interconnect system 702 optimized for a modem chipset, especially for communication between a BBIC and an RFIC. The serial interconnect system 702 is optimized for low cost, low power and low bit error rate. The main purpose of the serial interconnect system 702 is to transfer data across the link, including uplink (UL) 710 and downlink (DL) 708 between the BBIC 706 and the RFIC 704. The data source and destination points are presented to the serial interconnect system 702 as FIFO interfaces 712. The serial interconnect system 702 is responsible for ensuring reliable exchange of data across the link using token-based flow control mechanisms and retries.

A serial link protocol that is engineered to optimize RF and baseband functions to provide high-speed, low-power serial link communication will now be described with reference to FIGS. 8-12.

Figure 8:
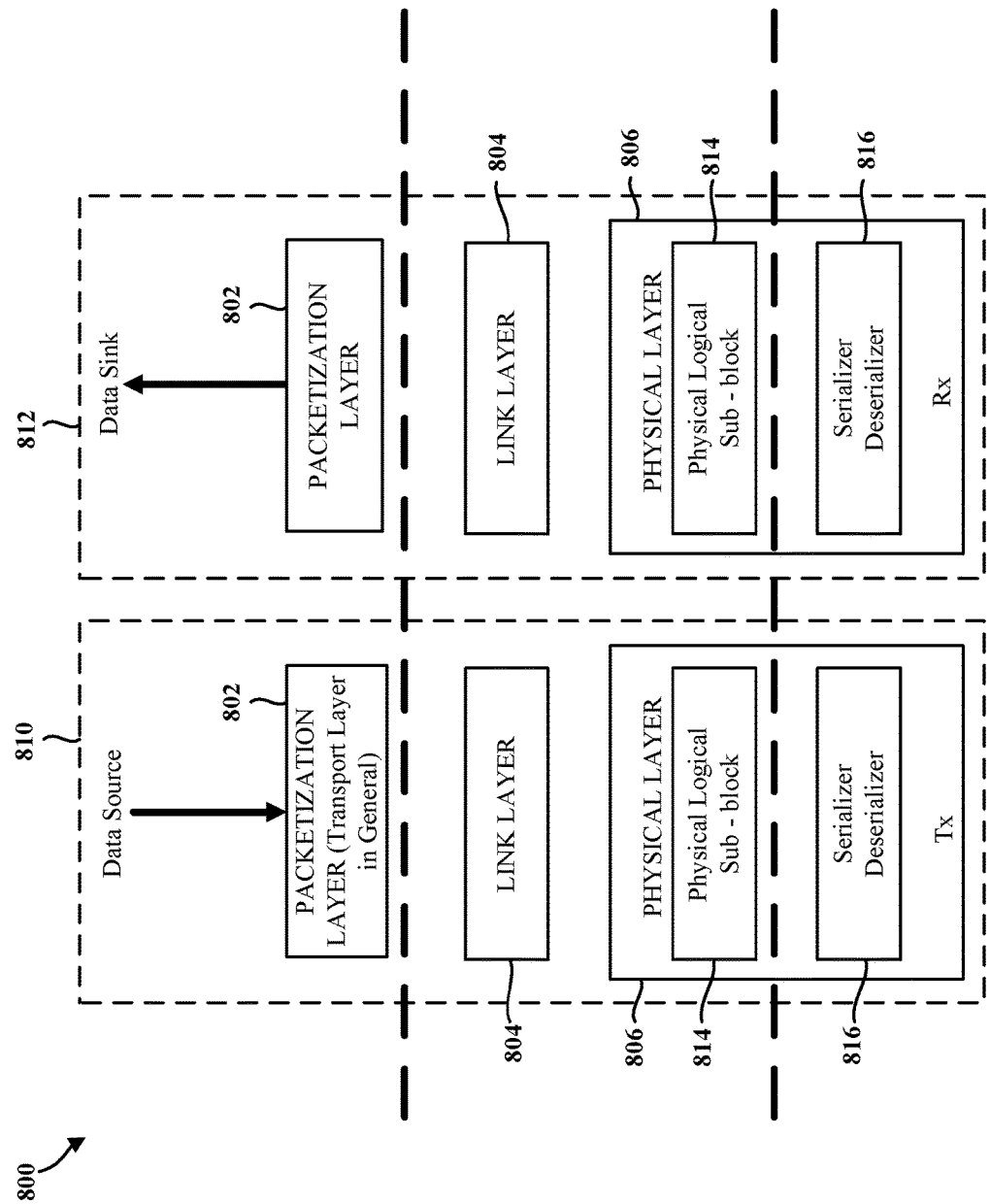
FIG. 8 is a diagram illustrating a layered model that implements a serial interconnect system.

FIG. 8 is a diagram illustrating a layered model that implements a serial interconnect system 800. The serial interconnect system 800 may be, for example, serial links described above with reference to FIGS. 1 and 2. The serial interconnect system 800 uses packets to communicate information between layers. Packets are formed in the packetization layer 802 to carry the information from the data source in the transmitter (Tx) component 810, or to the data sink in the receiver (Rx) component 812. As the transmitted packets flow through the link layer 804 and physical layer 806, the packets are encapsulated with additional information necessary to handle packets at those layers. At the receiving side, the reverse process occurs, and packets get transformed from their physical layer 806 and link layer 804 representation to the form that can be processed by the packetization layer 802 of the receiving device.

The packetization layer 802 is responsible for the following functions: converting between an I/Q stream and fixed-length packet stream for each logical end-point; managing the source/destination address for each UL/DL packet; and issuing read/write requests associated with each UL/DL packet. The DLL 804 is responsible for the following functions: adding a packet header; adding redundant bits for CRC; tracking the flow control credits for packets across the serial link; managing packet acknowledgment (ACK) and retry messages; error checking, error handling, error reporting of DLL packet errors; and handling power state transitions.

The PHY 806 is divided into two sub-blocks: the logical sub-block 814 and the electrical sub-block 816, aka SERDES. The PHY logical sub-block 814 is responsible for the following functions: packing/unpacking DLL packets into blocks and frames; insertion of equalization and synchronization bursts for the SERDES; adding physical layer framing tokens to the DLL packet stream; scrambling and descrambling of DLL packets and PING PHY burst; enforcing PHY layer framing rules at the receiver; and framing and alignment of received bit stream. The SERDES 816 is responsible for the following functions: converting parallel data into serial data at the transmitting device; and converting serial data into parallel data at the receiving device.

In one configuration, the serial interconnect system 800 includes a serial interface with a maximum of 6 Gbps raw bandwidth per lane. The output frequency of PLL may be programmable. Source-synchronous clock may be used for all UL and DL lanes in serial interconnect system 800. Master SERDES has PLL, and forwards clock to slave SERDES. The serial interconnect system 800 may include a double data rate (DDR) clock. The DDR clock may be Up to a maximum of 3 GHz clock for 6 Gbps data rate. The serial interconnect system 800 may include spread-spectrum control (SSC) support (e.g., center-spread or down-spread) for RF de-sensitization. The serial interconnect system 800 includes power-saving states during idle periods. The power states of the serial interconnect system 800 may range from light sleep to deep sleep providing different levels of power/exit latency trade-offs.

In one configuration, the PCS of the serial interconnect system 800 may use 128b/130b encoding scheme, which has lower overhead encoding than 8b/10b encoding used by traditional serial interconnect systems. The serial interconnect system 800 uses 2 bits synchronization symbols, which minimize framing synchronization symbols to determine packet boundaries.

In one configuration, the serial interconnect system 800 uses simple and robust messaging (e.g., patterns defined for link training, scrambler operation, transitions to low-power state, etc.) upon entry and exit of power-saving states. The serial interconnect system 800 may employ multi-lane operation. The serial interconnect system 800 may use lane striping, in which data is sent across all available lanes for optimal bandwidth utilization and robustness against burst errors in packet burst mode.

In one configuration, packet header may contain channel identification (ID), which is protected by CRC. Error detection of the serial interconnect system eliminates risk of packet routing to wrong destination, and triggers retry mechanism. Link ID specifies routing information for each endpoint.

Multiple link IDs may be allocated for data samples and CSR accesses. The serial interconnect system 800 may include side band communication, e.g., one side band signal in each direction to provide a mechanism for reset/wake and error recovery. The serial interconnect system 800 may include ping mode. Ping operation separates bit error rate (BER) profiling at the PHY and DLL layer.

The DLL is responsible for reliably transporting message and data packets across the serial link. The DLL may perform data exchange. For example, the DLL may accept packets for transmission and convey them to physical layer. The DLL may also accept packets received over physical layer and convey the packets to the destination. The DLL may perform error detection and retry. For example, the DLL may perform packet sequence number management for all DLL packets. The DLL may also add CRC protection for all DLL packets. The DLL may perform data integrity checking for packets. For example, the DLL may generate positive and negative acknowledgement. The DLL may also generate error indications for error reporting and logging mechanisms.

The serial interconnect system 800 may include two types of DLL packets: data packet or message packet. Data packet may be used for data transfers as well reads and writes to RFIC CSRs. Message packet may contain messages exchanged between DLL layers across the serial link. Message packet may be used for event signaling and flow-control messaging.

Examples of DL traffic (from slave) in the serial interconnect system 800 may include RFIC slave write request transactions specifying the destination address, write-data (maximum of 1024 bits) and length in double-words, read response data corresponding to a previous BBIC read request (on UL sublink), messages from RFIC DLL entity to BBIC DLL entity for events (EVT) messages for BBIC, RFIC read requests (RD_REQ) messages specifying the source address and length in double-words, and flow control messages to BBIC DLL entity. Examples of UL traffic (to slave) in the serial interconnect system 800 may include, read response data corresponding to a read request (RD_REQ) message issued by the RFIC on the DL sublink, BBIC write requests specifying the destination address, write data (up to 1024 bits) and length in double-words, messages from BBIC DLL entity to RFIC DLL entity, such as events (EVT) messages for RFIC, and BBIC read request (RD_REQ) messages specifying the source address and length in double-words; EVT, and flow control messages to RFIC DLL entity.

All DLL transfers over the serial interconnect system 800 consists of packets.

Figure 9:
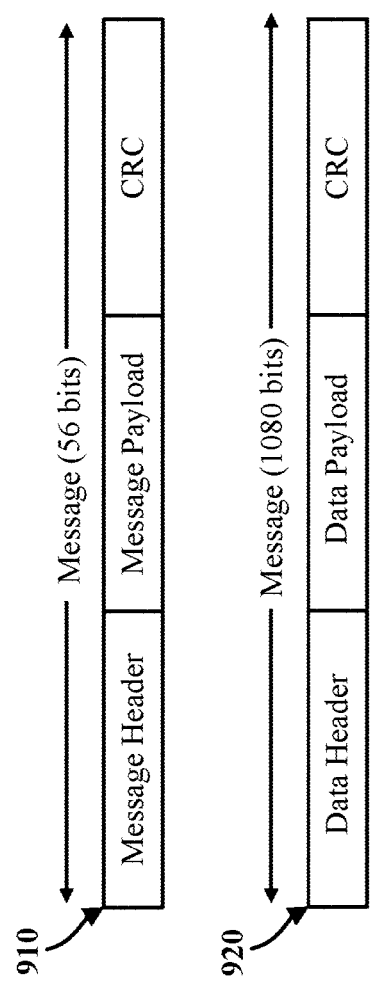
FIG. 9 is a diagram illustrating example packet structures of two types of fixed-length packets.

FIG. 9 is a diagram illustrating example packet structures of two types of fixed-length packets formed by a DLL of a serial link. The two types of packets are a message (MSG) packet 910 (also referred to as a DLL control packet) and a data packet 920.

MSG packet 910 has a fixed length of 56 bits, comprising a 24-bit header, a 16-bit payload, and a 16-bit CRC. The payload of MSG packets 910 can be used to control various aspects of the serial link, and the payload can therefore be referred to as a control message. Once the DLL packetizes the control message, the packetized control message can be referred to as a DLL control packet (i.e., a control message packetized at the DLL level).

Data packet 920 has a fixed length of 1080-bits, comprising a 24-bit header, a 1024 bits payload, and a 16-bit CRC. In various embodiments, message and data packets can be independent and can be multiplexed on the link for transmission, with priority given to the MSG packets. This can allow high priority messages, such as events (EVT), to be transmitted with minimal delay.

An example packet format according to various embodiments is described in Table 1 below:

TABLE 1

| Packet Type | Field | Bit index | No. of bits | Description |
|---|---|---|---|---|
| MSG | type | [3:0] | 4 | Type for MSG: {RD_REQ, EVT, FC/ACK/NACK, Other} |
| | link_id/ sub_type | [7:4] | 4 | Specifies the link_id for the RD_REQ messages; Specifies the 4 MSBs for the event number for EVT type messages; Reserved for all other types |
| | seq_num | [15:8] | 8 | Sequence Number. Updated once for each outgoing message |
| | length/ sub_type | [23:16] | 8 | Specifies the read length in double-words for RD_REQ messages; Specifies the 8 LSBs of the event number for EVT type messages; Reserved for all other types |
| | payload | [39:24] | 16 | For RD_REQ types, the payload carries the 16-bit source address* (rd_addr); For EVT types, the payload carries 16-bits of event data; For all other types, this field carries the message payload |
| | CRC | [55:40] | 16 | 16-bit CRC |
| DATA | type | [3:0] | 4 | Type for {WR_DATA, RD_RESP, Other} |
| | link_id | [7:4] | 4 | Link One of up to 16 logical end-points for the data link layer |
| | seq_num | [15:8] | 8 | Sequence Number |
| | Length | [23:16] | 8 | Length in double-words for the transfer (number-1) of 32 bits words to be transferred For one 32 bits word of data, Length = 0 |
| | Addr | [39:24] | 16 | Destination address of 32 bits Word |
| | payload | [1063:40] | 1024 | Up to 1024 bits of payload |
| | CRC | [1079:1064] | 16 | 16-bit CRC |

Each packet has a message section and a data section. The message and data packets are protected by 16-bit CRC.

The different message types supported according to various embodiments are described in Table 2 below:

TABLE 2

Message Type Encoding

| Value | Description |
|---|---|
| 4'b0001 | Read Request (RD_REQ) |
| 4'b0010 | Event (EVT) |
| 4'b0100 | Other Message |
| 4'b1111 | Flow Control Message |
| All others | Reserved |

The different data transfer types supported in accordance with various embodiments are described in Table 3 below:

TABLE 3

Data types

| Value | Description |
|---|---|
| 4'b0001 | Write Request (WR_REQ) packet |
| 4'b0010 | Read Response (RD_DATA) packet |
| 4'b0100 | Other DATA packet |
| All others | Reserved |

The different data/message sub-types supported in accordance with various embodiments are described in the table 4 below:

TABLE 4

Message sub-type Encoding

| Value | Description |
|---|---|
| 8'h00 | ACK_MSG |
| 8'h01 | ACK_DATA |
| 8'h08 | NACK_MSG |
| 8'h09 | NACK_DATA |
| All others | Reserved |

The DLL layer defines up to 16 logical end points in each direction. Each end-point is allocated a fixed "link_id". All packets associated with an end-point use this "link_id". All data packets with link ids between 1 and 15 are treated as one class of bulk transfers. Data packets with link_id set to zero are used for CSR reads and writes. CSR accesses are given priority over the link compared to data packets from other end-points. The different link identifiers supported in accordance with various embodiments are described in the table 5 below:

TABLE 5

Link Identifiers

| Link_ID value | UL Path | DL Path |
|---|---|---|
| 4'h0 | Control, AHB R/W | Control, AHB R/W |
| 4'h1 | TxFE-0 | GNSS |
| 4'h2 | TxFE-1 | RxFE-0 |
| 4'h3 | Reserved | RxFE-1 |
| 4'h4 | Reserved | RxFE-2 |
| 4'h5 | Reserved | RxFE-3 |
| 4'h6 | Reserved | RxFE-4 |
| 4'h7 | Reserved | RxFE-5 |
| 4'h8 | Reserved | RxFE-6 |
| 4'h9 | Reserved | RxFE-7 |
| 4'hA | Reserved | RxFE-8 |
| 4'hB | Reserved | RxFE-9 |
| 4'hC | Reserved | FBRX |
| 4'hD | Reserved | RefLog |
| 4'hE | Reserved | Reserved |
| 4'hF | Sequencer communication | Sequencer communication |

The DLL uses sequence numbers for flow control on each sublink. MSG and DATA packets use separate sequences number. Sequence numbers are added to each packet by the transmitter and checked by the receiver.

Figure 10:
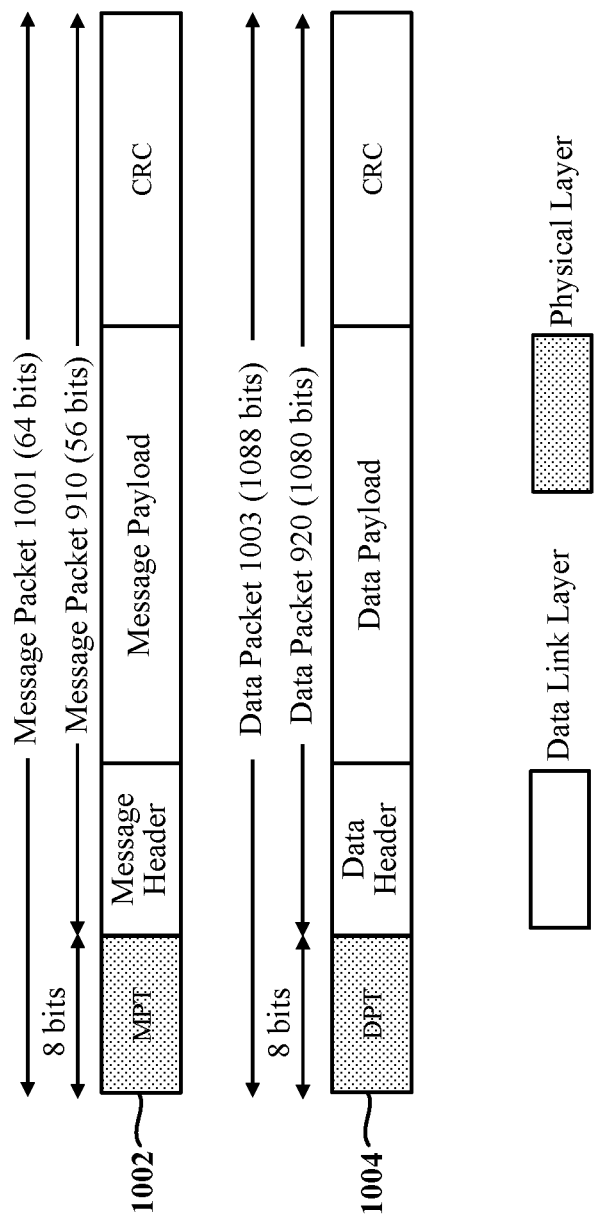
FIG. 10 is a diagram illustrating an example packet burst structure at the physical layer.

FIG. 10 is a diagram illustrating an example packet burst structure at the PHY in accordance with various embodiments. As shown, at the PHY, MSG packet 910 from the DLL can be further packetized by adding an 8-bit MPT token 1002 in front to create a MSG packet 1001, which can be referred to as a PHY control packet. Thus, the total length of MSG packet 1001 is 64 bits (i.e., 8-bit MPT token 1002 length plus 56-bit MSG packet 910 length).

Similarly, an 8-bit DPT token 1004 is placed in front of data packet 920 (1080 bits) from the DLL to form an data packet 1003. Thus, the total size of data packet 1003 is 1088 bits.

Figure 11:
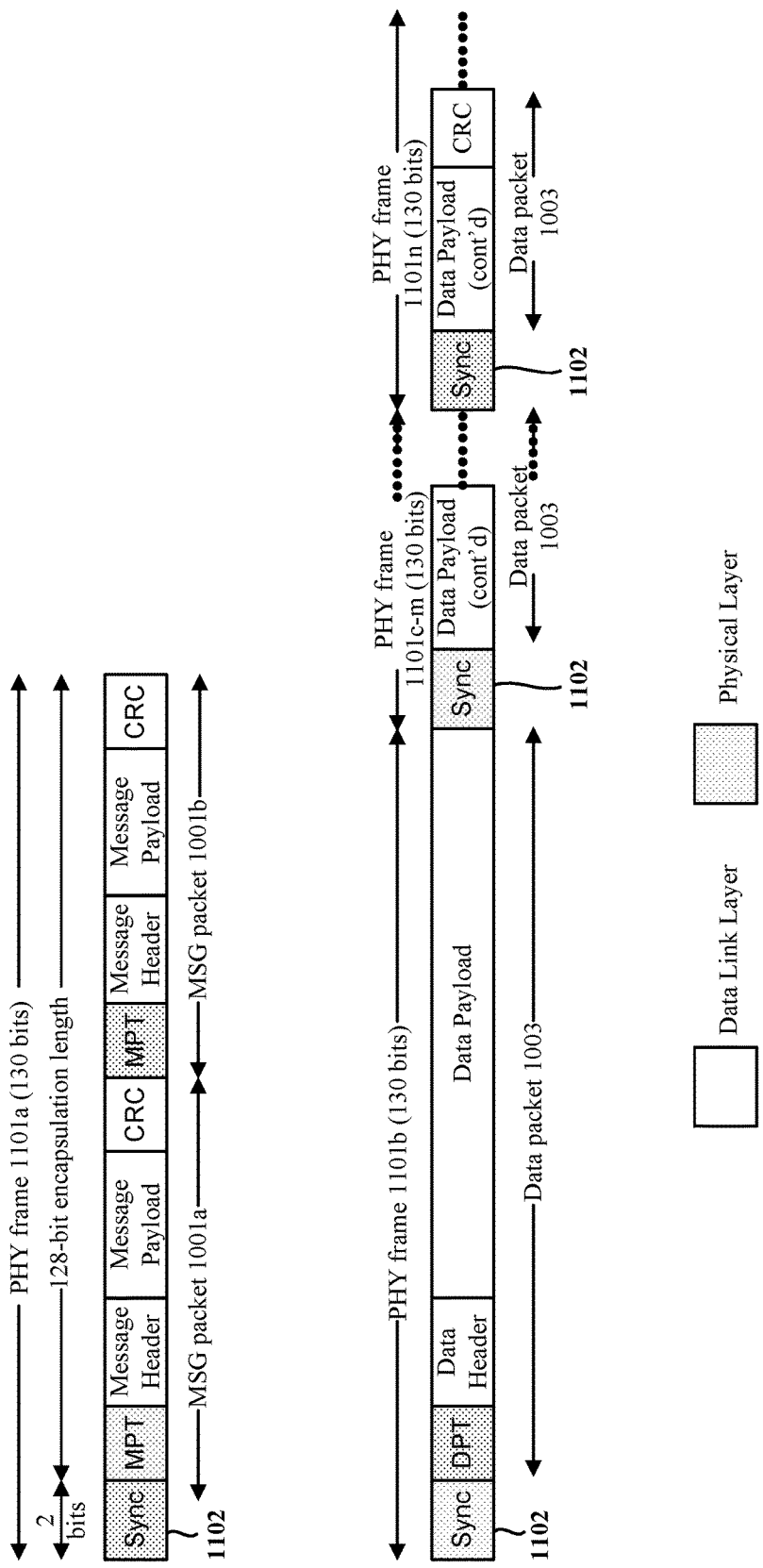
FIG. 11 is diagram illustrating an example 128/130b encoding of message and data packet at the physical layer.

FIG. 11 is diagram illustrating an example 128/130b encoding of message and data packet at the physical layer with dual message framing in accordance with various embodiments. In the 128b/130b encoding shown in FIG. 11, exactly two MSG packets 1001 can fit into a single 130-bit PHY frame 1101. In other words, an encapsulation length of the 128b/130b encoding is 128 bits, which is exactly twice the length of the PHY control packet (i.e., MSG packet 1001). This dual message framing can help increase the efficiency of the message transmission. In particular, in a system in which messages are given a high priority, no more than two messages will be waiting in a queue for transmission slots at any given time.

As shown in FIG. 11, encoding at the physical layer includes forming a frame by adding a 2-bit packet burst synchronization symbol 1102 in front of a first MSG packet 1001a, which is placed in front of a second encapsulated MSG packet 1001b to form 130-bit PHY frame 1101. PHY frame 1101 can be sent immediately with all of the payload space filled because the two 64-bit MSG packets fit exactly into the 128-bit encapsulation length of the PHY frame.

FIG. 11 also shows a single data packet 1003 packetized into multiple PHY frames 1101b-n, with data packet 1003 being divided into multiple portions and the portions inserted into the multiple, successive PHY frames 1101b-n. As shown in FIG. 11, PHY frame 1101b includes synchronization symbol 1102, along with the DPT, the data header, and a portion of the data payload of data packet 1003. Each of PHY frames 1101c-m includes synchronization symbol 1102 and a portion of the data payload of data packet 1003.

PHY frame 1101n includes synchronization symbol 1102, along with the last portion of the data payload and the CRC of data packet 1003, which do not fill the entire 128 bit encapsulation length of PHY frame 1101n. Therefore, PHY frame 1101n has additional space to fit more data or messages.

The serial interconnect system allows for byte striping (also known as data interleaving) across multi-lane sublinks when in packet burst mode. Data transmitted on more than one lane is interleaved, meaning that each byte in the transfer is sent in successive lanes. This disclosure refers to this interleaving as byte striping. Striping requires additional hardware complexity to deskew the incoming striped bytes, but striping can significantly reduce the latency in a manner proportional to the transfer length of the packet burst and the number of lanes being utilized for the data transfer.

Figure 12:
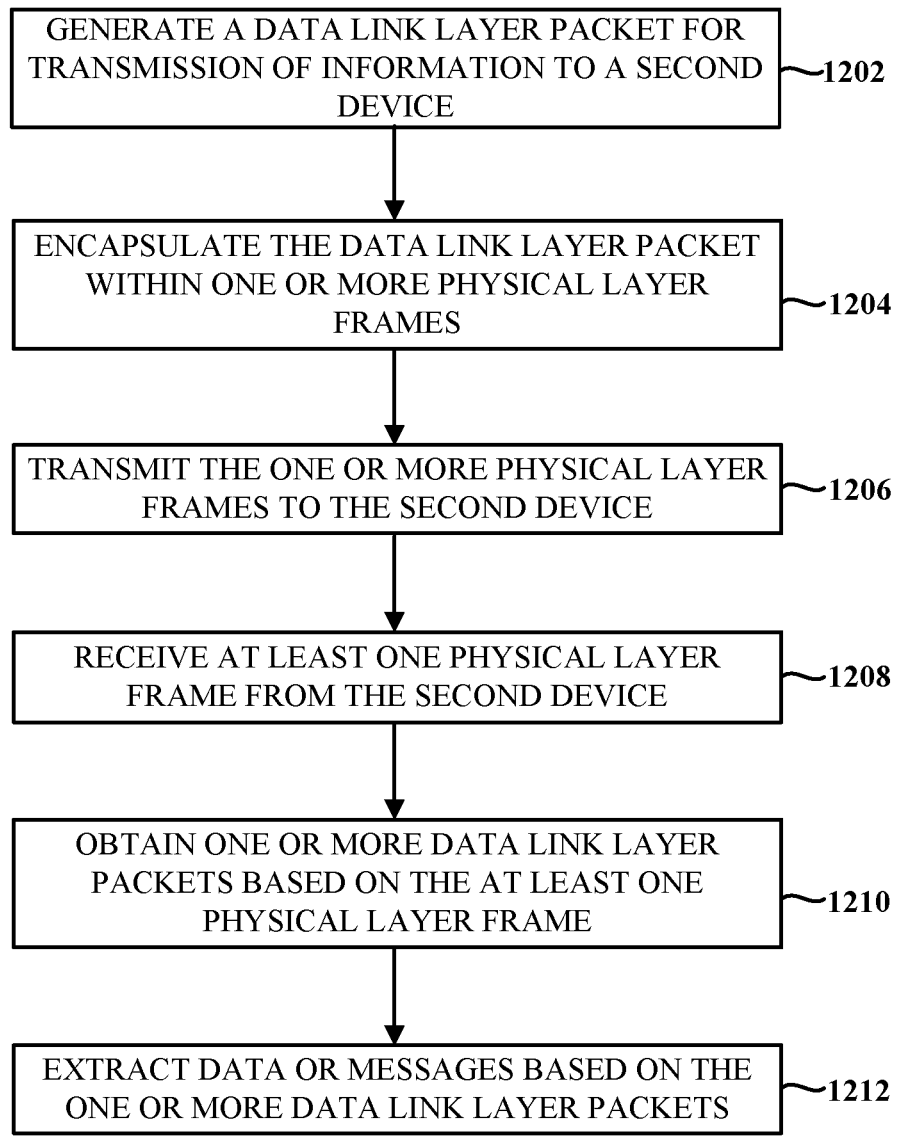
FIG. 12 is a flowchart of a method of performing serial point-to-point interconnection.

FIG. 12 is a flowchart of a method of performing serial point-to-point interconnection. The method may be performed by a first device, such as link slave 202 or link master 204 of FIG. 2. At 1202, the first device generates a data link layer packet for transmission of information to a second device. In one configuration, the DLL packet may be generated by link layer 604 of FIG. 6 based on the packet structures described above with reference to FIG. 9.

At 1204, the first device encapsulates the data link layer packet within one or more physical layer frames. In one configuration, a physical layer frame may be generated by physical layer 606 of FIG. 6 based on the structure described above with reference to FIG. 10. In one configuration, each of the one or more physical layer frames includes a synchronization symbol. A ratio of the length of the synchronization symbol to the length of a physical layer frame may be less than 2 to 10.

At 1206, the first device transmits the one or more physical layer frames to the second device. For example, the first device can be link slave 202 of FIG. 2 and the second device can be link master 204 of FIG. 2. In such configuration, the first device receives a clock signal from the second device. For example, link slave 202 can receive clock signal 205 from link master 204. The transmitting of the one or more physical layer frames may be based on the clock signal. The clock signal is unidirectional. Thus, the first device refrains from transmission of a clock signal to the second device.

At 1208, the first device receives at least one physical layer frame from the second device. At 1210, the first device obtains one or more data link layer packets based on the at least one physical layer frame, for example, by processing in link layer 604 of FIG. 6. At 1212, the first device extracts data or messages based on the one or more data link layer packets.

In one configuration, a data link layer packet is a data packet for data transfers. The length of the data packet is 1080 bits and the data packet includes a 24-bit header, a 1024 bits payload, and a 16-bit CRC. In one configuration, a data link layer packet is a message packet for event signaling and flow-control messaging. The length of the message packet is 56 bits and the message packet includes a 24-bit header, a 16-bit payload, and a 16-bit cyclic redundancy check (CRC).

In one configuration, all message packets may be streamed across a single virtual message channel and all data packets may be streamed over a virtual data channel. In such configuration, the virtual message channel and the virtual data channel may use independent flow-control mechanisms. The virtual message channel may employ implicit acknowledgment for flow control and the virtual data channel may employ a credit based flow control.

In one configuration, each physical layer frame is 130 bits long and includes a 2-bit synchronization symbol. The 2-bit synchronization symbol is outside of the data link layer packet. The 2-bit synchronization symbol may indicate one of two operating modes for the physical layer: a packet burst or a physical layer burst. The packet burst is used for data link layer communication between the first device and the second device. The physical layer burst is used for physical layer communication. In one configuration, at least one physical layer frame may further include an 8-bit token, which differentiates packet types for the packet burst and differentiates physical layer communication types for the physical layer burst. In one configuration, the physical lane frames are transmitted or received over one or more physical lanes.

Figure 13:
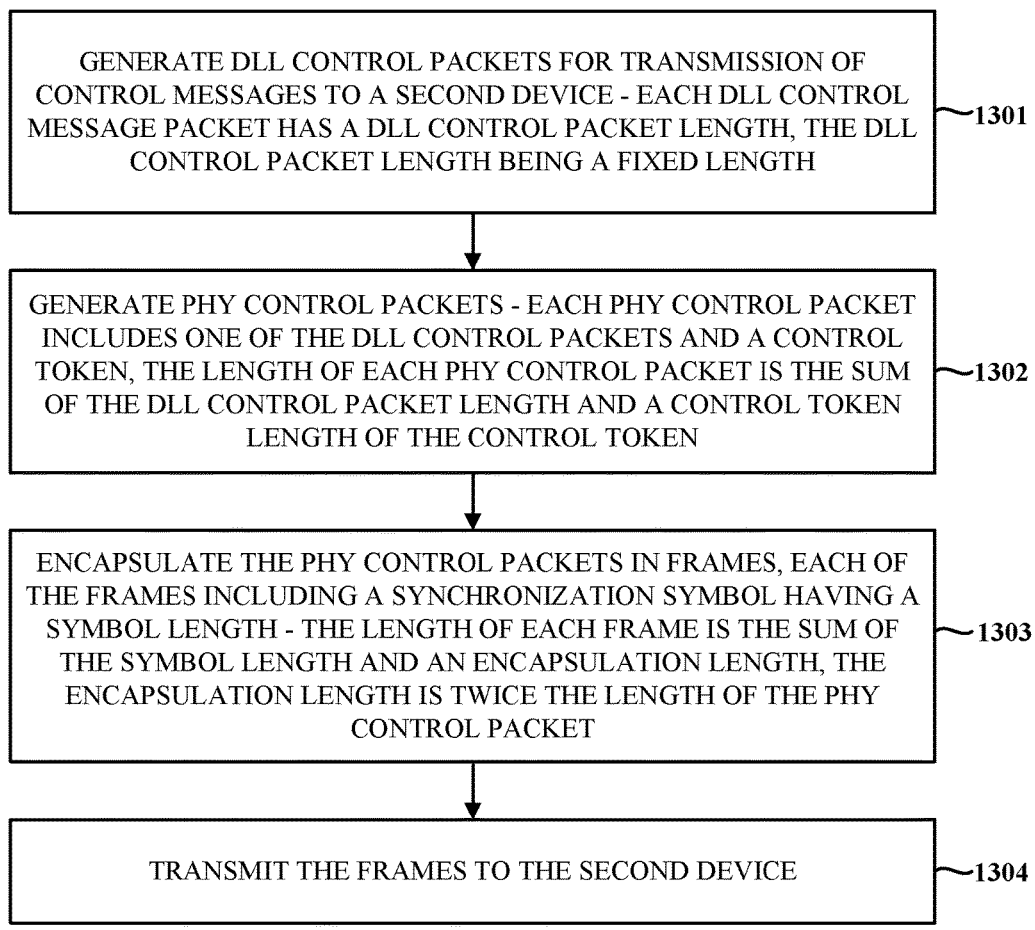
FIG. 13 is a flowchart illustrating a method of an example protocol.

FIG. 13 is a flowchart illustrating a method of an example protocol of encoding message and data packet at the physical layer with dual message framing in accordance with various embodiments. The method of FIG. 13 could be performed, for example, by an RFIC or BBIC described above. The device can generate (1301) DLL control packets for transmission of control messages to a second device. For example, the DLL control packets can be MSG packets 910 of FIG. 9. Each DLL control packet can have a DLL control packet length, the DLL control packet length being a fixed length. For example, the fixed length of MSG packet 910 is 56 bits. The device generates (1302) PHY control packets. Each PHY control packet includes one of the DLL control packets and a control token. The length of each PHY control packet is the sum of the DLL control packet length and a control token length of the control token. For example, the PHY control packet can be MSG packet 1001 of FIG. 10, which includes a 56-bit MSG packet 910 and an 8-bit MPT token 1002 for a total length of 64 bits. The device encapsulates (1303) the PHY control packets in frames. Each of the frames includes a synchronization symbol having a symbol length. The length of each frame is the sum of the symbol length and an encapsulation length, and the encapsulation length is twice the length of the PHY control packet. For example, PHY frame 1101 includes synchronization symbol 1102 of 2 bits, and further includes two 64-bit MSG packets 1001 in an encapsulation length of 128 bits. The device transmits (1304) the frames to the second device. In some embodiments, a ratio of the encapsulation length to the length of each frame is 64/65, for example, in the 128b/130b encoding described above.

In some embodiments, the synchronization symbol indicates one of two operating modes for the PHY. The operating modes include a packet burst used for data link layer communication between the device and the second device, and a physical layer burst used for physical layer communication. In some embodiments, the DLL control packet length is 56 bits, and the control token length is 8 bits.

In some embodiments, the device can further generate DLL data packets for transmission of data to the second device, where the data is obtained with a read request from a memory, the read request returning a fixed data length of the data. Further more, each DLL data packet can include a data payload having a data payload length that is a multiple of the data length of the data returned by the read request. The device can generate PHY data packets, where each PHY data packet includes one DLL data packet and a data token, and the device can encapsulate the PHY data packets in the frames. In some embodiments, the data payload length is 1024 bits.

Means for generating DLL control packets for transmission of control messages to a second device can include a DLL, such as DLLs 212 and 222.

Means for generating physical layer (PHY) control packets can include a PHY, such as PHYs 217 and 223.

Means for encapsulating the PHY control packets in frames can include a PHY, such as PHYs 217 and 223.

In some embodiments, means for transmitting the frames to the second device can include SERDES transceivers, such as SERDES transceivers 216 and 218.

Figure 14:
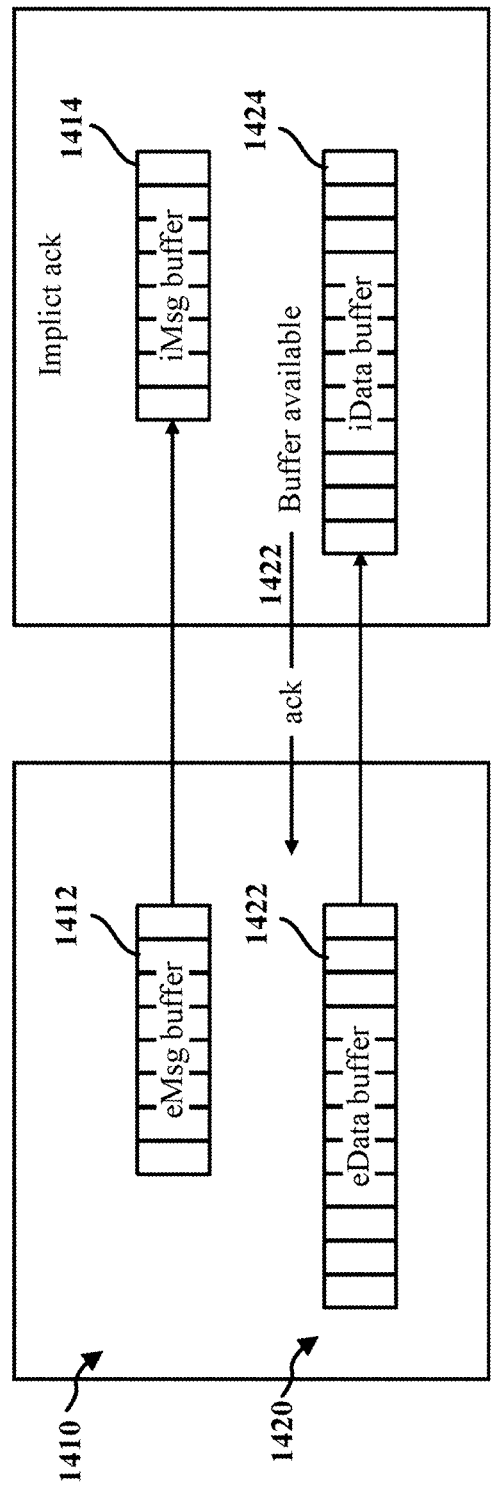
FIG. 14 is a diagram illustrating an example flow control mechanism for a serial interconnect system.

FIG. 14 is a diagram illustrating an example flow control mechanism for a serial interconnect system according to various embodiments. DATA transfers 1420 implement a bulk acknowledge scheme, wherein an ACK MSG 1422 is sent once the credit for the traffic class has been exhausted. The receiver also compares the sequence number of each DATA packet and sends a negative acknowledgment (NACK) message to the DLL if the receiver detects an unexpected sequence number.

The acknowledgement policy for MSG packets 1410 is a little different. All MSG packets share a common sequence number. The receiver implicitly acknowledges each MSG packet and sends a retry message only in the event that the receiver detects a sequence number error for MSG packets. All messages following the last correctly received MSG must be discarded by the receiver and retried by the transmitter. The link layer control (LLC) can maintain a deep enough message buffer to cover the worst-case round-trip delay between the transmitting and receiving DLL entities.

The serial interconnect system is a point-to-point communication channel between the RFIC and the BBIC. ACK messages are used for credit-based flow control communication. Flow control occurs independently between MSG and DATA channels of the frame package. The message (MSG) and data (DATA) channels use independent flow-control mechanisms. All read requests event messages, and other messages packets are arbitrated and streamed across a single virtual message channel. All write requests and read response packets are arbitrated and streamed over the DATA virtual data channel. The link id field is used to distinguish between data and CSR accesses. Grouping all data traffic into a single credit-ACK queue allows for more efficient buffer management and lower overhead of ACK responses. Treating CSR accesses as a separate traffic class enables low-latency transfers of control traffic across the serial link by avoiding head-of-line blockage due to data packets.

The serial interconnect system can use a credit based flow control to make sure that before a packet can be sent across the link, the receiving side has sufficient buffer space to accept the packet. As described earlier, the two sides of the interconnect exchanges MSG and DATA packets. MSG and DATA are independent, which must arbitrate for transmit access over the serial link. The transmission credit is initialized to a maximum value upon power-up or reset. The RFIC shall decrease its DATA channel credit every time a data packet is transmitted from the RFIC to the BBIC. The BBIC will process the data packets and transmit to the RFIC an ACK MSG periodically to acknowledge all correctly received DATA packets. Upon receiving an ACK message the RFIC updates its credit counter. A similar mechanism applies to CSR DATA channel.

In contrast, MSG transfers 1410 do not necessarily employ a credit based ACK scheme. Instead, all MSG packets are assumed to be received correctly. NACK messages are sent whenever an unexpected MSG sequence number is found by the receiving DLL entity.

For robust exchange of data and control information, two mechanisms can be built into DLL packet. Each DLL packet has 16-bit CRC, and the CRC is checked against expected CRC once the packet is received. Also, both MSG and DATA portion carries an 8-bit Seq_num field, which is sequentially incremented and maintained independently on MSG and DATA channel when packet is assembled at transmitter side; and the receive side checks received MSG/DATA Seq_num to make sure that there are no dropped MSG or DATA. Whenever CRC error or out-of-order MSG/DATA Seq_num is detected, receive side shall report the error status to transmitter side. Upon receiving this error report, the transmitter side will try re-send MSG/DATA.

This error reporting and retry mechanism may require transmitter side retain the buffer of MSG/DATA even after those MSG/DATA have been sent, just in case error occurs on the link and they were not successfully received. On the other hand, receive side may report to transmitter side when MSG/DATA are successfully received and pushed into iMSG/iDATA buffer 1414/1424 so that transmitter side can release locations occupied by those MSG/DATA and free up space on its eMSG/eDATA buffer 1412/1422. With sufficient eMSG and eDATA buffers on both sides of the serial interconnect, and little push-back on popping of iMSG or iDATA buffers on both sides, flow control (FC) message may serve as a conservative and frequent status report on correctly received MSG/DATA, and transmitter side may only need to retain contents between Credit_ptr and Wr_ptr.

Special message type NACK is defined for reporting error on received packet and for request retry. An example definition of NACK message in accordance with various embodiments is illustrated in Table 6:

TABLE 6

NACK message definition

| Field | Bit index | No. of bits | Description |
|---|---|---|---|
| type | [3:0] | 4 | Type for MSG = 4'hF |
| link_id | [7:4] | 4 | link_id for MSG = 0 |
| seq_num | [15:8] | 8 | seq_num for MSG = 0 (NACK message does not go into eMSG buffer) |
| payload | [55:16] | 39 | Usage:<br>[23:16] = MSG channel iMSG buffer Wr_ptr pointed Seq_num,<br>[24] = MSG channel iMSG buffer Wr_ptr pointed Seq_num valid (bit [23:16] valid)<br>[39:32] = DATA channel iDATA buffer Wr_ptr pointed Seq_num.<br>[40] = DATA channel iDATA buffer Wr_ptr pointed Seq_num valid (bit[39:32] valid)<br>[55:41] = reserved |

To make sure NACK message is conveyed to the other side, each generated NACK message may be subject to triple transmission protection: transmitter transmits the same NACK message three times; and receiver may combine and merge three consecutive NACK MSGs to form a retry action. If CRC failed on any of the three NACK messages, the failed payload will be thrown out and not used at the payload combining.

Figure 15:
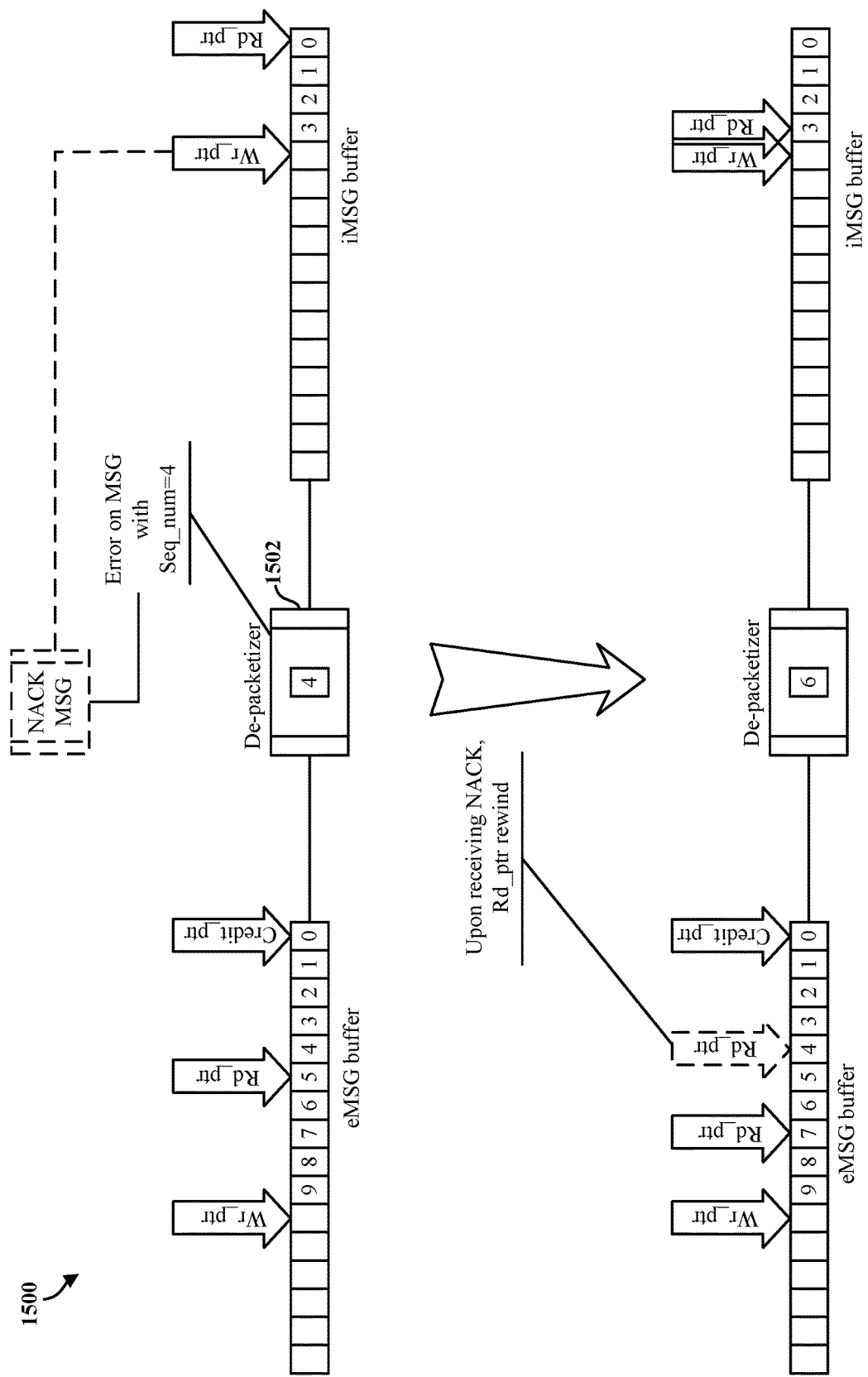
FIG. 15 is a diagram illustrating an example of NACK message and retry process on MSG channel.

FIG. 15 is a diagram illustrating an example of NACK message and retry process on MSG channel according to various embodiments. NACK message on DATA channel is similarly handled. Note that once the remote DLL entity detects an error on one received packet, later packets on the same channel will not be pushed into iMSG/iDATA buffer until triple transmission of the NACK message is done, and then the subsequently received MSG/DATA is correct and has sequential seq_num to the last pushed in MSG/DATA.

In this example, the de-packetizer 1503 on the receiver side of the serial interconnect detects extracts a MSG whose seq_num is 4. An error is detected on that that MSG. The receiver side then generates a NACK message to indicate the error on MSG with seq_num equals to 4. Upon receiving the NACK message, the transmitter side rewind Rd_ptr to point to MSG 4 for retry/retransmission.

The NACK/retry process described in FIG. 15 may protect essential message and data exchanged by two sides of the serial interconnect. However, if error occurs on packet that contains FC message, there is no retry on FC messages since they are not pushed into eMSG buffer during transmission. To protect the mixed messages including FC messages, the following protocol may be added: if one side detects error on a packet, and issues NACK message, while NACK message is being transmitted, the side still needs to process correctly received FC messages if any; when the opposite side receives the NACK message, the opposite side shall respond by an immediate transmission of FC message. FIGS. 16-20 below illustrate this NACK-FC-retry protocol.

Figure 16:
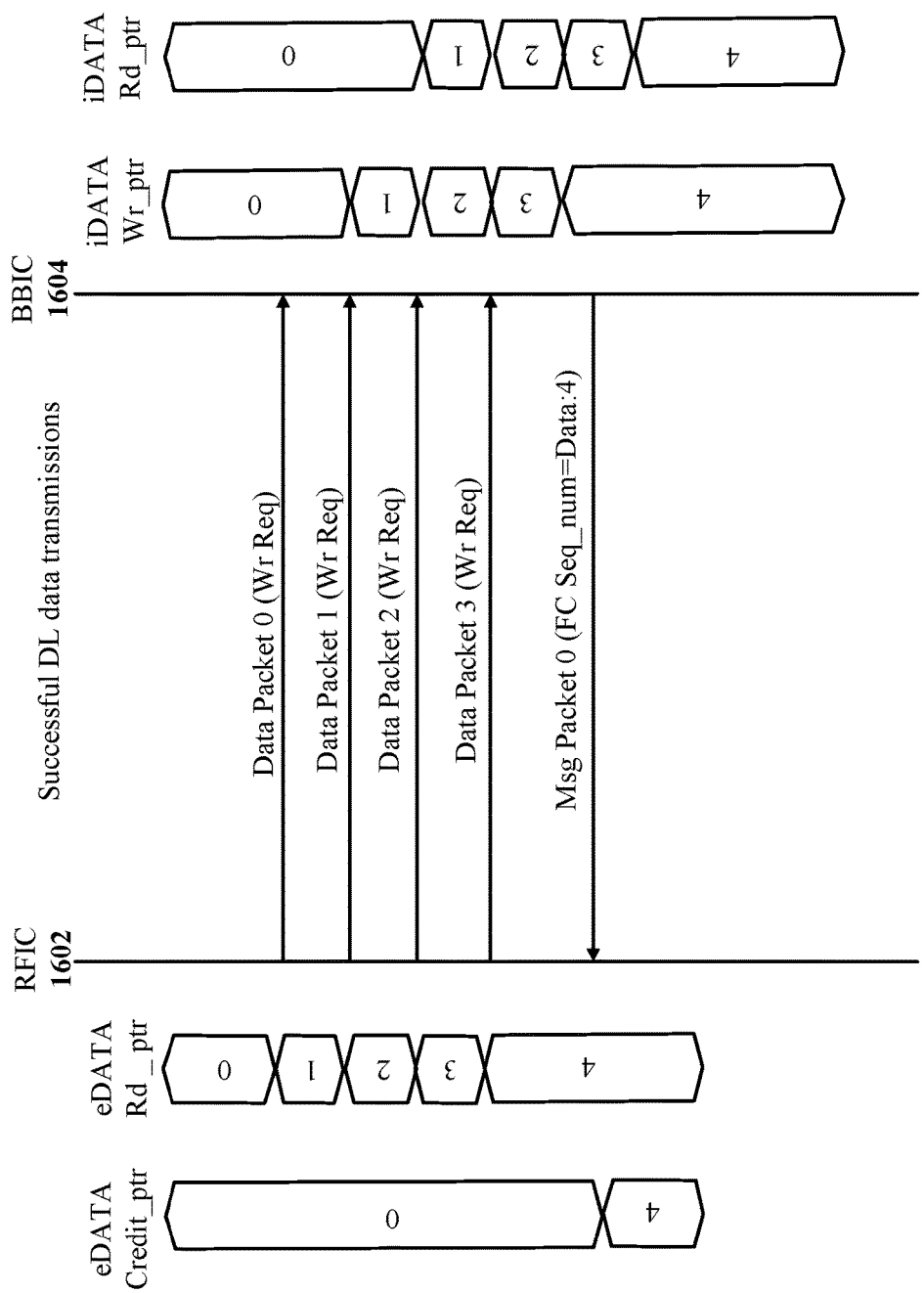
FIG. 16 is a diagram illustrating an example of successful data transmission.

FIG. 16 is a diagram illustrating an example of successful data transmission in accordance with various embodiments. In this example, upon successful reception of data packets 0-3 at a BBIC 1604, the BBIC sends a message packet 0 to an RFIC 1602. The message packet 0 indicates that the BBIC 1604 has received data packets 0-3 and the expected seq_num of the next data packet to be received at the BBIC 1604 is 4.

Figure 17:
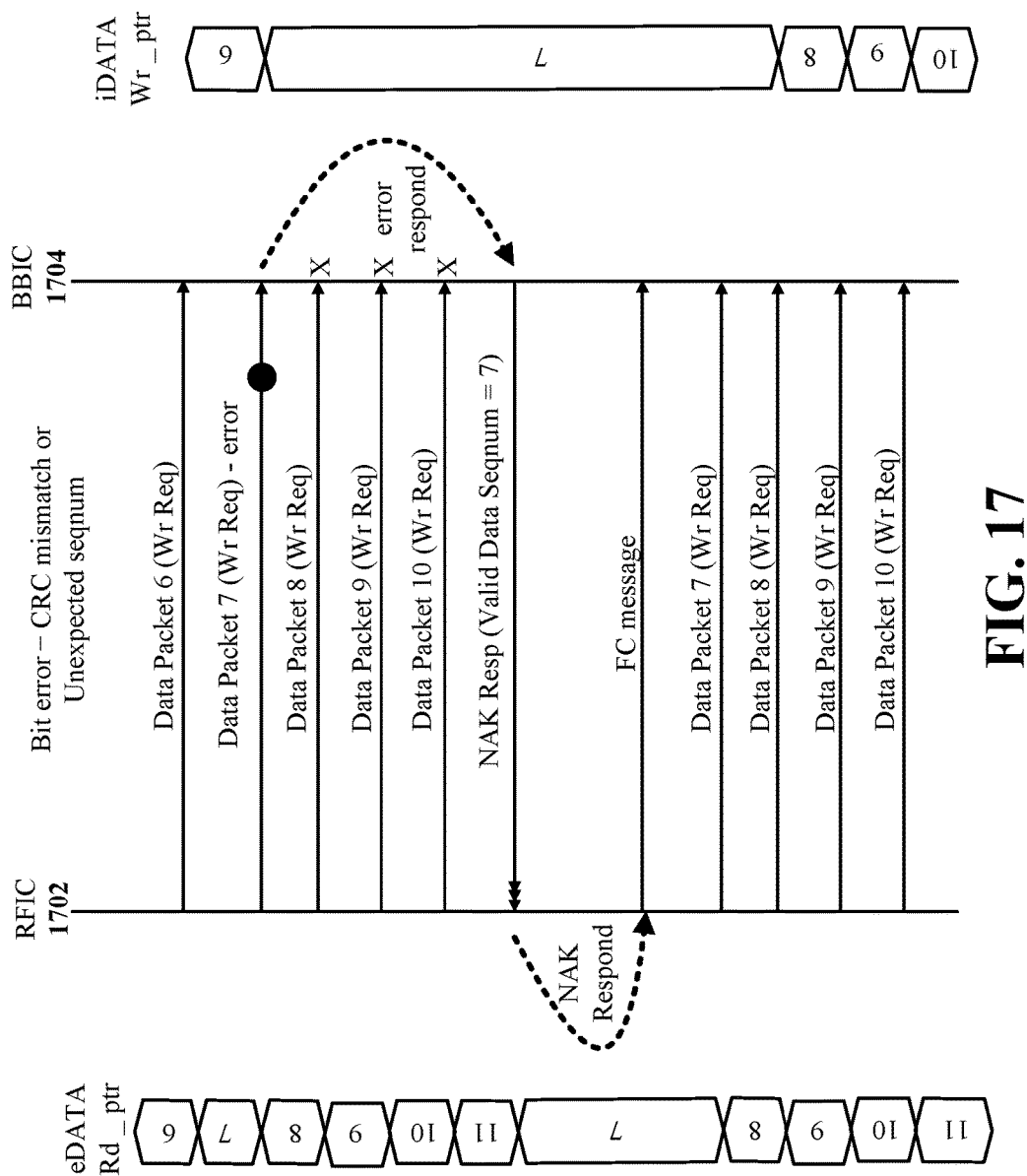
FIG. 17 is a diagram illustrating an example of error and retry on downlink data transmission.

FIG. 17 is a diagram illustrating an example of error and retry on downlink data transmission in accordance with various embodiments. In this example, an RFIC 1702 sends data packets 6-10 to a BBIC 1704 in sequence. During the transmission of data packet 7, a bit error (e.g., CRC mismatch or unexpected seq_num) occurs. In response to the bit error on data packet 7, the BBIC 1704 discards the received data packets 8-10 and sends a NACK message to indicate the error on data packet 7. Upon reception of the NACK message at the RFIC 1702, the RFIC sends a FC message to the BBIC 1704. Subsequently, the RFIC 1702 re-sends data packets 7-10 to the BBIC 1704.

Figure 18:
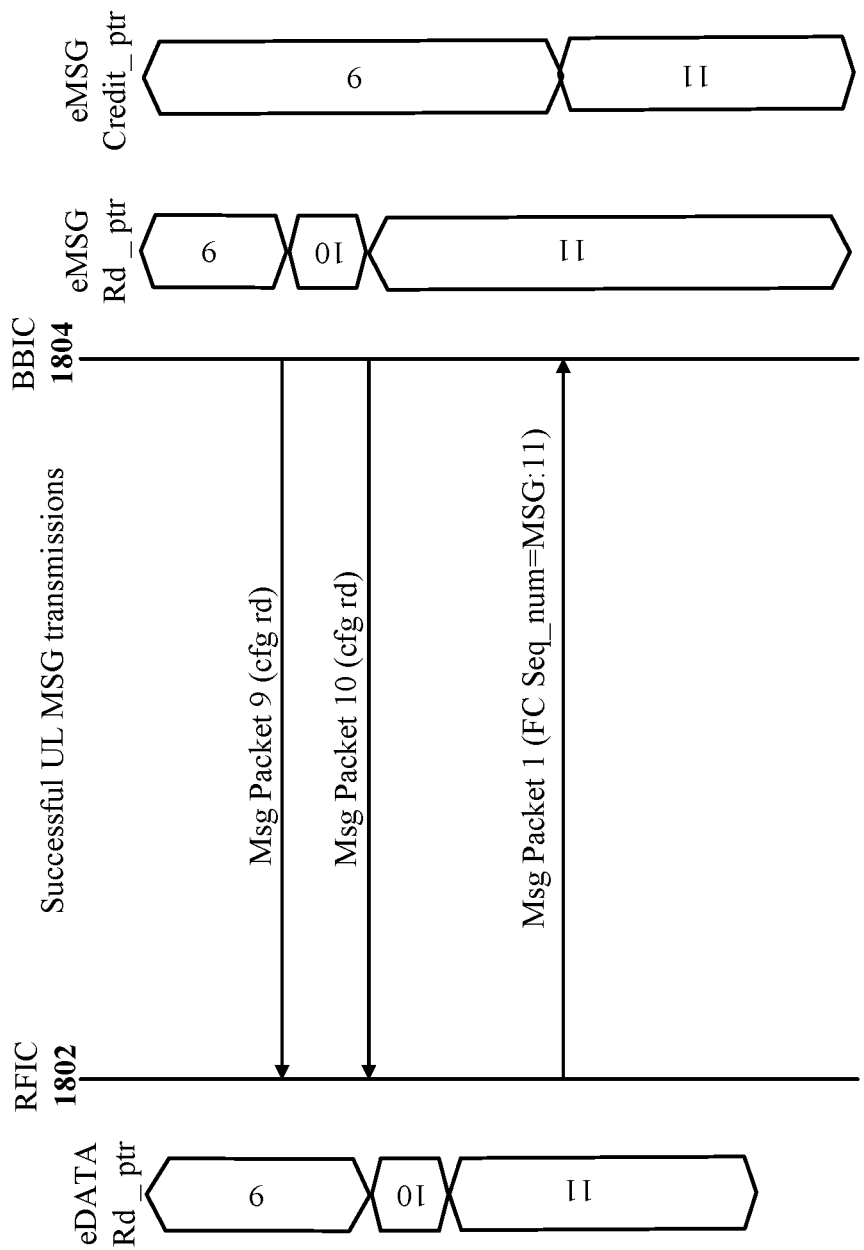
FIG. 18 is a diagram illustrating an example of successful uplink message transmission.

FIG. 18 is a diagram illustrating an example of successful uplink message transmission in accordance with various embodiments. In this example, upon successful reception of message packets 9 and 10 at an RFIC 1802, the RFIC sends a message packet 1 to a BBIC 1804. The message packet 1 indicates that the RFIC 1802 has received message packet up to sequence number 10 and the expected seq_num of the next message packet to be received at the RFIC 1802 is 11.

Figure 19:
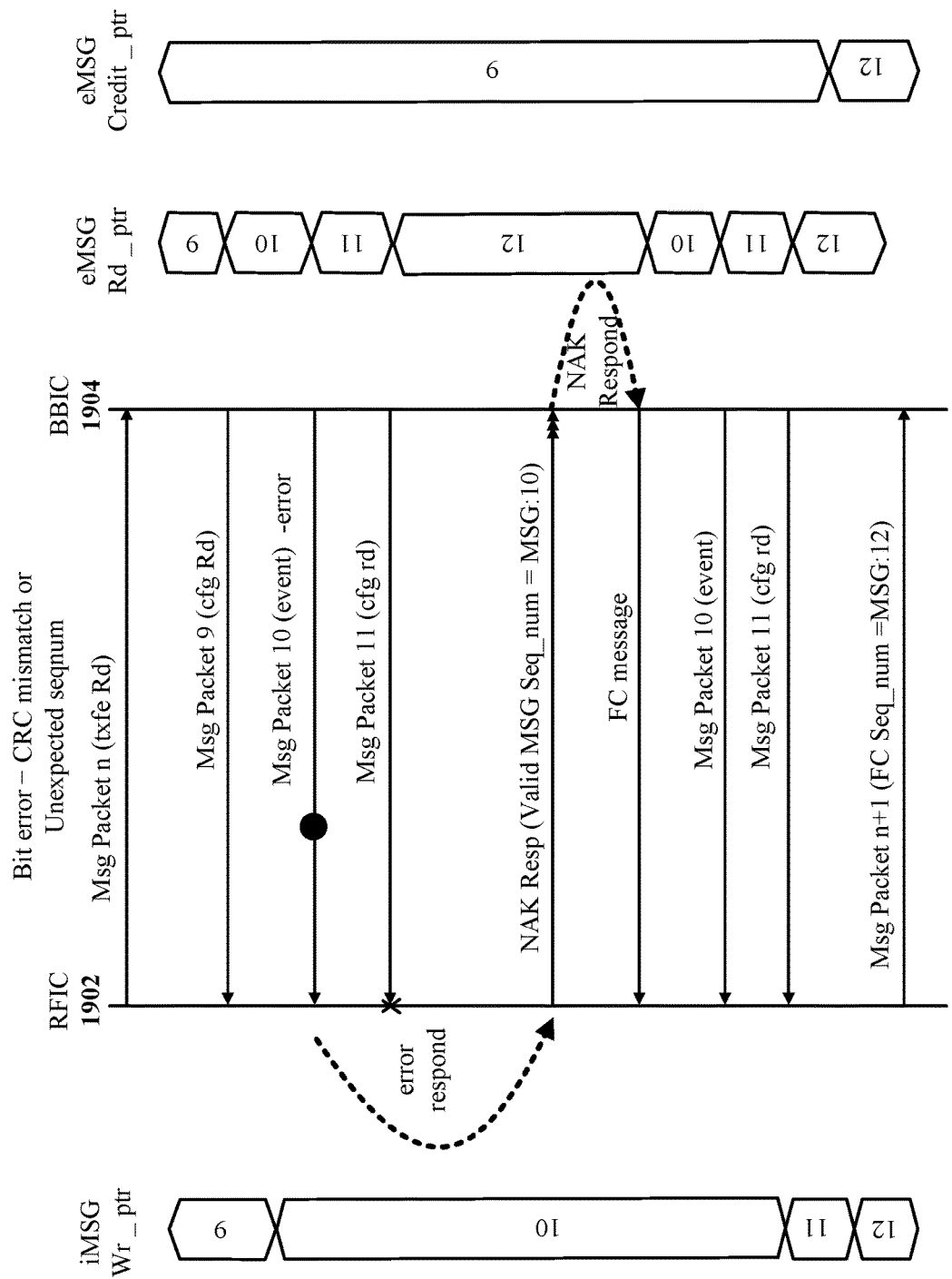
FIG. 19 is a diagram illustrating an example of error and retry on uplink message transmission.

FIG. 19 is a diagram illustrating an example of error and retry on uplink message transmission in accordance with various embodiments. In this example, a BBIC 1904 sends message packets 9-11 to an RFIC 1902 in sequence. During the transmission of message packet 10, a bit error (e.g., CRC mismatch or unexpected seq_num) occurs. In response to the bit error on message packet 10, the RFIC 1902 discards the received message packet 11 and sends a NACK message to indicate the error on message packet 10. Upon reception of the NACK message at the BBIC 1904, the BBIC sends a FC message to the RFIC 1902. Subsequently, the BBIC 1904 re-sends message packets 10 and 11 to the RFIC 1902. Upon successful reception of message packets 10 and 11 at the RFIC 1902, the RFIC sends a message packet n+1 to the BBIC 1904. The message packet n+1 indicates that the RFIC 1902 has received message packet up to sequence number 11 and the expected seq_num of the next message packet to be received at the RFIC 1902 is 12.

Figure 20:
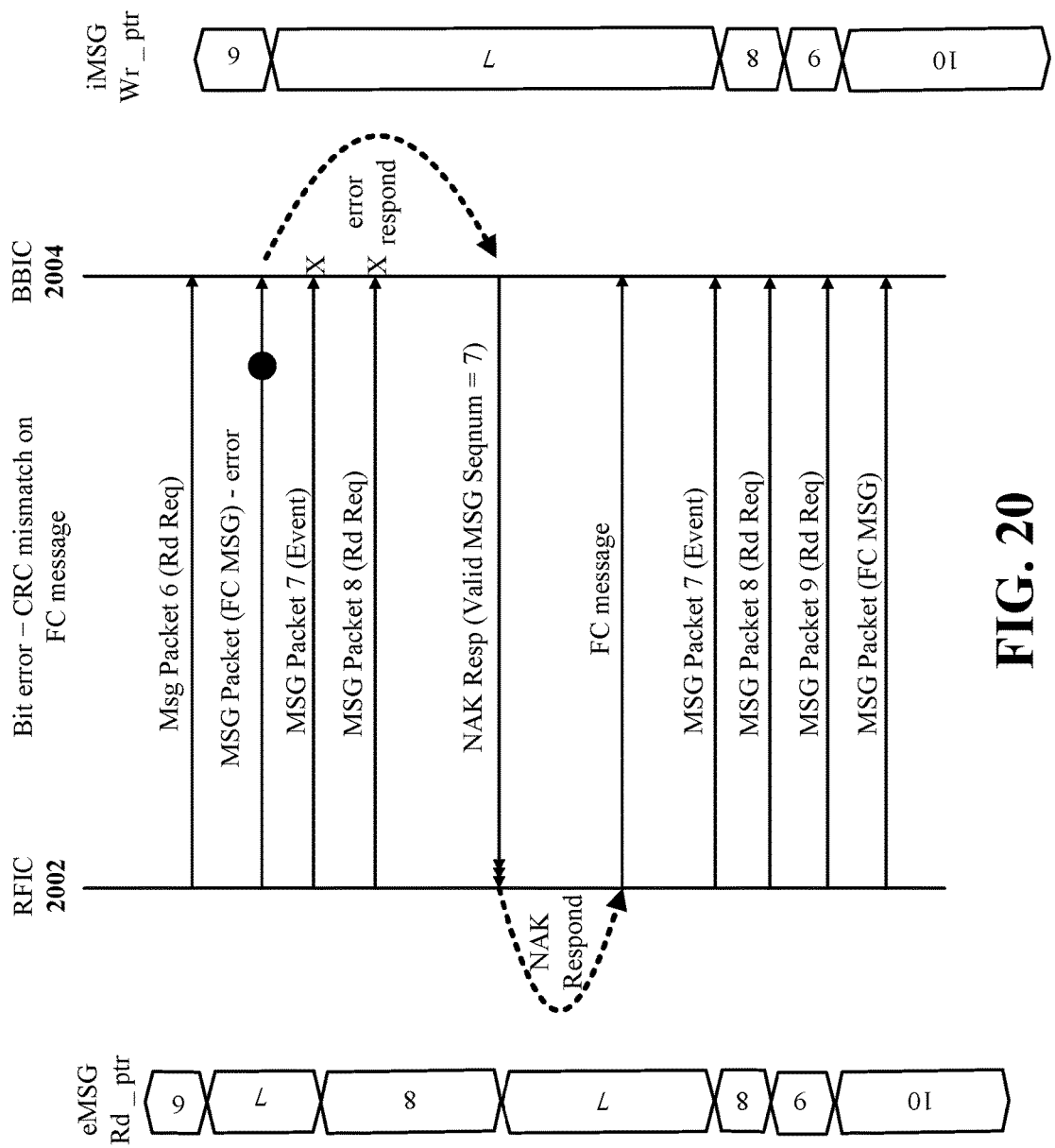
FIG. 20 is a diagram illustrating an example of error and retry trigger by error on flow control message.

FIG. 20 is a diagram illustrating an example of error and retry trigger by error on flow control message in accordance with various embodiments. In this example, an RFIC 2002 sends a FC message packet between message packets 6 and 7 to a BBIC 2004. During the transmission of the FC message packet, a bit error (e.g., CRC mismatch) occurs. In response to the bit error on FC message, the BBIC 2004 discards the received message packets 7 and 8, and sends a NACK message to indicate the error on FC message packet. Upon reception of the NACK message at the RFIC 2002, the RFIC sends a FC message to the BBIC 2004. Subsequently, the RFIC 2002 re-sends message packets 7 and 8 to the BBIC 2004.

Figure 21:
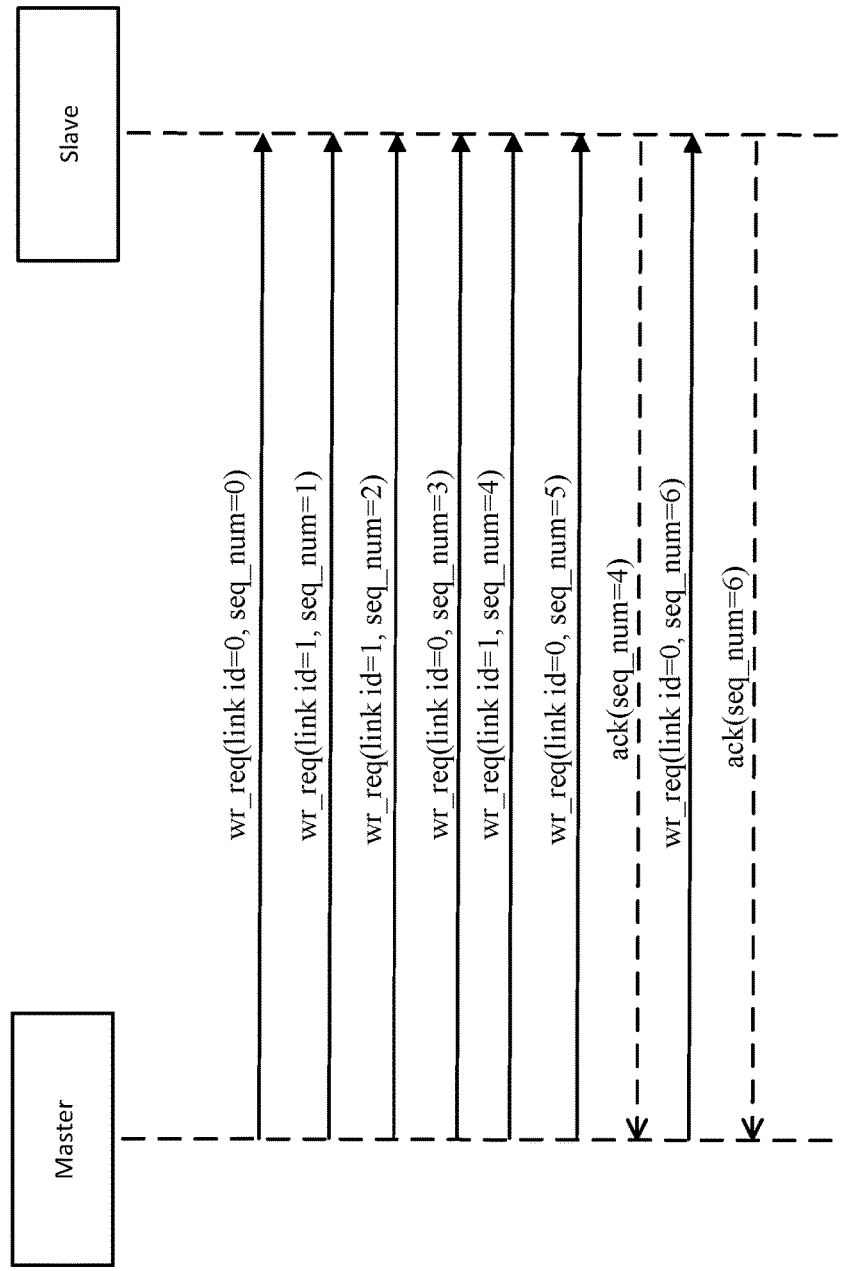
FIG. 21 is a diagram illustrating an example of the sequence for write transactions.

FIG. 21 is a diagram illustrating an example of the sequence for write transactions in accordance with various embodiments. WR_REQ initiates the sequence, ACK_RESP for the data channel indicates that WR_REQ was received and data is posted to be committed to the destination. A single flow control credit is maintained for all DL DATA transactions, and a single flow control credit is used for all UL DATA transactions.

Figure 22:
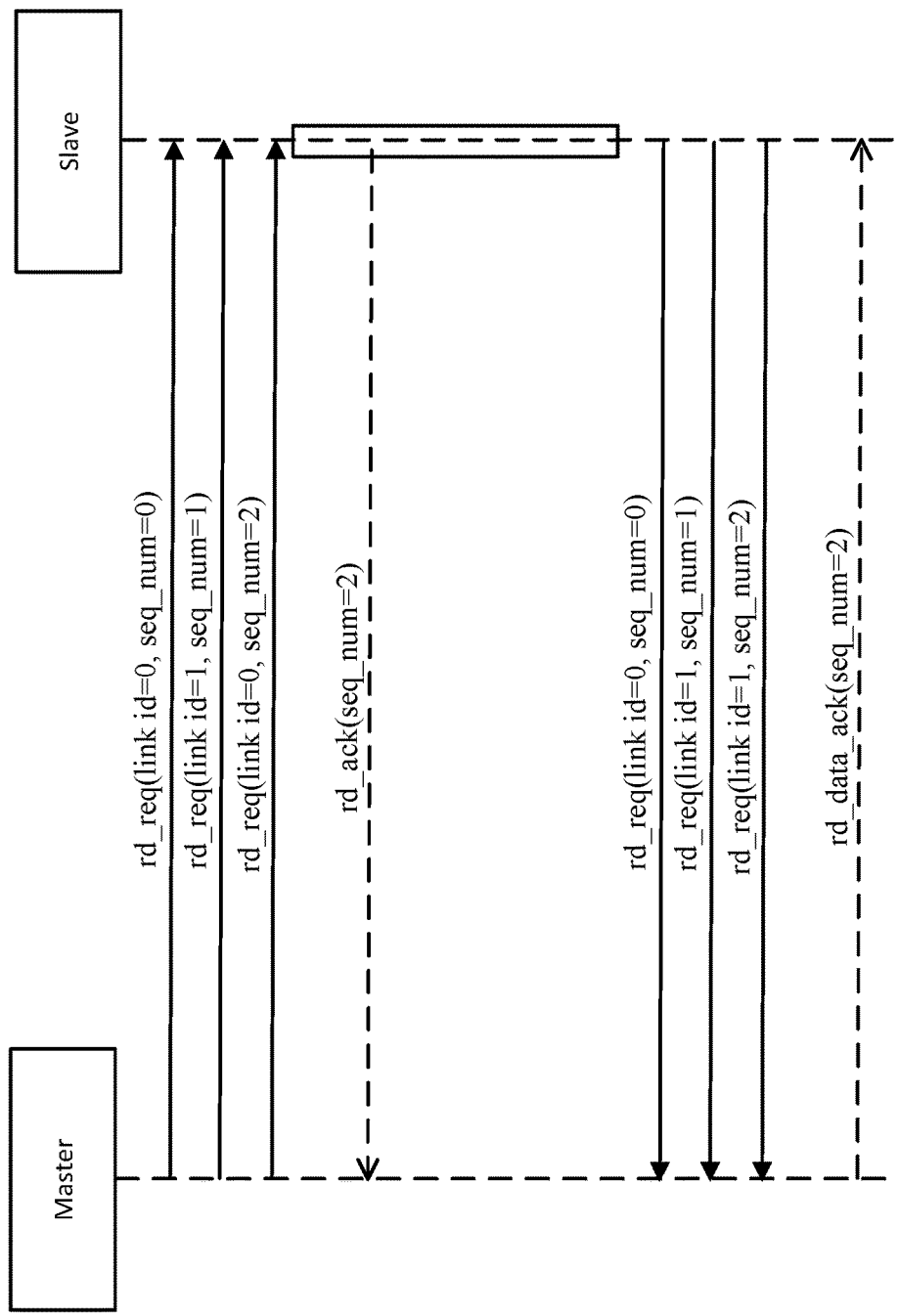
FIG. 22 is a diagram illustrating an example of the sequence for read transactions.

FIG. 22 is a diagram illustrating an example of the sequence for read transactions in accordance with various embodiments. Read transactions are treated as split transactions with type RD_REQ, RD_RESP pair and RD_DATA, RD_DATA_RESP pair. Each of the type pairs maintains separate flow controls with ACK scheme. Since messages and data are always accepted in sequence, this allows for each pair within the split transaction to be tracked independently. In this example, the split transaction is shown as 2 pairs separated in time, and each pair is handled separately in error handling and retry.

RD_REQ initiates the sequence; RD_RESP indicates that RD_REQ has been received. When RD_REQ is received the responder also activates RD_DATA. Once read data is retrieved from the source the read data is sent as a data packet (RD_DATA). When RD_DATA is received, RD_DATA_RESP is sent back. ACKs and flow control for RD_REQ, RD_RESP and RD_DATA, RD_DATA_RESP are handled separately.

Interrupt message transactions will have an INT message type and flow control credit is similar to RD_REQ. The interrupt messages shall be arbitrated and stream across the message channels. The retry and error handling mechanism is same as RD_REQ. Power management messages are used to support power state transitions of the serial interconnect. Error signaling messages are used to signal errors that occur on specific transactions and errors that are not necessarily associated with a particular transaction. These messages are initiated by the agent that detected the error.

Figure 23:
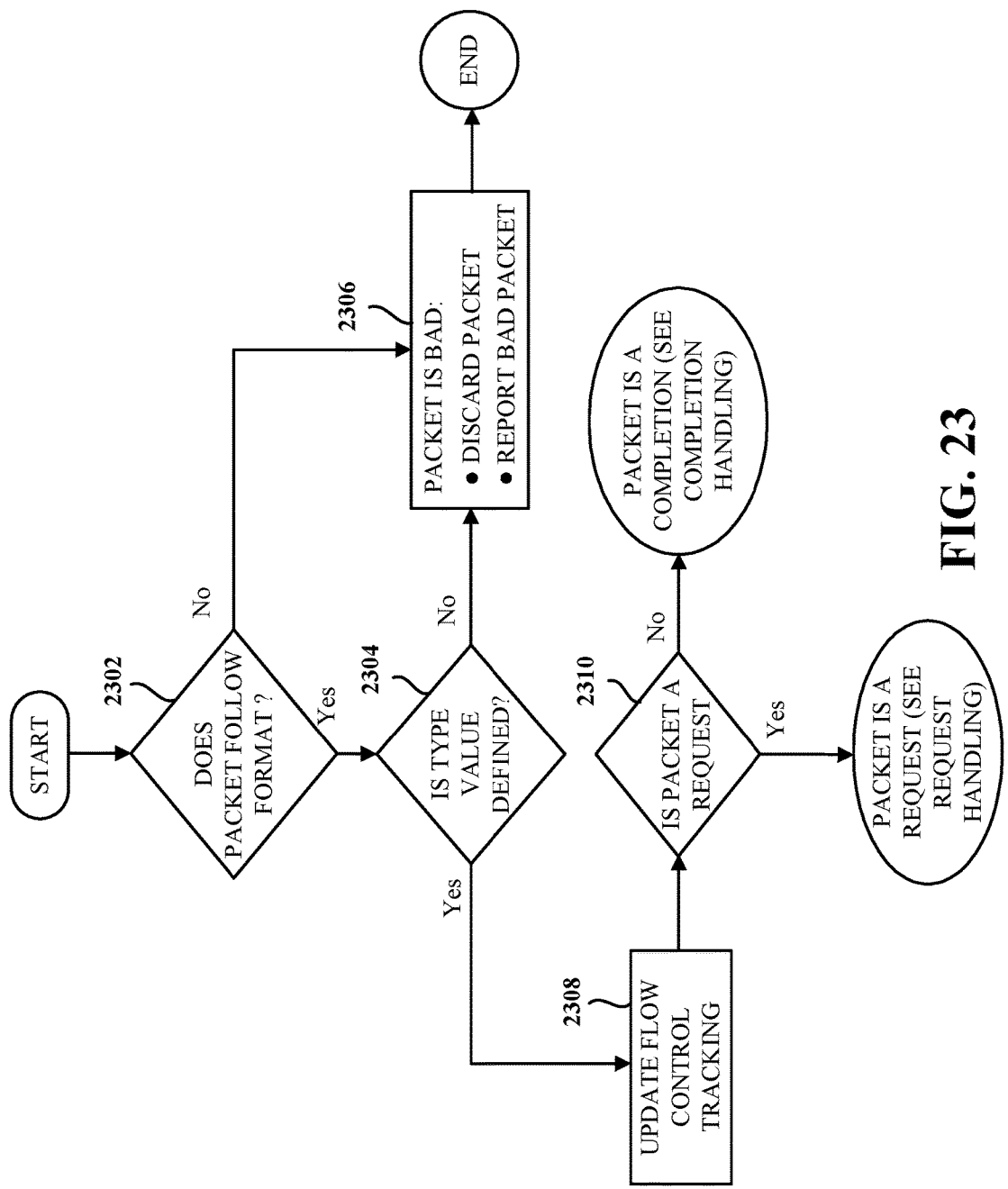
FIG. 23 is a flowchart of a method of handling received packet.

FIG. 23 is a flowchart of a method of handling received packet in accordance with various embodiments. The method may be performed by a device (e.g., a BBIC or RFIC described herein). In one configuration, a received packet is handled by this method when the received packet is delivered to the receive transaction layer from the receive data link layer, after the DLL has validated the integrity of the received packet. At 2302, the device determines whether the packet follows format. If the packet follows format, the device proceeds to 2304, otherwise proceeds to 2306.

At 2304, the device determines whether the type value of the packet is defined. If the type value is defined, the device proceeds to 2308, otherwise proceeds to 2306.

At 2306, the device determines that the packet is bad, discards the packet, and reports the bad packet. The method then ends.

At 2308, the device updates flow control tracking. At 2310, the device determines whether the packet is a request. If the packet is a request, the device handles the request. If the packet is not a request, the packet is completion and the device handles the completion.

Figure 24:
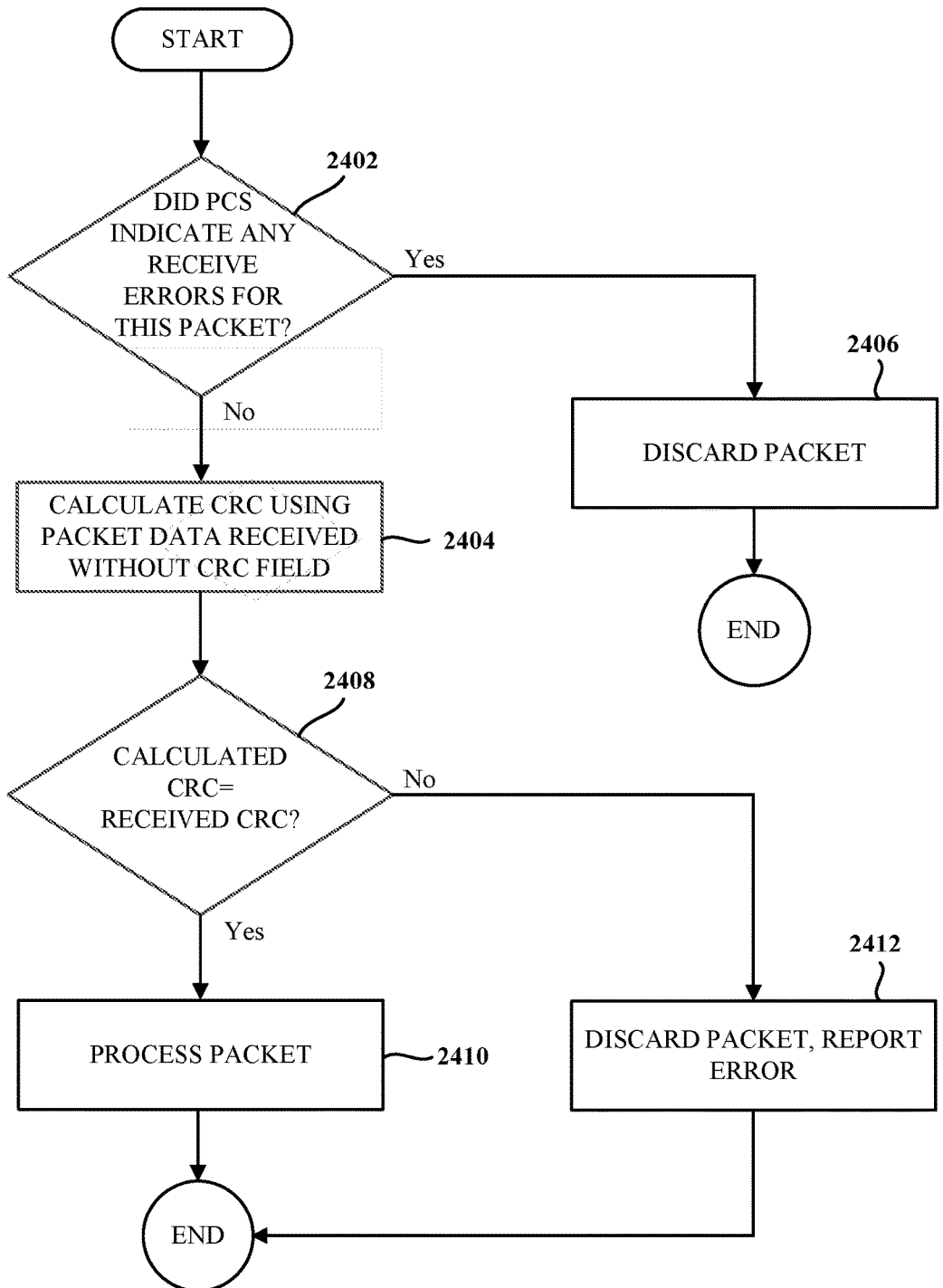
FIG. 24 is a flowchart of a method of checking error for received packet.

FIG. 24 is a flowchart of a method of checking error for received packet in accordance with various embodiments. The method may be performed by the DLL of a device (e.g., a BBIC or RFIC). At 2402, the device determines whether the PCS indicated any received error for the packet. If at least one error is indicated, the device proceeds to 2406, otherwise proceeds to 2404. At 2406, the device discards the packet. The method then ends.

At 2404, the device calculates CRC using packet data received without CRC field. At 2408, the device determines whether the calculated CRC is equal to the received CRC in the packet. If the CRC matches, the device proceeds to 2410, otherwise proceeds to 2412.

At 2410, the device processes the packet. The method then ends. At 2412, the device discards the packet and reports error. The method then ends.

Figure 25:
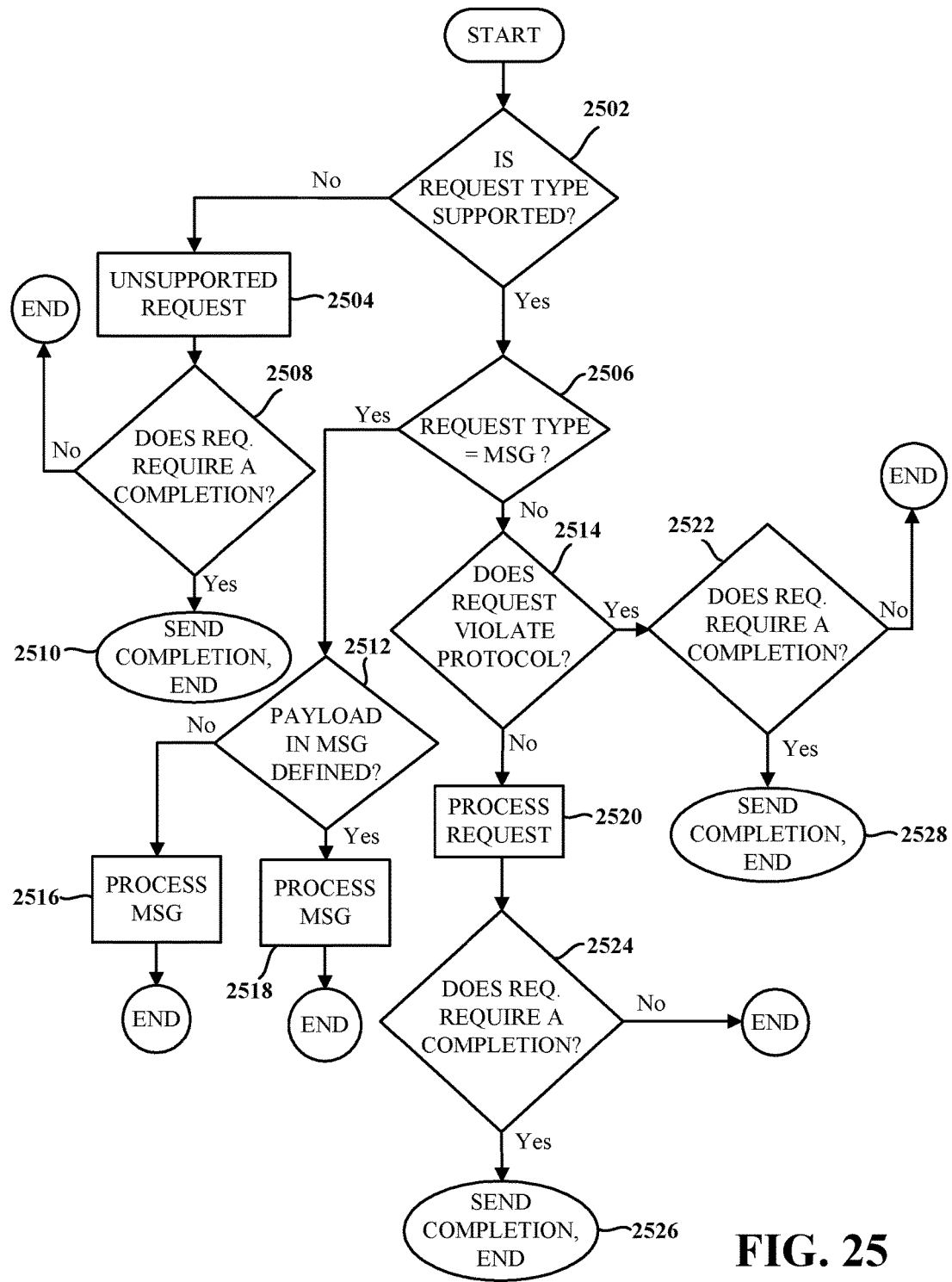
FIG. 25 is a flowchart of a method of handling received request.

FIG. 25 is a flowchart of a method of handling received request in accordance with various embodiments. The method may be performed by a device (e.g., a BBIC or RFIC described herein). In one configuration, a received request is handled by this method following the initial processing done with all transaction layer packets. At 2502, the device determines whether the request type is supported. If the request type is supported, the device proceeds to 2506, otherwise proceeds to 2504.

At 2504, the device recognizes that the request is an unsupported request. At 2508, the device determines whether the request requires a completion. If the request requires a completion, the device proceeds to 2510, otherwise the method ends. At 2510, the device sends completion and the method ends.

At 2506, the device determines whether the request type is MSG. If the request type is MSG, the device proceeds to 2512, otherwise proceeds to 2514.

At 2512, the device determines whether payload in MSG is defined. If the payload in MSG is defined, the device proceeds to 2518, otherwise proceeds to 2516.

At 2516, the device processes the MSG. The method then ends. At 2518, the device processes the MSG. The method then ends.

At 2514, the device determines whether the request violates protocol. If the request violates protocol, the device proceeds to 2522, otherwise proceeds to 2520.

At 2520, the device processes the request. At 2524, the device determines whether the request requires a completion. If the request requires a completion, the device proceeds to 2526, otherwise the method ends. At 2526, the device sends completion and the method ends.

At 2520, the device determines whether the request requires a completion. If the request requires a completion, the device proceeds to 2528, otherwise the method ends. At 2528, the device sends completion and the method ends.

For read requests, data comes back as a data packet with a fix length of 1024 bits whatever the number bits requested by the read request. The Length field in the data packet header indicates the number of words effectively carried by the data packet: for data samples the payload is always 32 words (1024 bits); and for CSR transactions the length will indicate the size in double-words of the burst to be generated.

In any split transaction protocol, there is a risk associated with the failure of the requester to receive the expected completion. To allow requesters to attempt recovery from this situation in a standard manner, a completion timeout mechanism is defined. This mechanism is intended to be activated only when there is no reasonable expectation that the completion will be returned, and should never occur under normal operating conditions.

The physical layer of the serial interconnect system implements the following functions: 128b/130b encoding by providing sync symbol insertion differentiating between PHY burst (physical layer communication) or DLL burst; STMR synchronization from BBIC to the RFIC; Rx lane frame alignment and multi-lane deskew; equalization; training sequences for fast wakeup, hibernate wake-up, initial boot and recovery, involving equalization, CDR and alignment; physical layer token insertion including idle link (IDL); maintenance of physical layer statistics counters for tracking of PHY errors; low speed (LS) mode and high speed (HS) mode handling. The PHY handles the packetization and de-packetization of SERDES data from/into blocks of data that can be further processed by the physical layer and upper layers; scrambling data link layer communication (scrambling can be used to "whiten" EMI the frequency content of the signals going over the serial interconnect and reduces radiated power at any one specific frequency and scrambling can be done on a per lane basis); striping and de-striping of byte data across active lanes; and asynchronous clock crossing between the SERDES and the data link layer (controller) domain.

Figure 26:
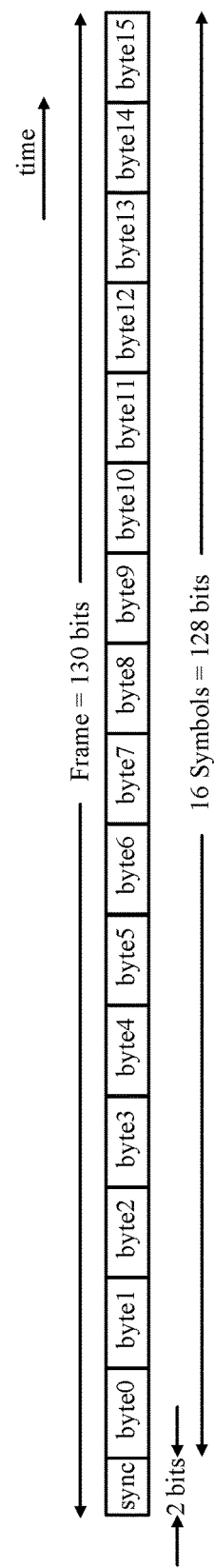
FIG. 26 illustrates an example timing diagram that can repeat periodically in a one lane configuration.

FIG. 26 illustrates an example timing diagram that can repeat periodically in a one lane configuration every 130 UI (payload contents can vary) in accordance with various embodiments. The 128b/130b encapsulation is handled within physical layer. There are two operating modes for the physical layer. Each operating mode is defined by its own two-bit sync header defining the specific operating mode of the link. Tokens for each operating mode are appended to each transfer to further classify the data being sent across the link. The first operating mode is the packet burst, which is used for Data Link Layer communication between a BBIC and an RFIC. The second type of operating mode is the PHY burst, used for Physical Layer communication. The distinction in between Packet and Lane is done by the two sync symbol bits: sync symbol 0x01 indicates a Packet burst, and sync symbol 0x10 indicates a PHY burst.

Packet Burst are used for Data Link Layer communication. The packet bursts can contain data and configuration data in the form of a data packet, or interrupts, DLL communication, ACKs/NACKs, pings, and data requests in the form of messages. Packet bursts are defined by a two-bit sync header (0x01). An 8-bit token differentiates packet types. The token is located in the first byte of each transfer after the sync symbol. In packet bursts, the sync symbol is not scrambled, while the token and payload are always scrambled.

Packet bursts have two subtypes: message packet, including interrupts, ACKs/NACKs, read request, ping, and DLL communication; and data packets, memory mapped transfers, configuration accesses and IQ sample data.

The Packet Burst format follows these rules: the token, which is 8 bits, is scrambled and is triple-bit-flip protected, the payload is scrambled and CRC protected, and the EPB token must be sent as indication to switch to PHY burst and is required to be the last byte transmitted before switching to PHY burst operating mode, no idles can come between this token and a PHY burst header. An example list of packet burst tokens in accordance with various embodiments is described in Table 7 below:

TABLE 7

List of Packet Burst Tokens

| Token | Value | Comment |
| --- | --- | --- |
| IDL (Idle) | 00h | Idle tokens are used for periods in packet burst mode when no information is being transmitted across the link. The Idle pattern is also used for BER profiling as the error for idle tokens is detected per individual lane |
| DPT (Data Packet Transfer) | FFh | Data Packet transfer token is used for data transfers of 1080 bits in length. 1024 bits of payload, and 64 bits of header/CRC |
| MPT (Message Packet Transfer) | 0Fh | The Message Token is used for ACK/NACKs, DLL communication, read requests, pings and interrupts. Messages are 56 bits in length |
| EPB (End of Packet Burst) | F0h | Token to indicate the switch from Packet Burst to PHY burst operating mode |

Figure 27:
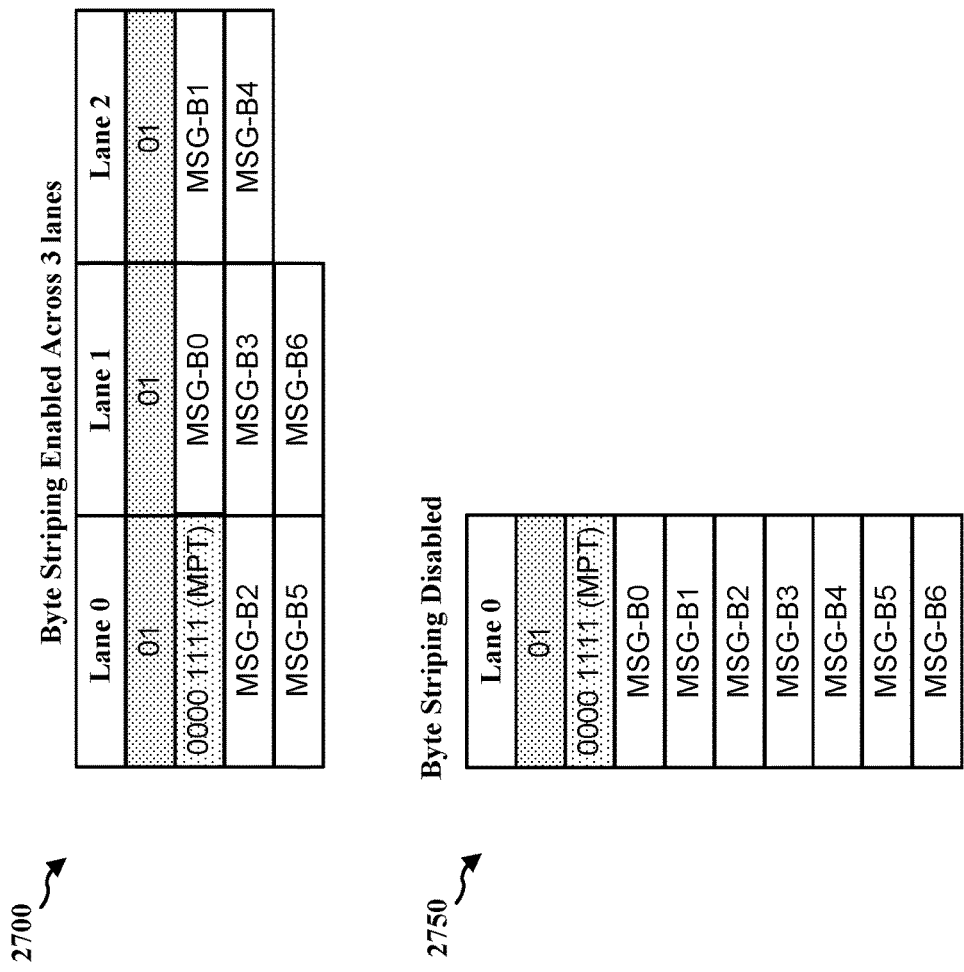
FIG. 27 illustrates examples of byte striping enabled.

FIG. 27 illustrates examples of byte striping enabled 2700 across three lanes and of byte striping disabled 2750 in accordance with various embodiments. In byte striping enabled 2700, each byte in the transfer is sent in successive lanes. For example, the MPT token is sent in lane 0, the first byte following the MPT token is sent in lane 1, the second byte following the MPT token is sent in lane 2, the third byte following the MPT token is sent in lane 0, and so on.

A scrambler can significantly lower the probability of long run-lengths of consecutive zeros or ones. The scrambler also spreads the power spectrum and thus can avoid spurs at discreet frequencies.

The serial interconnect system shall support a scrambler with the following generator polynomial:

$$G(X)=X^{23}+X^{21}+X^{16}+X^8+X^5+X^2+1$$

The repetition period of this scrambler is $2^{24}-1$ UIs=16,777,215. Only data bytes shall be scrambled, synchronization symbols and tokens remain unscrambled. The number of bits in a frame being 128, the repetition period is therefore 131,072 frames.

The scrambler is reset by using a special payload in the SPB token at the end of a PHY Burst, the scrambler will update on every byte independent of the data on each byte, except for when using the BSV PHY burst. In that manner, both transmitter and receiver should never get out of sync. Bit errors on the link may occur but assuming the number of 130-bit patterns match on transmitter and receiver the LFSRs should always match. Some example configurations include: the scrambler operates independently per lane, and one scrambler per lane; the scrambler is used in packet layer data and PHY transfer BSV; 2-bit sync symbols, token and PHY Bursts data are not scrambled; each byte of data is scrambled by a unique 24-bit LFSR value; the LFSR value is frozen and broadcast during the BSV PHY burst; tokens and sync symbols are never scrambled in PHY burst mode, and tokens are scrambled in packet burst mode; special payload on the SPB token resets the scrambler, and the reset is used when errors cause the transmitter and receiver to be out of sync.

Figure 28:
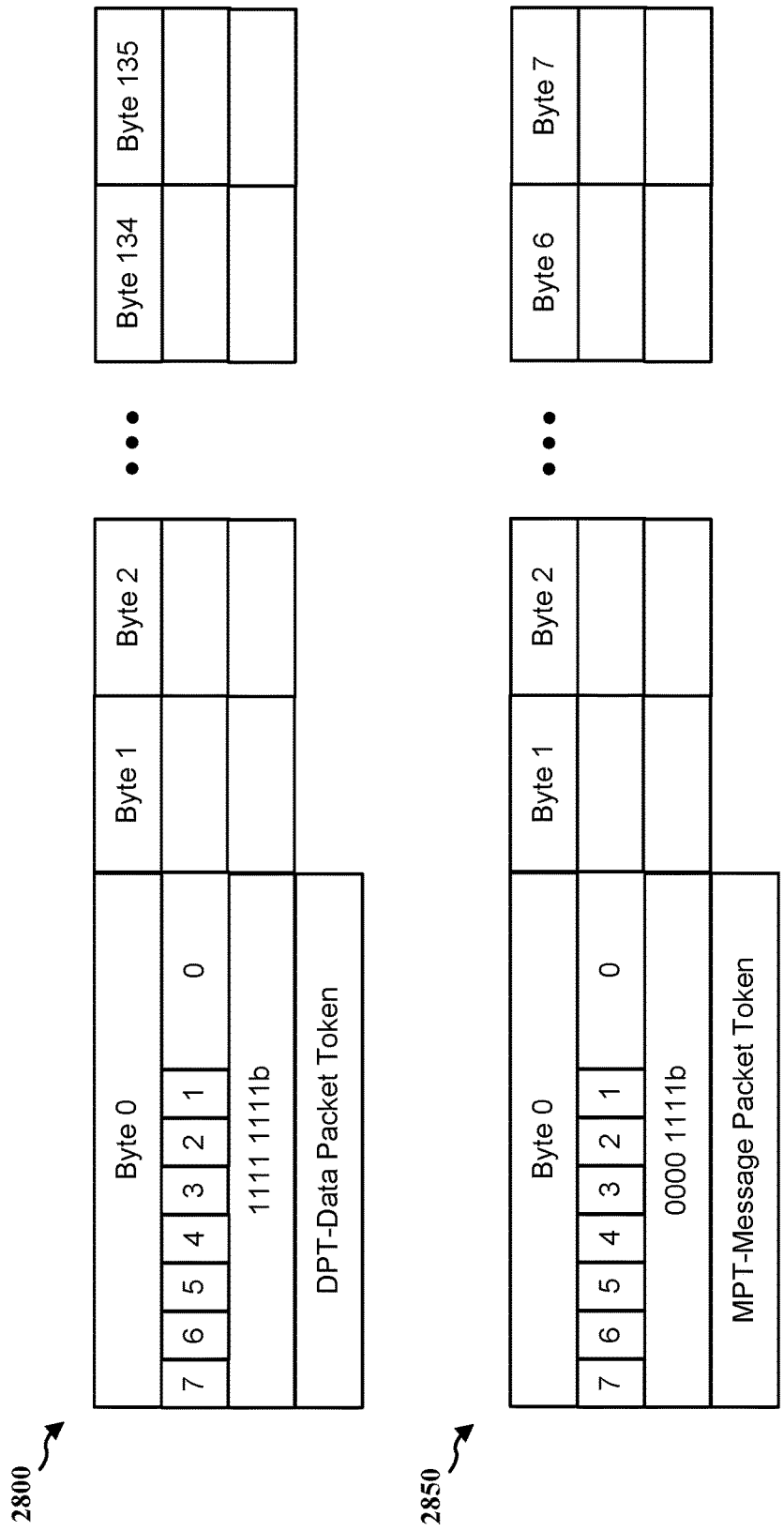
FIG. 28 illustrates a data packet format and a message packet format.

FIG. 28 illustrates a data packet format 2800 and a message packet format 2850. Byte 1111_1111b indicates Data Packet Transfer (DPT) token. This token is used to frame a data packet carrying data samples, configuration data, DLL data or other memory-mapped data between the RFIC and the BBIC. DPT is sized 1088 bits (8-bit token+ 1080 data packet payload). Details for the data packet payload structure are described above with reference to FIG. 9.

Byte 0000_1111b indicates Message Packet Transfer (MPT) token. This token is used to frame a message packet as part of a packet burst. Message packet transfers are used to transmit interrupts, ACKs/NACKs, read request, ping, and DLL communication between the RFIC and the BBIC. MPT is sized 64 bits (8-bit token+56 bit message packet payload). Details of the message packet payload structure are described above with reference to FIG. 9.

Byte 0000_0000b indicates Idle (IDL) link token. The idle token is used during packet bursts to fill in the gaps not occupied by messages transfers, data transfers or End of Packet Burst token during a packet burst transmission. This packet is scrambled. Ping Pattern used to detect the state of the link and run BER analysis per lane The IDLE pattern is also used to send a known payload scrambled sequence across all lanes on a link, because each lane is required to have separate scrambler logic with a different LFSR pattern, this setup allows for independent error profiling on each individual lane.

EPB Token, denoted by 1111_0000b is used to delineate the switch from Data link layer communication to Physical Layer communication. This token has to be the very last data byte prior to switching to Physical Layer communication (PHY burst operating mode).

PHY Bursts are used for Physical Layer communication. The PHY bursts can contain Equalization, CDR and alignment information, indicate the start of a packet burst, signal the start or end of a transmission, send the universal timer value across the link and provide ways for the trace tools to track the LFSR pattern in the scrambler.

PHY bursts are defined by a two-bit sync header (0x10). An 8-bit token differentiates PHY layer communication types. The token is located in the first byte of each transfer after the sync symbol. In PHY bursts, neither the token nor the payload is scrambled.

PHY bursts have multiple subtypes for PHY to PHY communication: STS—System Timer Synchronization; SPB—Start of packet burst; BSV—Broadcast Scrambler Value; EOT—End of Transmission; SOT—Start of Transmission; SYNC—Start of CDR in high speed mode; EQ—Equalization Pattern The PHY Burst format follows these rules: the token, which is 8 bits, is not scrambled; the payload not scrambled for any PHY Burst; all bursts consist of 1 frame of data (130 bits) per active lane, except for the BSV which can be of variable length; all Lanes of a multi-lane link must transmit frames with the same sync symbol and token simultaneously; the payload will be either a repeated pattern per byte or triple redundant depending on the transfer type; the SPB token must be sent as indication to switch from PHY burst to packet bursts and the SPB token is required to be the last byte transmitted before switching to packet burst operating mode; the LFSR is not advanced for the bytes of the BSV ordered set, and they are advanced for all other bytes.

An example PHY burst token list in accordance with various embodiments is shown in Table 8 below:

TABLE 8

PHY Burst Token List

| Token | Value | Comment |
|---|---|---|
| STS (System Timer Synchronization) | 2Dh | STMR Synchronization Lane packet. Sends STRM value from BBIC to RFIC |
| SPB (Start of Packet burst) | E1h, (55h)x15 | Last frame before switching operating modes from PHY burst to Packet burst |
| BSV (Broadcast Scrambler Value) | AAh | Token to provide a known pattern which broadcasts the LFSR settings to aid trace tools |
| EOT (End of Transmission) | (66h)x16 | Last frame before putting the lane into Electrical Idle |
| SOT (Start of Transmission) | (00_FFh)x8 | Frame used to End electrical Idle and start the link bring up into either PHY burst or packet burst operating modes |
| SYNC (Lane sychronization) | 1Eh | Training sequence providing CDR |
| EQ (Equalization Pattern) | 55h | Equalization pattern to be sent out to help the receivers equalize preventing inter-symbol interference |

2Dh defines the STMR Synchronization token (STS). The STMS synchronization transfer is used to synchronize the Universal Timer value between the BBIC and the RFIC. The value delivered is triple redundant and the value is sent along with the up-sampled phase PO of the STMR counter into the RFIC to allow for proper synchronization between components.

E_1h indicates the Start of Packet burst (SPB). This token is used to transition from PHY burst to packet burst mode and Data Link Layer communication. The start of packet burst is the last frame sent on a lane before switching to the packet burst operating mode.

The broadcast scrambler value PHY burst sends the LFSR value for helping trace tools achieve block alignment. The value is sent in a triple redundant manner. The LFSR value does not advance on each byte during the BSV transfer as the LFSR value would during any other transfer. BSV will provide the LFSR scrambler value on a per lane basis.

Token 66h indicates the End of Transmission during PHY burst operating mode. This token is sent out before the transmitter goes into Electrical Idle. The Receiver of the EOT token should ignore all data after the EOT Token has been received until the EQ, SYNC or SOT tokens are received.

The start of transmission is delimited by a frame with a low frequency 0→1→0→1 pattern. The pattern is used for lane and block alignment prior to starting any other non-initialization traffic on the link. This pattern is also used to restart the scrambler logic prior to starting packet burst mode operation Sync pattern using a frame full of bytes using the AAh pattern is used for clock and data recovery by the receiver. The frame will be sent out as many times as needed by the link. During first initialization of the link in low speed mode, the number of CDR frames required to be sent each time the link is initialized must be configured.

The Equalization pattern is used to reduce inter-symbol interference and allow the reliable recovery of the transmitted data in the link. The equalization frame consists of A5h pattern which uses the scrambler's LFSR pattern to aid the analog circuitry complete the equalization process in an optimal manner. The number of EQ frames to be sent during the equalization procedure must be programmed via messaging.

The mapping rules from frames to physical lanes are complex, below are illustrated two examples of bursts mapping into the physical lanes of the link. In Table 10, the mapping of packet bursts can be observed. In Tables 9 and 10 below, example PHY bursts in accordance with various embodiments are depicted:

TABLE 9

Packet Burst Mapping to Physical lanes

| | | Lane 0 | Lane 1 | Lane 2 | |
|---|---|---|---|---|---|
| P | Sync Character: | 01 | 01 | 01 | bit frame |
| A | 0 × 01 ( Packet Burst) | | | | |
| C | Each lane Sends a | 0000 1111 | MSG-B0 | MSG-B1 | |
| K | Frame, data is byte | (MPT) | | | |
| E | stripped across all | MSG-B2 | MSG-B3 | MSG-B4 | |
| T | active lanes | | | | |
| - | Token + MSG + | MSG-B5 | MSG-B6 | 1111 1111 | |
| B | Token + Data | | | (DPT) | |
| U | | Data-B0 | Data-B1 | Data-B2 | |
| R | | Data-B3 | Data-B4 | Data-B5 | |
| S | | Data-B6 | Data-B7 | Data-B8 | |
| T | | Data-B9 | Data-B10 | Data-B11 | |
| | | Data-B12 | Data-B13 | Data-B14 | |
| | | Data-B15 | Data-B16 | Data-B17 | |
| | | Data-B18 | Data-B19 | Data-B20 | |
| | | Data-B21 | Data-B22 | Data-B23 | |
| | | Data-B24 | Data-B25 | Data-B26 | |
| | | Data-B27 | Data-B28 | Data-B29 | |
| | | Data-B30 | Data-B31 | Data-B32 | |
| | | Data-B33 | Data-B34 | Data-B35 | |
| | | Data-B36 | Data-B37 | Data-B38 | |
| | Sync Character (Packet Burst) | 01 | 01 | 01 | |
| | Frame 3, 4, 5 | Data-B39 to Data-B87 | | | |
| | Sync Character (Packet Burst) | 01 | 01 | 01 | |
| | Frame 6, 7, 8 | Data-B88 to Data-B136 | | | |
| | Sync Character (Packet Burst) | 01 | 01 | 01 | |
| | Message only Packet | 0000 1111 (MPT) | S0-B1 | S0-B2 | |
| | | S0-B3 | S0-B4 | S0-B5 | |
| | IDLE to align | S0-B6 | S0-B7 | 0000 0000 (IDLE) | |
| | 13 Bytes of IDL tokens per lane to get to the frame boundary in each lane | 0000 0000 (IDL) | 0000 0000 (IDL) | 0000 0000 (IDL) | |
| | Sync Character (Packet Burst) | 01 | 01 | 01 | |
| | Data Packet only (136 Bytes) | 1111 1111 (DPT) | Data-B0 | Data-B1 | |
| | | Data-B2 | Data-B3 | Data-B4 | |
| | | Data-B5 to Data-B46 | | | |
| | | 01 | 01 | 01 | |
| | | Data-B47 to Data-B95 | | | |
| | | 01 | 01 | 01 | |
| | | Data-B96 to Data-B135 | | | |
| | | Data-B136 | 0000 0000 (IDL) | 0000 0000 (IDL) | |
| | | 0000 0000 (IDL) | 0000 0000 (IDL) | 0000 0000 (IDL) | |

TABLE 9-continued

Packet Burst Mapping to Physical lanes

| | Lane 0 | Lane 1 | Lane 2 |
|---|---|---|---|
| Last byte is used to insert a token to switch to PHY burst | 0000 0000 (IDL) | 0000 0000 (IDL) | 1111 0000 (EPB) |
| Sync Character (PHY burst) | 10 | 10 | 10 |

TABLE 10

PHY Burst mapping to Physical Level

| | | Lane 0 | Lane 1 | Lane 2 | |
|---|---|---|---|---|---|
| Lane Burst | Sync Character (Lane Burst) | 10 | 10 | 10 | 130 bit Frame per lane |
| | In Lane burst, communication happens per lane. Here we have one frame of electrical idle start per lane | EOT EOT EOT EOT EOT EOT EOT EOT EOT EOT EOT EOT EOT EOT EOT EOT | EOT EOT EOT EOT EOT EOT EOT EOT EOT EOT EOT EOT EOT EOT EOT EOT | EOT EOT EOT EOT EOT EOT EOT EOT EOT EOT EOT EOT EOT EOT EOT EOT | |
| | Sync Character (Lane Burst) | 10 | 10 | 10 | 130 bit Frame per lane |
| | | SOT | SOT | SOT | |
| | | ... | ... | ... | |
| | | SOT | SOT | SOT | |
| | | 10 | 10 | 10 | |

Figure 29:
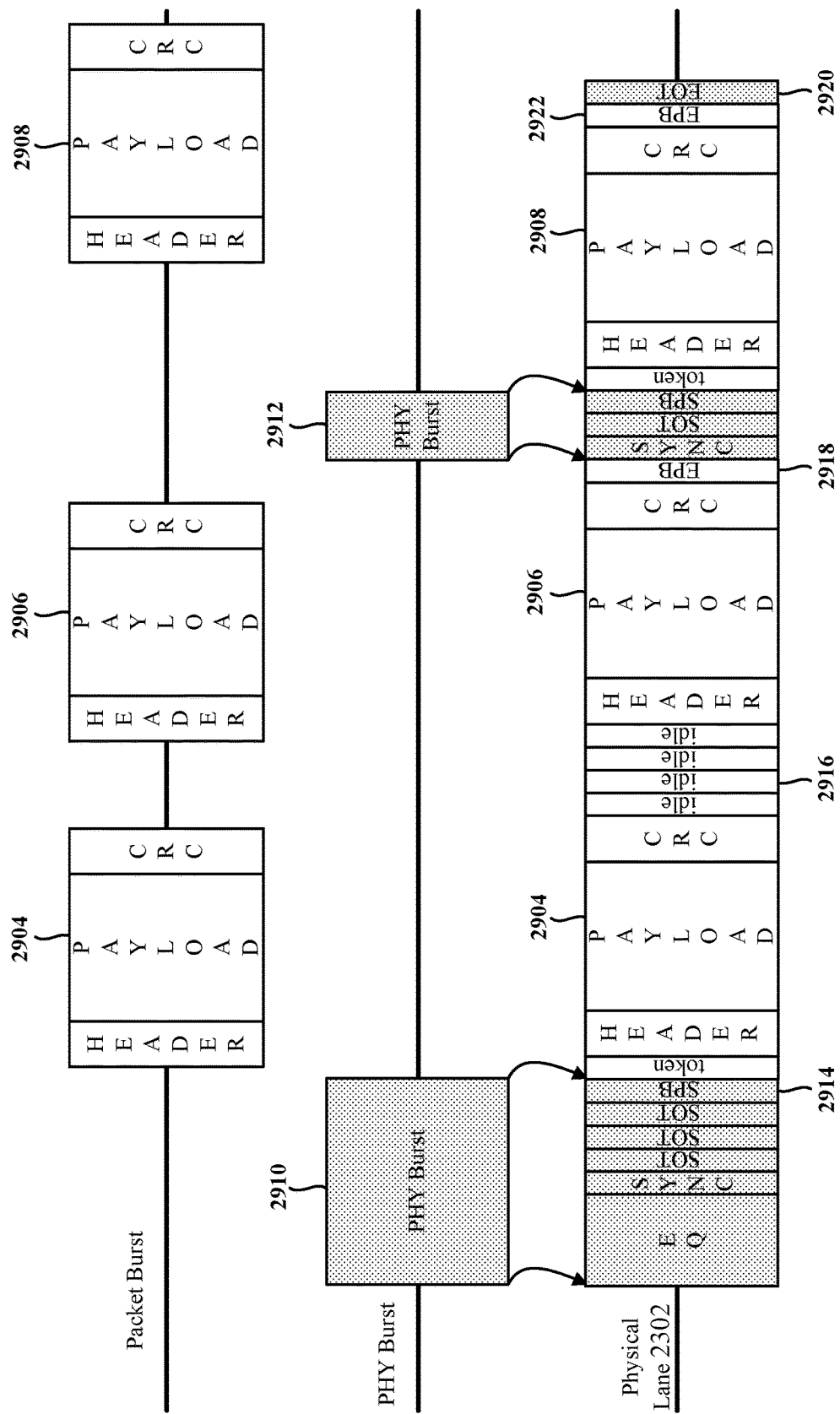
FIG. 29 illustrates an example data link layer and physical layer transmission at a single physical lane.

FIG. 29 illustrates an example data link layer and physical layer transmission at a single physical lane 2902 in accordance with various embodiments. In this example, a PHY burst 2910 is followed by a packet burst that includes packets 2904 and 2906. The PHY burst 2910 ends with a SPB token 2914, which indicates the last frame before switching operation mode from PHY burst to packet burst. There are several IDL tokens 2916 transmitted between the packets 2904 and 2906. The packet 2906 is followed by an EPB token 2918, which indicates the switch from packet burst to PHY burst operating mode. The EPB token 2918 is followed by a PHY burst 2912, which is followed by another packet burst that includes packet 2908. The packet 2908 is followed by an EPB token 2922, which is followed by an EOT token 2920, which indicates the last frame before putting the lane 2902 into electrical idle.

Figure 30:
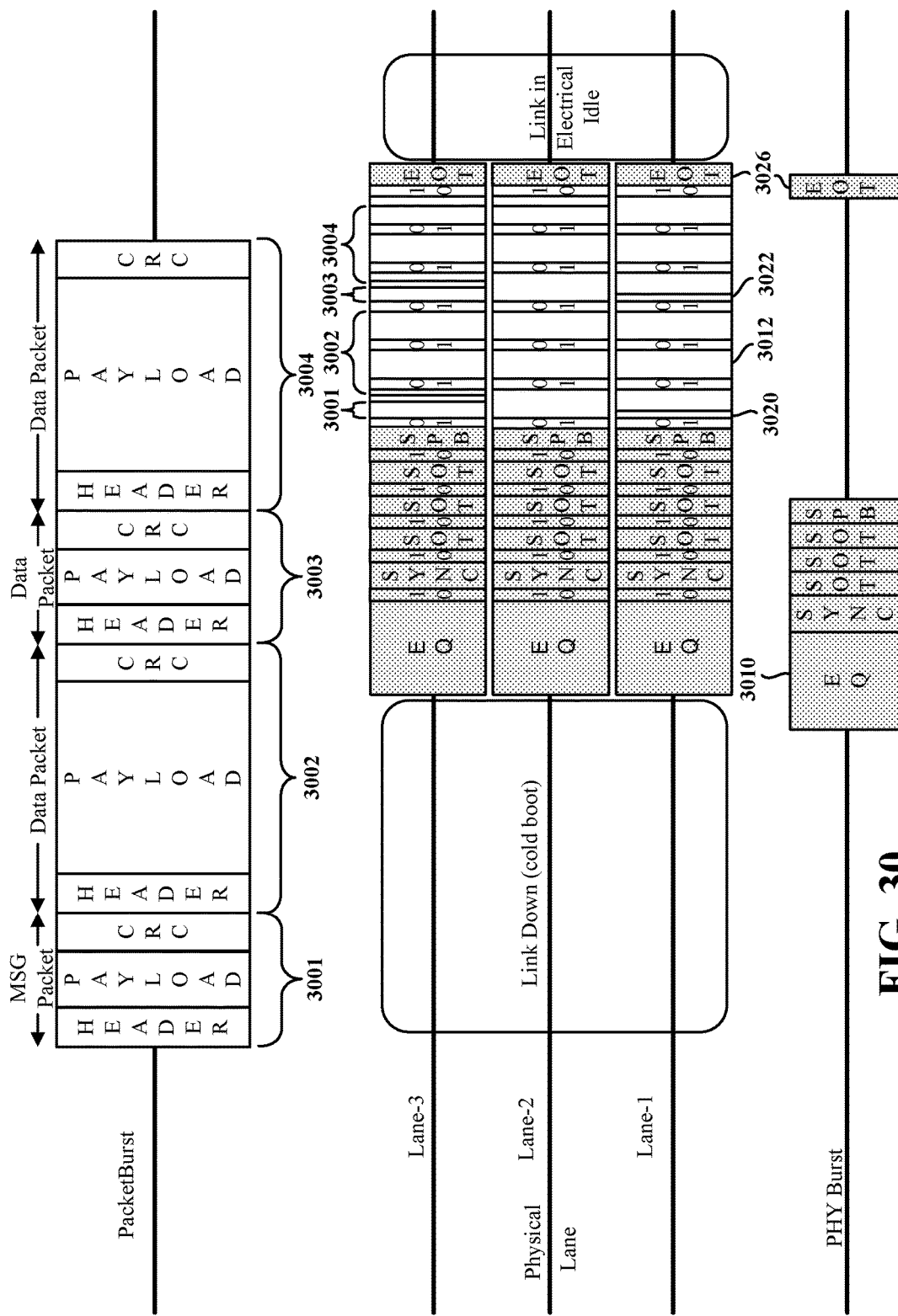
FIG. 30 illustrates an example data link layer and physical layer transmission at three physical lanes.

FIG. 30 illustrates an example data link layer and physical layer transmission at three physical lanes 1-3 in accordance with various embodiments. In this example, each of the physical lanes 1-3 starts with a PHY burst 3010. For each frame in the PHY burst 3010, the synchronization symbol is '10'. The PHY burst 3010 is followed by a packet burst 3012. For each frame in the packet burst 3012, the synchronization symbol is '01'. The packet burst 3012 includes a message packet 3001 and three data packets 3002-3004. The packets byte stripped over the physical lanes 1-3. Each packet is started with a token. For example, the message packet 3001 is started with a MPT token 3020 and the data packet 3003 is started with a DPT token 3022. The packet burst 3012 is followed by an EOT token 3026 on each of the lanes 1-3.

The link Equalization is done during first bring up of the link after power up. The purpose of equalization is to reduce inter-symbol interference to ensure the reliable recovery of high speed transmit data. Equalization must be done every time the link is powered down and powered back up before operating in high-speed mode, and it is not necessary to be performed at any other time. In one configuration, link equalization may be done at any time while in PHY burst mode. Equalization time is variable and will change from chip to chip and part to part depending on technology and process skew. The amount of time the link spends in the equalization procedure is configurable via low speed mode programming. Equalization may be required to occur when the first time the serial interconnect to wake up from high speed deep sleep state before moving to any other high speed state.

The Clock Data Recovery (CDR) sequence adjusts the receiver setup of each lane to improve the signal quality and meet the required signal integrity by aligning the clock with the center of the data eye. CDR must be executed during the first HS wake up of the serial interconnect. Even if CDR is not required to be repeated for reliable operation at each transition of any of the sleep to active modes, DLL will have the option of repeating the procedure at any time. CDR can be required after the following conditions: first time the link moves from LS to HS operation; each transition out of HS Sleep to HS burst; each transition out of HS Deep Sleep.

Lane alignment is used to reliably construct data in the receiver after the data has been processed by the de-serializer to detect the frame boundary. Block alignment is used to reliably construct logical data by detecting the appropriate skew between each of the data lanes in a link.

Figure 31:
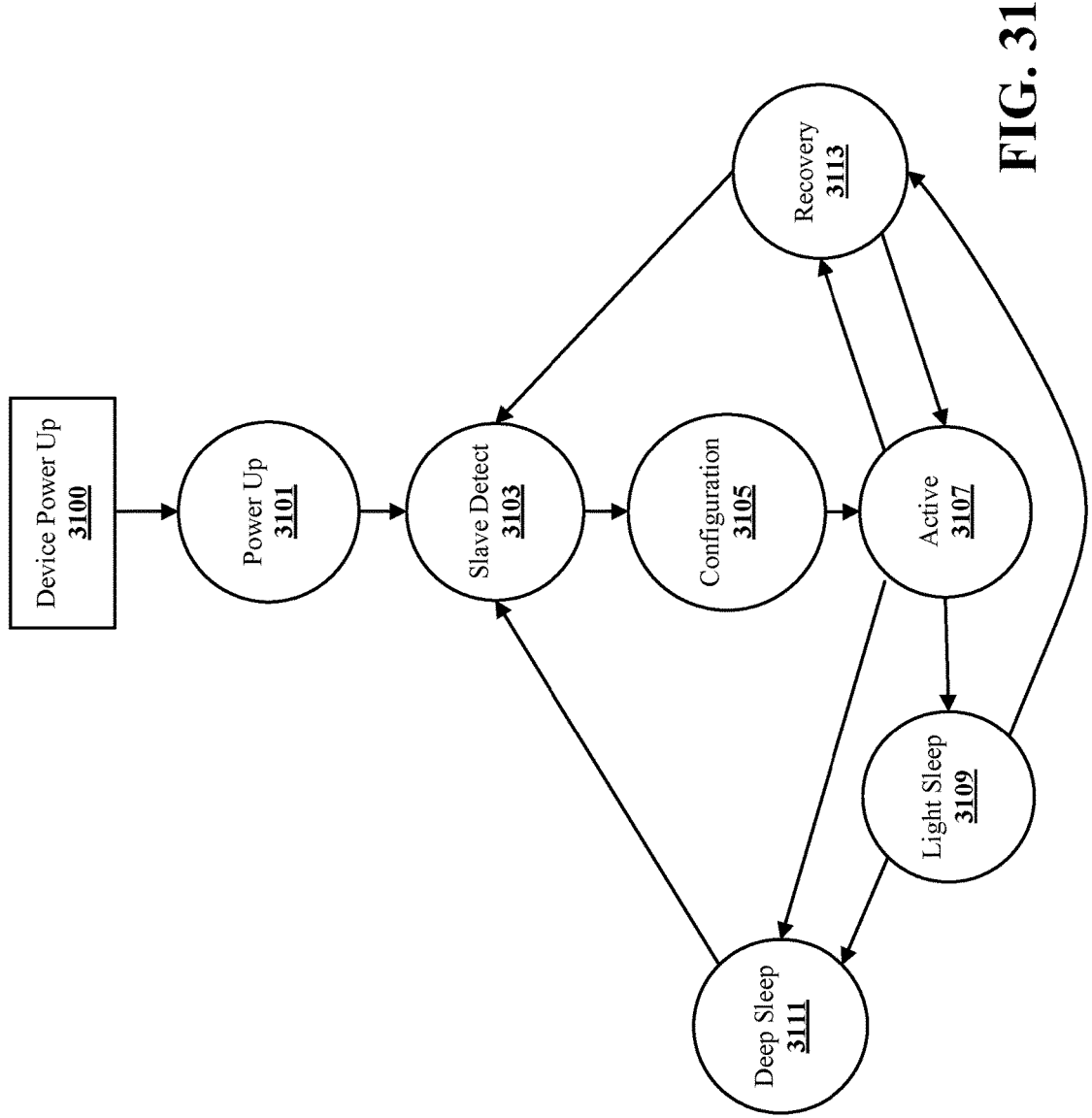
FIG. 31 illustrates an example state machine that can be used to track the status of a high-speed serial link.

FIG. 31 illustrates an example state machine that can be used to track the status of a high-speed serial link in accordance with various embodiments. At a device power up 3100, the link enters a power us state 3101. The link can transition to a slave detect state 3103. From slave detect state 3103, the link can transition to a configuration state 3105. From configuration state 3105, the link can transition to an active state 3107. Additional states include a light sleep state 3109, a deep sleep state 1311, and a recovery state 3113. The movement between states is determined by a variety of external factors including sequences, external inputs and errors.

Two sideband signals can be used to control the operation states of the serial interconnect. These signals can be low speed, mainly static, signals that indicate in which state the serial interconnect is in and/or in which state the serial interconnect will move to. In some embodiments, the sideband signals can be link_en and link_req as described above with reference to FIG. 2. In this example, link_en can be sent from master (e.g., BBIC) to slave (e.g., RFIC), and can have two uses, the first at cold boot, and the second during standard operation. At cold boot, a sequencer at the slave side can use a ROM Code to boot following the policy defined, link_en, as input to the slave, is expected to be '0b. In the case link_en is set to '1b at power-on reset (POR), then the normal boot sequence will not execute, and the slave will enter a "test/debug" modes, and based on general-purpose input/output (GPIO) setting at POR, the RF front end (RFFE) or other debug features will be activated. During operation, the RFIC can be the slave of the BBIC, and the SERDES PHY clock can be provided by BBIC. The only way for slave to know if the SERDES clock is available, ready for operation, meaning the SERDES clock can be used by the slave SERDES PHY is to detect a '1b on link_en. Therefore, following the power policy, a master sequencer will assert link_en accordingly to the state of the SERDES PHY clock.

With regard to the link_req signal, this signal can be sent from the slave (e.g., RFIC) to the master (e.g., BBIC). When the serial interconnect has been turned down, i.e., put in sleep mode to save power, but slave is still active, such that RxFE, TxFE are creating/consuming data and interrupts/events are being generated, the slave may need to send information to master before the standard wake up policy controlled by master put back the serial interconnect active. To have traffic re-established, a link_req will be controlled by the slave sequencer and will trigger the master sequencer to wake-up the serial interconnect, meaning re-starting HS mode traffic following the defined policy.

An example list of link power management states in accordance with various embodiments is shown in Table 11 below:

TABLE 11

| | Example link power management states | | | | |
|---|---|---|---|---|---|
| PHY Block | Q0 | Q1 | Q2 | Q3 | Q4 |
| Tx | Normal HS mode All sub-blocks On | ON: Internal dividers Clock buffer Electrical idle Driver LDO Off: Output driver in high-Z Serializer | On: Electrical idle Driver LDO Off: Output driver in high-Z Serializer Clock buffer | On: Electrical idle Off: All others | Power down All termination in high-Z |
| Rx | | ON: Internal dividers Clock buffer Signal detect Off: Input receiver Deserializer | On: Signal detect Off: Clock buffer Input receiver Deserializer | Power down All termination in high-Z | na |

TABLE 11-continued

Example link power management states

| PHY Block | Q0 | Q1 | Q2 | Q3 | Q4 |
|---|---|---|---|---|---|
| Master Clock | | On: DLL Electrical idle Bias Off: Output driver | On: Electrical idle Bias Off: DLL Output driver | Power down All termination in high-Z | na |
| Slave Clock | | On: Clock signal detection Off: Input Receiver disable | Power down All termination in high-Z | na | na |
| PLL | active | | na | na | na |

Example power states based on the power state definitions in Table 11 in accordance with various embodiments are shown in Table 12 below:

TABLE 12

Example power states

| LINK SYSTEM STATE SETUP | RFIC_TX0 | RFIC_TX1 | RFIC_TX2 | RFIC_CK0 | RFIC_RX0 | RFIC_POWER (mW) | RFIC_EXIT_LATENCY | BBIC_RX0 |
|---|---|---|---|---|---|---|---|---|
| 1 | Q0 | Q0 | Q0 | Q0 | Q0 | 16.8 | NA | Q0 |
| 2 | Q1 | Q1 | Q1 | Q0 | Q1 | 7.9 | ~1 ns | Q1 |
| 3 | Q2 | Q2 | Q2 | Q1 | Q2 | 1.2 | ~40 ns + Controller Needs to re-align | Q1 |
| 4 | Q2 | Q2 | Q2 | Q1 | Q2 | 1.2 | ~40 ns + Controller Needs to re-align | Q2 |
| 5 | Q3 | Q3 | Q3 | Q1 | Q3 | 0.4 | ~100 ns + Controller Needs to re-align | Q3 |
| 6 | Q3 | Q3 | Q3 | Q1 | Q3 | 0.37 | ~100 ns + Controller Needs to re-align | Q3 |
| 7 | Q4 | Q4 | Q4 | Q2 | Q3 | 0.13 | Needs Reset Pin to Wake up. + 110 ns | Q3 |

| LINK SYSTEM STATE SETUP | BBIC_RX1 | BBIC_RX2 | BBIC_CK0 | BBIC_PLL | BBIC_TX0 | BBIC_POWER (mA) | BBIC_EXIT_LATENCY |
|---|---|---|---|---|---|---|---|
| 1 | Q0 | Q0 | Q0 | Q0 | Q0 | 17.5 | NA |
| 2 | Q1 | Q1 | Q0 | Q0 | Q1 | 10.0 | ~1 ns |
| 3 | Q1 | Q1 | Q1 | Q0 | Q1 | 7.9 | ~1 ns |
| 4 | Q2 | Q2 | Q1 | Q0 | Q2 | 4.1 | ~40 ns + Controller Needs to re-align |

TABLE 12-continued

| | | | Example power states | | | | |
|---|---|---|---|---|---|---|---|
| 5 | Q3 | Q3 | Q2 | Q0 | Q3 | 1.8 | ~100 ns + Controller Needs to re-align |
| 6 | Q3 | Q3 | Q3 | Q1 | Q4 | 0.13 | ~2 us + Controller Needs to re-align |
| 7 | Q3 | Q3 | Q3 | Q1 | Q4 | 0.13 | ~2 us + Controller Needs to re-align |

QL0 can be a high speed operational link. Data and messages can be received and transmitted. Speed, configuration (number of lanes), and supported power saving capabilities can be previously negotiated. The master can send a ping to slave on entry to QL0 state from QL1 (i.e. there was a change in link speed). QL0 may have one or more QL0x sub-states allowing some low latency power saving if link is unidirectional for some period of time. QL01s can be a high speed light sleep. One or both sub-links can have transmitter in electrical idle, while other party's receiver is on and ready to receive data. QL0s can be a high speed sleep. One or both sub-links can have transmitter in electrical idle, while other party's receiver is in sig_det mode. QL0p can be a high speed link power down/hibernate/deep sleep. Power can be more aggressively conserved in QL0p at the expense of increased resume latency. Zero or more QL0p states may be defined but if one or more QL0p states are supported, transitions between these states must pass through QL0.

QL01 can be a high speed loopback test modes. Transition to this state can occur from QL0 state. Transition out of this state can be to QL0p or QL0 and is left up to the implementation.

QL1 can be a base speed operational link. A mandatory base capability communication link can be supported by all current and future devices. It is envisioned that this is a single lane full duplex (dual simplex) link operating at the lowest supported speed of all devices. The master would send a ping to slave on entry to QL1 state from QL0 (i.e. there was a change in link speed) or from QL2 (device power up, first time link is up since reboot). QL1 may have one or more QL1x sub-states allowing some low latency power saving if link is unidirectional for some period of time. QL1ls can be a low speed light sleep. One or both sub-links can have transmitter in electrical idle, while other party's receiver is on and ready to receive data. QL1s can be a low speed sleep. One or both sub-links can have transmitter in electrical idle, while other party's receiver is in sig_det mode. QL1p can be a base link power down/hibernate/deep sleep. Zero or more QL1p states may be defined but if one or more QL1p states are supported, transitions between these states must pass through QL1.

QL11 can be a base speed loopback test modes. Transition to this state can occur from QL1 state. Transition out of this state can be to QL1p or QL1 and is left up to the implementation.

QL2 can be a device power up, no link available. This is the state of the device immediately after boot, for example.

Figure 32:
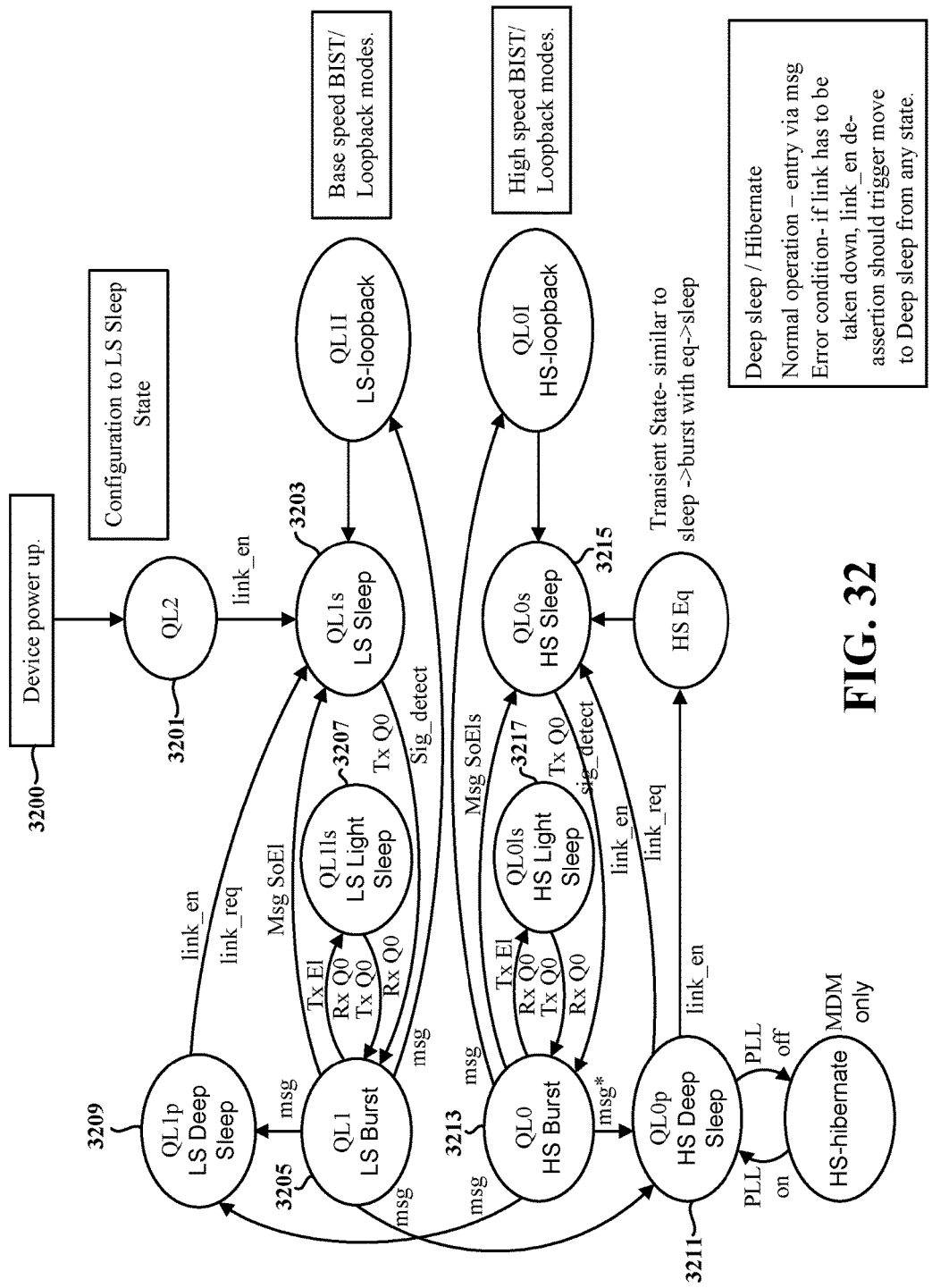
FIG. 32 is an example state diagram showing example power states and power state transitions.

FIG. 32 is an example state diagram showing example power states and power state transitions in accordance with various embodiments. At 3201, the device powers up into state QL2 (3201). From QL2 (3201), the device can transition to QL1s (3203) LS Sleep by the following method. Master Clock on LS, Rx active, Tx electrical idle, link_en asserted. Slave detects link_en, turns on Clock receiver, Rx Signal Detect/Tx active. Slave sends alignment pattern once 5×130 bits and goes to Tx electrical idle, Rx sig_det, Rx clock active (LS Sleep). When master detects alignment, the master moves to LS Sleep.

From QL1 (3205) LS Burst the device can transition to QL1ls (3207) LS Light Sleep by the following method. Initiator detects nothing to send and switches Tx to electrical idle. Follower leaves receiver in active state.

From QL1ls (3207) LS Light Sleep the device can transition to QL1 (3205) HS Burst by the following method. Initiator detects something to send and switches Tx to active state. Follower leaves receiver in active state.

From QL1s (3203) LS Sleep, which is a timed option the device can transition to QL1 (3205) LS Burst by the following method. Initiator sends N EoEI (end of electrical idle) sequences. Follower detects sig_det, switches Rx to active mode.

From QL1s (3203) LS Sleep, which is a follower response option the device can transition to QL1 (3205) LS Burst by the following method. Step 1: I: Check to see if Rx Sub-link is active. If RxsubLinkActive==0; FS2 I: RxsubLinkActive==0, Follower Sleeping; FS3 I: Rx Q0, Tx Drive 1; FS4 F: Sig Detect; FS5 F: Rx Q0, Tx Drive1; FS6 I: Sig_det; FS7 I: Tx Alignment; FS8 F: Alignment Done; FS9 F: Tx Alignment; FS10 I: Alignment Done; FS11 BBIC: Send Ping; FS12 RFIC: ACK/NACK; FS13 F: Sleep if nothing to send; else; FA2 I: RxSubLinkActive==1, Follower Awake; FA3 I: Rx Q0, Tx Drive 1; FA4 F: Sig Detect; FA5 F: Tx Send Message; FA6 I: Wait message—if Rx sig_det drops, move to other track, FS 6; FA7 I: Tx Alignment; FA8 F: Alignment done; FA9 F: Send Ready MSG Pass/Fail; FA10 I/F: If NACK, goto FA7.

From QL1 (3205) LS Burst the device can transition to QL1s (3203) LS Sleep by the following method. Burst Msg SoEI (start of electrical idle)—sender then puts Tx to electrical idle, recipient of msg puts Rx to sig_det mode.

From QL1p (3209) LS Deep Sleep/Hibernate the device can transition to QL1s (3203) LS Sleep by the following method. Process started with link_en or link_req. If Hibernating, master configs PLL. Master starts Tx of HS clock, Rx active, Tx electrical idle, link_en asserted. Slave detects link_en, turns on Clock receiver in HS mode, Clock calibration, Rx Signal Detect, Tx active. Slave sends alignment pattern once—5×130 bits and goes to Tx electrical idle, Rx sig_det, Rx clock active (LS Sleep). When master detects alignment, the master moves to LS Sleep.

From QL1 (3205) LS Burst the device can transition to QL1p (3209) LS Deep Sleep/Hibernate by the following method. Master sends LS_HIBERNATE message to slave, slave acks. Master turns off Rx to off. Master puts Tx in EI. Slave drops Tx, Rx to off, and disables clock input. Master de-asserts link_en. Master turns off clock block and Tx block.

From QL1 (3205) LS Burst the device can transition to QL0p (3211) HS Deep Sleep/Hibernate by the following method. Master sends HS_HIBERNATE message to slave, slave acks. Master turns off Rx to off. Master puts Tx in EI. Slave drops Tx, Rx to off, and disables clock input. Master de-asserts link_en. Master turns off clock block and Tx block.

From QL1p (3209) LS Hibernate the device can transition to QL3 (not shown, equivalent to QL2, power off) by the following method. Master received power down cmd from Q6, master informed slave to enter hibernate with power down expectations (no wake-up), master informs Q6 when both are in hibernate and enters Q3 terminal state.

QL0p (3211) HS Hibernate the device can transition to QL3 (power off) by the following method. Master received power down cmd from Q6, master informed slave to enter hibernate with power down expectations (no wake-up), master informs Q6 when both are in hibernate and enters Q3 terminal state.

From QL0 (3213) HS Burst the device can transition to QL1p (3209) LS Deep Sleep/Hibernate by the following method. Master sends LS_HIBERNATE message to slave, slave acks. Master turns off Rx to off. Master puts Tx in EI. Slave drops Tx, Rx to off, and disables clock input. Master de-asserts link_en. Master turns off clock block and Tx block.

From QL0 (3213) HS Burst the device can transition to QL0p (3211) HS Deep Sleep/Hibernate by the following method. Master sends HS_HIBERNATE message to slave, slave acks. Master turns off Rx to off. Master puts Tx in EI. Slave drops Tx, Rx to off, and disables clock input. Master de-asserts link_en. Master turns off clock block and Tx block.

From QL0p (3211) HS Deep Sleep/Hibernate the device can transition to QL0s (3215) HS Sleep by the following method. Process started with link_en or link_req. If Hibernating, master configs PLL. Master starts Tx of HS clock, Rx active/CDR enable, Tx electrical idle, link_en asserted. Slave detects link_en, turns on Clock receiver in HS mode, Clock calibration, Rx Signal Detect/CDR, Tx active. Slave sends CDR pattern, alignment pattern once—5×130 bits and goes to Tx electrical idle, Rx sig_det, Rx clock active (HS Sleep). When master detects alignment, the master moves to HS Sleep.

From QL0p (3211) HS Deep Sleep/Hibernate, with equalization (first time since cold boot), the device can transition to QL0s (3215) HS Sleep by the following method. Process started with link_en. Must be carried through on first transition from cold boot, so BBIC is driving transition to get EQ done. Similar to regular hibernation to sleep transition except both sub-links must be brought up with eq, and a ping sent from BBIC. If Hibernating, master configs PLL. Master starts Tx of HS clock, Rx active/CDR enable, Tx electrical idle, link_en asserted. Slave detects link_en, turns on Clock receiver in HS mode, Clock calibration, Rx Signal Detect/CDR, Tx active. Both send eq pattern for specified time, CDR pattern for specified time, and alignment pattern once. BBIC sends ping RFIC sends ACK. Both then set Tx electrical idle, Rx sig_det, Rx clock active (HS Sleep).

From QL0 (3213) HS Burst the device can transition to QL0ls (3217) HS Light Sleep by the following method. Initiator detects nothing to send and switches Tx to electrical idle. Follower leaves receiver in active state.

From QL0ls (3217) HS Light Sleep the device can transition to QL0 (3213) HS Burst by the following method. Initiator detects something to send and switches Tx to active state. Follower leaves receiver in active state.

From QL0s (3215) HS Sleep, which is a timed option the device can transition to QL0 (3213) HS Burst by the following method. Initiator sends N EoEI (end of electrical idle) sequences. Follower detects sig_det, switches Rx to active mode, with Rx CDR enabled. Follower detects alignment and disables Rx CDR.

From QL0s (3215) HS Sleep, which is a follower response option the device can transition to QL0 (3213) HS Burst by the following method. Step 1: I: Check to see if Rx Sub-link is active. If RxsubLinkActive==0; FS2 I: RxsubLinkActive==0, Follower Sleeping; FS3 I: (Rx is already in sig_det), Tx Drive 1; FS4 F: Sig Detect rises; FS5 F: Rx Q0/CDR enable, Tx drive CDR pattern; FS6 I: Sig_det rises, RxQ0/CDR enable, Tx drive CDR pattern; FS7 I: waits CDR timer value, then sends Tx Alignment; FS8 F: Alignment Done; FS9 F: waits CDR timer value, then sends Tx Alignment; FS10 I: Alignment Done; FS11 BBIC: Send Ping; FS12 RFIC: ACK/NACK; FS13 F: Sleep if nothing to send; else; FA2 I: RxSubLinkActive==1, Follower Awake; FA3 I: Tx Drive 1; FA4 F: Sig Detect falling; FA5 F: Tx Send Message; FA6 I: Wait message—if Rx sig_det drops, move to other track, FS 6; FA7 I: Tx CDR/Eq pattern, then Alignment; FA8 F: Alignment done; FA9 F: Send Ready MSG Pass/Fail; FA10 I/F: If NACK, goto FA7.

From QL0 (3213) HS Burst the device can transition to QL0s (3215) HS Sleep by the following method. Burst Msg SoEI (start of electrical idle)—sender then puts Tx to electrical idle, recipient of msg puts Rx to sig_det mode.

There are various methods of implementing power state transitions in accordance with various embodiments. For example, a method to power up state QL2 can be implemented by top level powers up link devices. A method to do minimal boot and wait for other party if needed can be implemented by sideband signal link_en is used to initiate boot sequence. A method to setup a minimal base communication link, QL1 can be implemented by ROM code on slave, PDMEM loaded by top level on master. Methods to retrieve slave device capabilities, connection configuration, rate capabilities, supported power states configuration details, supported test and loopback states, error detection and handling procedures, boot parameters can be implemented by message signaling and memory reads over low speed link for device capabilities, memory write and jump message from master to slave, etc., as necessary. A Master SEQ can determine QL0 parameters based the Master SEQ's own capabilities and slaves capabilities. A Master SEQ can determine error detection and handling parameters based the Master SEQ's own capabilities and slaves capabilities. A method to signal chosen rate and configuration for QL0 to slave can be implemented by Master message to slave. A method to initiate change of speed from QL1 to QL0 can be implemented by master message to slave. A method to signal state changes from between sub-link active to sub-link sleep can be implemented by initiator of traffic moves Tx from Q1 to Q0, and the recipient can detect a change in state using phy Rx signal detect. A method to signal state changes from QL0 to QL0p. or QL1 to QLp can be implemented. In normal operation, the master can indicate mandatory transitions using messages. In error recovery, the master can indicate mandatory transitions using link_en. A method to signal change to loopback test state can be implemented by the master indicating transition using message to slave. A method to signal change from loopback test state to deep sleep can be implemented, depending on loopback mode, by the master indicating transition using a message to the slave (assuming slave can monitor loop-back data for messages), or by a timer ending state.

Figure 33:
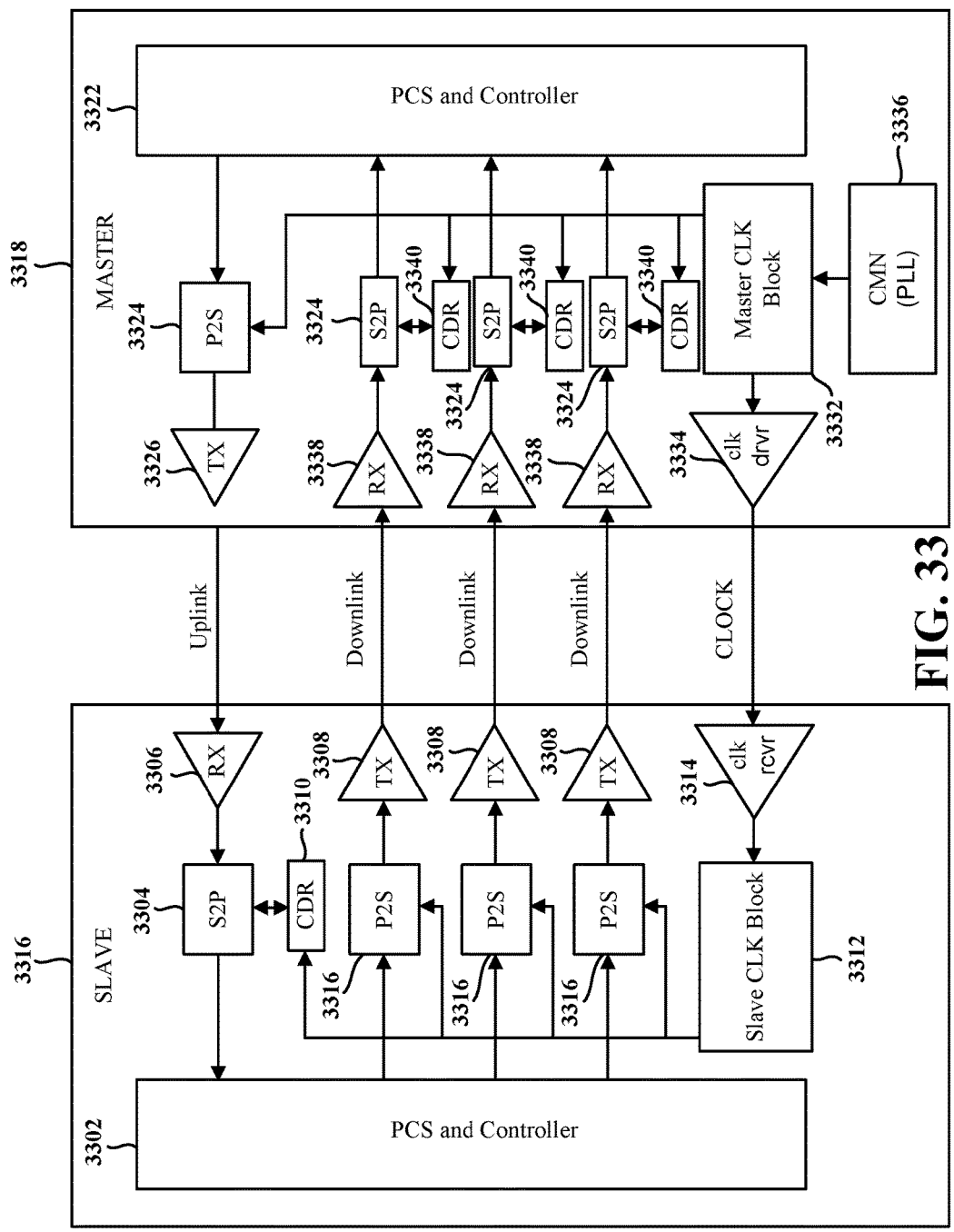
FIG. 33 is a diagram illustrating an example of a master inter-device link PHY block and an example of a slave inter-device link PHY block.

FIG. 33 is a diagram illustrating an example of a master inter-device link PHY block 3318 and an example of a slave inter-device link PHY block 3316 in accordance with the systems and methods described herein. The slave inter-device link PHY block 3316 includes a PCS and controller 3302 that may be used to control the functionality within the slave inter-device link PHY block 3316. The PCS and controller 3302 may receive uplink data from a serial-to-parallel converter 3304 that is coupled to a receive block 3306. The receive block 3306 may receive serial data over the uplink from the master inter-device link PHY block 3318. The serial data received by the receive block 3306 may be converted to parallel data using the serial-to-parallel converter 3304. The PCS and controller 3302 may then read the parallel data from the serial-to-parallel converter 3304. The serial-to-parallel converter 3304 may be driven by a clock and data recovery (CDR) block 3310. A single uplink channel is used. It will be understood that in other examples more uplink channels may be used. Further, it will be understood that systems that are intended for receive only functionality may not include an uplink.

The PCS and controller 3302 may send downlink data to the master inter-device link PHY block 3318 using a series of parallel-to-serial converters 3316 and transmit blocks 3308. For example the PCS and controller may write parallel data to one or more of the parallel-to-serial converters 3316. The parallel-to-serial converters 3316 may convert any parallel data received to serial data for transmission by the transmit block 3308. In the illustrated example of FIG. 33 there are three downlink channels that the PCS and controller may choose between when sending data to the master inter-device link PHY block 3318. It will be understood that more downlink channels or fewer downlink channels may be used in a particular implementation. For example, systems that are intended to transmit only may not include any downlink. Generally, however systems will have a mix of uplink and downlink channels.

The slave inter-device link PHY block 3316 includes a clock receiver 3314 that is coupled to the master inter-device link PHY block 3318 and may receive a clock from the inter-device link master. Using a common clock between the master inter-device link PHY block 3318 and the slave inter-device link PHY block 3316 may allow the slave inter-device link PHY block 3316 and the master inter-device link PHY block 3318 to be synchronized with each other or nearly synchronized with each other depending on any delay that may be present in the clock path. The clock receiver 3314 inputs the received clock signal to the slave clock block 3312 which may be used to distribute the clock to the parallel-to-serial converters 3316 and the CDR block 3310.

The master inter-device link PHY block 3318 includes a PCS and controller 3322 that may control the inter-device link master 3318. The PCS and controller 3322 may send data through the uplink to the slave inter-device link PHY block 3316 by writing parallel data to the parallel-to-serial converter 3324. The parallel-to-serial converter 3324 may convert the parallel data to serial data that may be input into the transmit block 3326. The transmit block 3326 in the master inter-device link PHY block 3318 may then transmit the data serially along the uplink to the slave inter-device link PHY block 3316 where the data is received by the receive block 3306. Downlink data may be received by the master inter-device link PHY block 3318 at receive block 3338. The receive blocks 3338 are each coupled to a serial-to-parallel converter 3324 which are each controlled by a CDR 3340. The serial-to-parallel converters 3324 may convert any serial data received from the receive block 3338 to parallel and the parallel data may be read by the PCS and controller 3322.

The master inter-device link PHY block 3318 may include a master clock block 3332 which may be used to generate a clock signal. The clock signal generated by the master clock block 3332 may be distributed to the CDRs 3340 and the parallel-to-serial converter 3324. Additionally, the master clock block 3332 may distribute a clock to the clock driver to 3334 which may then transmit a clock signal to the slave inter-device link PHY block 3316. The master clock block 3332 may be coupled to a PLL 3336 which may be used as part of the clock generating process.

As described above, the master inter-device link PHY block 3318 includes a PCS and controller 3322. Additionally as also described above the slave inter-device link PHY block 3316 also includes a PCS and controller 3302. Each of the PCS and controller 3322, 3302 may include a processor such as a microprocessor, a microcontroller, a digital signal processor (DSP), or other programmable controller. By using a controller that is programmable such as, for example, a microcontroller, the link between the master and slave may be reconfigurable. The controllers 3302, 3322 may include a programmable processor configured to implement a programmable state machine. The programmable state machine may be configured to control at least one of initiation of the physical layer link, bit alignment of a signal received by a receiver, bit alignment of a signal transmitted by a transmitter, training, power management, testing, loopback modes, debugging modes, error handling, phase-locked-loop initialization, or reset handling and wherein the functionality of the at least one of initiation of the physical layer link, bit alignment of a signal received by the receiver, bit alignment of a signal transmitted by the transmitter, training, power management, testing, loop-back modes, debugging modes, error handling, phase-locked-loop initialization, or reset handling is programmable by reprogramming the programmable processor such that at least one of a boot up sequence, power management protocol, or testing protocol is reconfigurable.

Figure 34:
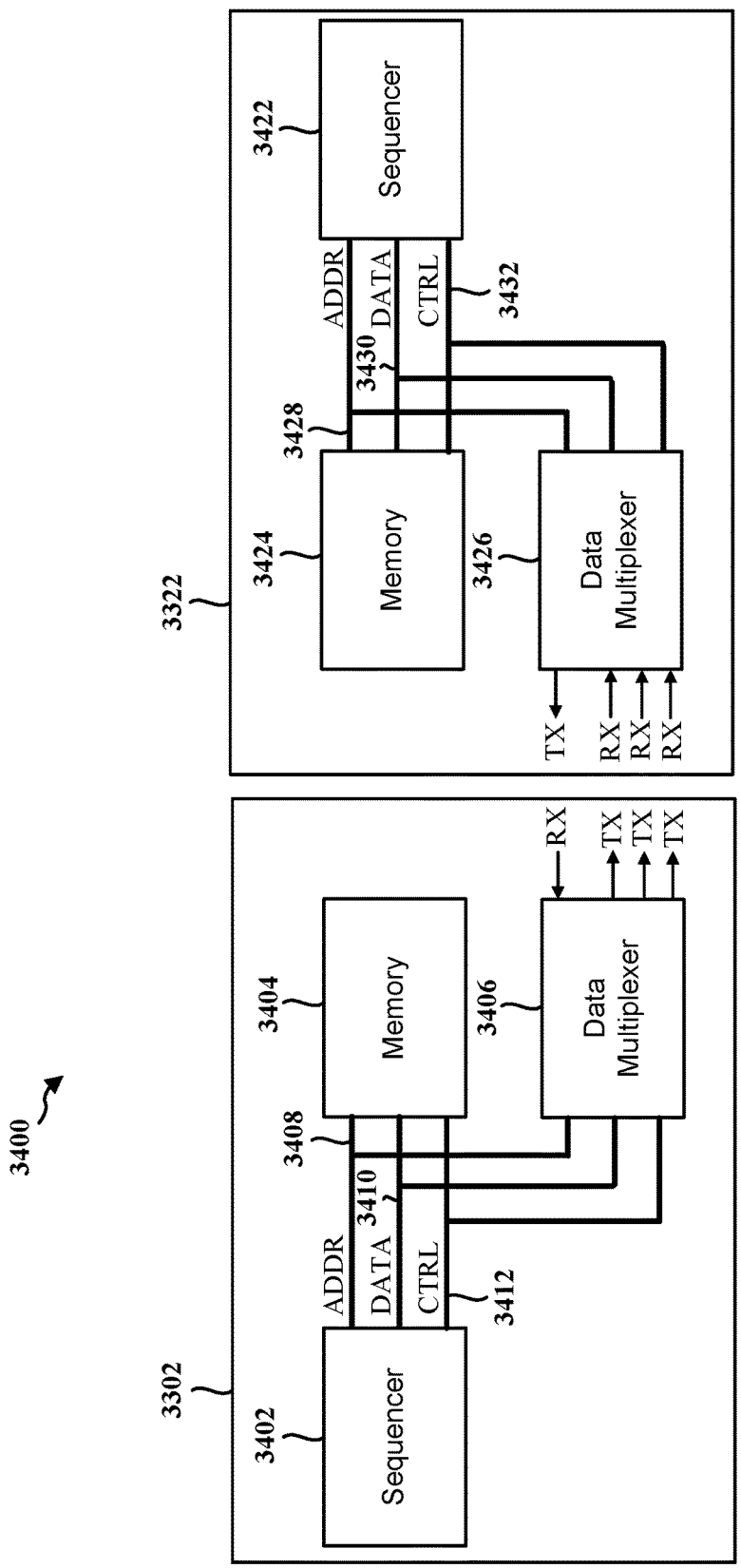
FIG. 34 is a conceptual block diagram illustrating a pair of example controllers.

FIG. 34 is a conceptual block diagram illustrating a pair of example controllers in accordance with the systems and methods described herein. A processing system 3400 includes the PCS and controller 3302 of slave inter-device link PHY block 3316 and the PCS and controller 3322 of the master inter-device link PHY block 3318. Each PCS and controller 3302, 3322 includes a sequencer 3402, 3422 and a memory 3404, 3424. Each of the sequencers 3402, 3422 may be a microprocessor, microcontroller, digital signal processor (DSP), or other processing circuitry. The memory 3403, 3405 may be a multibank memory, such as a synchronous dynamic random access memory (SDRAM), or any other multibank component capable of retrieving and storing information.

The PCS and controller 3302 includes the sequencer 3402. The sequencer 3402 is connected to the memory 3403. The connections between the sequencer 3402 and the memory 3403 include an address bus 3408, a data bus 3410, and a control bus 3412. The data bus 3410 may be used to read data and write data between the sequencer 3402 and the memory 3403. The control bus 3412 may include signals used to control the writing of data from the sequencer 3402 to the memory 3403. The control bus 3412 may include signals used to control the reading of data from the memory 3403 to the sequencer 3402. For example, the control bus 3412 may include signals such as a read signal and a write signal. The read signal may be a single signal line that indicates when the memory is being read by the sequencer 3402. The write signal may be a single signal line that indicates when the memory is being written by the sequencer 3402. In some examples the control bus 3412 may also include a bite enable signal. The bite enable signal may be a group of signal lines that indicate the size of the data, e.g., 8, 16, 32, 64 bytes. In some examples however, the size of the data may be fixed, e.g., 64 bytes. Accordingly, the bite enable signal may be optional on the control bus 3412.

Other optional signals that may be part of the control bus 3412 include, but are not limited to, transfer acknowledgment (ACK), bus request, bus grant, interrupt request, clock signals, and reset signals. The transfer acknowledge signal may indicate that data is acknowledged by a device, e.g., the sequencer 3402, as being read. The bus request may indicate that a device, e.g., the sequencer 3402 or the memory 3403 is requesting the bus, e.g., use of the address bus 3408 and one of the write data bus 3410 or the read data bus 3410. The bus grant may indicate that the sequencer 3402 has granted access to the bus. The interrupt request may indicate to the sequencer 3402 that a lower priority device is requesting the bus. Any clock signals on the control bus 3412 may be used to synchronize devices on the control bus 3412 such as the sequencer 3402, the memory 3403, or both.

The reset may be used to reset the sequencer 3402, the memory 3403, or both. Typically the reset may be used to reset the sequencer 3402. The signals described above as optional are generally not used in the example system described below, but may be used in a particular implementation of the systems and methods described.

The address bus 3408 may be used to indicate an address within the memory 3403 which the sequencer is reading or writing. For example, if the sequencer 3402 wishes to read a memory location in the memory 3403 the sequencer may output the address of the memory location on the address bus 3408. Additionally, the sequencer 3402 may drive the read signal active. The read signal may be part of the control bus 3412. The memory 3403 may then output the data in the memory location indicated by the address bus 3408 on the data bus 3410. Similarly, if the sequencer 3402 wishes to write a memory location in the memory 3403, the sequencer may output the address of the memory location on the address bus 3408. Additionally, the sequencer 3402 may drive the write signal active. The write signal may be part of the control bus 3412. The sequencer 3402 may drive the data bus 3410 with the data that is to be written to the memory 3403. The sequencer 3402 may drive the write data bus 3410 with the data that is to be written to the memory 3403 at the address on the address bus 3408.

As illustrated in FIG. 34, the sequencer 3402 may also access a data multiplexer 3406 that may send and receive data. In some examples, the sequencer 3402 may read data from the uplink and write data to the downlink using the data multiplexer 3406. In some examples, data from the data multiplexer 3406 may be written to the memory 3403. In some examples, data from the memory 3403 may be written to the data multiplexer 3406. In some examples, the data multiplexer 3406 may be configured to loop received data to one or more transmit outputs of the data multiplexer.

The PCS and controller 3322 includes the sequencer 3422. The sequencer 3422 is connected to the memory 3403. The connections between the sequencer 3422 and the memory 3403 include an address bus 3428, a data bus 3420, and a control bus 3432. The data bus 3430 may be used to read data and write data between the sequencer 3422 and the memory 3403. The control bus 3432 may include signals used to control the writing of data from the sequencer 3422 to the memory 3403. The control bus 3432 may include signals used to control the reading of data from the memory 3403 to the sequencer 3422. For example, as discussed above, the control bus 3432 may include signals such as a read signal, a write signal, and a bite enable signal (optional). Other optional signals that may be part of the control bus 3412 include, but are not limited to, transfer acknowledgment (ACK), bus request, bus grant, interrupt request, clock signals, and reset signals.

The address bus 3428 may be used to indicate within the memory 3403 where the sequencer is reading or writing. For example, if the sequencer 3422 wishes to read a memory location in the memory 3403 the sequencer may output the address of the memory location on the address bus 3428. Additionally, the sequencer 3422 may drive read signal active. The read signal may be part of the control bus 3432. The memory 3403 may then output the data in the memory location indicated by the address bus 3428 on the read data bus 3430. Similarly, if the sequencer 3422 wishes to write a memory location in the memory 3403, the sequencer may output the address of the memory location on the address bus 3408. Additionally, the sequencer 3422 may drive the write signal active. The write signal may be part of the control bus 3432. The sequencer 3422 may drive the write data bus 3430 with the data that is to be written to the memory 3403 at the address on the address bus 3428.

As illustrated in FIG. 34, the sequencer 3422 may also access a data multiplexer 3426 that may send and receive data. In some examples, the sequencer 3422 may read data from the uplink and write data to the downlink using the data multiplexer 3426. In some examples, data from the data multiplexer 3426 may be written to the memory 3403. In some examples, data from the memory 3403 may be written to the data multiplexer 3426. In some examples, the data multiplexer 3426 may be configured to loop received data to one or more transmit outputs of the data multiplexer.

Figure 35:
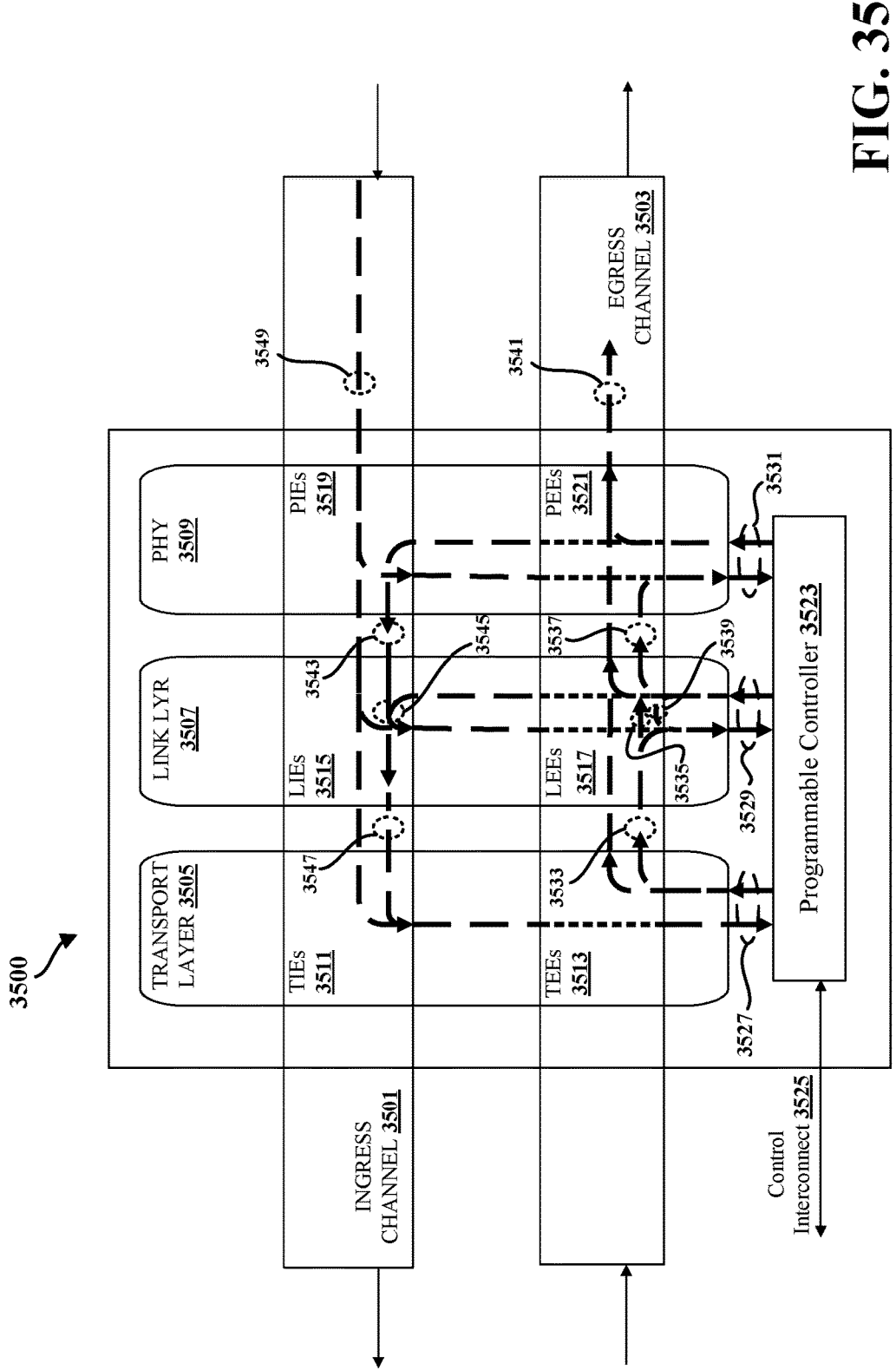
FIG. 35 is an example high-speed serial transceiver with programmable distributed data processing functionality.

FIG. 35 is an example high-speed serial transceiver apparatus 3500 with programmable distributed data processing functionality in accordance with various embodiments. Transceiver apparatus 3500 can include an ingress channel 3501 that processes serial data received by the transceiver apparatus, and an egress channel 3503 that processes data for serial transmission by the transceiver apparatus. Transceiver apparatus 3500 can also include a transport layer 3505 (such as packetization layer 802 of FIG. 8), a link layer 3507 (such as link layer 804 of FIG. 8), and a PHY 3509 (such as PHY 806 of FIG. 8). As shown in FIG. 35 at the overlap of transport layer 3505 and ingress channel 3501, the transport layer can include transport-layer ingress elements (TIEs) 3511, which are elements of the transport layer that process data in the ingress channel. Likewise, as shown in FIG. 35 at the overlap of transport layer 3505 and egress channel 3503, the transport layer can include transport-layer egress elements (TIEs) 3513, which are elements in the transport layer that process data in the egress channel. Transceiver apparatus 3500 can also include. Similarly, link layer 3507 can include link-layer ingress elements (LIEs)

3515 that process data in the ingress channel and link-layer egress elements (LEEs) 3517 that process data in the egress channel. PHY 3509 can include PHY ingress elements (PIEs) 3519 that process data in the ingress channel and PHY egress elements (PEEs) 3521 that process data in the egress channel. Some examples of ingress elements and egress elements can include packetizers, de-packetizers, aligners, transmitters, receivers, buffers, registers, etc.

Transceiver apparatus 3500 can also include a programmable controller 3523 that can execute computer-executable code to perform various operations. Programmable controller 3523 can be reprogrammed via a control interconnect 3525. For example, computer-executable code stored in programmable controller 3523 can be modified, updated, etc., via control interconnect 3525. Programmable controller 3523 can communicate via control interconnect 3525, for example, to report results of testing, report errors, etc., as will be discussed in more detail below.

Programmable controller 3523 can be connected to transport layer 3505 via transport layer interconnect 3527, which can allow the programmable controller to communicate with the elements of the transport layer that process channel data, such as TIEs 3511 and TEEs 3513. Programmable controller 3523 can be connected to link layer 3507 via link layer interconnect 3529, which can allow the programmable controller to communicate with the elements of the link layer that process channel data, such as LIEs 3515 and LEEs 3517. Programmable controller 3523 can be connected to PHY 3509 via PHY interconnect 3531, which can allow the programmable controller to communicate with the elements of the PHY that process channel data, such as PIEs 3519 and PEEs 3521.

The interconnects between programmable controller 3523 and the various data processing elements of transport layer 3505, link layer 3507, and PHY 3509 can allow the programmable controller to utilize the data processing functionality of these elements to process data. In other words, data processing tasks can be distributed among programmable controller 3523, data processing elements of transport layer 3505, data processing elements of link layer 3507, and data processing elements of PHY 3509. Thus, connection of programmable controller 3523, at least one data processing element of one of the three layers, and at least one data processing element of another of the three layers can form the structure of a programmable distributed data processor. In this way, for example, programmable controller can offload data processing work, which can allow the programmable controller to be smaller and to operate faster. Furthermore, because the distributed data processing is accomplished by elements in ingress channel 3501 and/or egress channel 3503, programmable controller 3523 can be specialized to analyze, adjust, test, diagnose, control, etc., these elements efficiently and quickly. This can provide advantages particularly in high-speed, low-power serial transceivers.

As shown in FIG. 35, the interconnects can create various data processing paths over which programmable controller 3523 can send data. For example, programmable processor 3523 can send data through a data path 3533, which includes transport layer interconnect 3527, one or more of TEEs 3513, the part of egress channel 3503 between transport layer 3505 and link layer 3507, one or more of LEEs 3517, and link layer interconnect 3529 to the programmable controller.

Another processing path, data path 3535, can include transport layer interconnect 3527, one or more of TEEs 3513, the part of egress channel 3503 between transport layer 3505 and link layer 3507, one or more of LEEs 3517, the part of egress channel 3503 between link layer 3507 and PHY 3509, one or more PEEs 3521, and PHY interconnect 3531 to the programmable controller. Another processing path, data path 3537, can include link layer interconnect 3529, one or more of LEEs 3517, the part of egress channel 3503 between link layer 3507 and PHY 3509, one or more PEEs 3521, and PHY interconnect 3531 to the programmable controller.

Some data paths can utilize the data processing elements of a single layer only. For example, in a data path 3539, programmable controller 3523 sends data through link layer interconnect 3529 to be processed by one or more LEEs 3517, and the processed data is returned to the programmable processor through the link layer interconnect. Similar processing paths can exist for data processing using only TIEs 3511, only TEEs 3513, only LIEs 3515, only PIEs 3519, or only PEEs 3521.

Some processing paths do not return to programmable controller 3523. For example, programmable controller 3523 can send data through PHY interconnect 3531 to be processed by one or more PEEs 3521 and transmitted as transmitted data 3541. Likewise, programmable controller 3523 can send data through link layer interconnect 3529 to be processed by one or more LEEs 3517, sent to one or more PEEs 3521 for further processing, and transmitted as transmitted data 3541. Similarly, programmable controller can send data through transport layer interconnect 3527 to be processed by one or more TEEs 3513, sent to one or more LEEs 3517 for further processing, sent to one or more PEEs 3521 for further processing, and transmitted as transmitted data 3541.

Some processing paths utilize data processing elements in ingress channel 3501. For example, a data path 3543 can include PHY interconnect 3531, one or more PIEs 3519, the part of ingress channel 3501 between PHY 3509 and link layer 3507, one or more LIEs 3515, and link layer interconnect 3529. A data path 3545 can include PHY interconnect 3531, one or more PIEs 3519, the part of ingress channel 3501 between PHY 3509 and link layer 3507, one or more LIEs 3515, the part of the ingress channel between link layer 3507 and transport layer 3505, one or more TIEs 3511, and transport layer interconnect 3527. A data path 3547 can include data layer interconnect 3529, one or more LIEs 3515, the part of the ingress channel between link layer 3507 and transport layer 3505, one or more TIEs 3511, and transport layer interconnect 3527.

In addition, programmable controller 3523 can intercept received data 3549 at various points of processing, e.g., after processing in PIEs 3519, LIEs 3515, or TIEs 3511. In various embodiments, received data 3549 can be sent from another transceiver apparatus that includes a programmable distributed data processor. In this case, received data 3549 can include data processed by distributed data processing according to the present disclosure, and interception by programmable controller 3523 can be a part of the distributed processing, as described in more detail in one example of FIG. 36.

Programmable controller 3523 can send control signals to the various elements in transport layer 3505, link layer 3507, and PHY 3509. In some cases, for example, control signals can be sent to control the elements to process the data as discussed above. In other cases, the data processing is performed by the elements without specific control signals from programmable controller 3523. In other words, programmable controller 3523 can simply inject the data and the elements process it as part of normal operation of ingress channel 3501 and/or egress channel 3503. In various embodiments, the control signals can be sent via the same paths as the data, such as interconnects 3527, 3529, and 3531. In various embodiments, control signals can be sent via separate, dedicated control paths (not shown). Control signals from programmable controller 3523 can also be used to control the operation of various elements in the layers, such as, for example, turning transmitters on/off, resetting elements, updating parameters of elements, etc. These controls may be based, for example, on data processed by the elements. For example, programmable controller 3523 may send a test packet to be processed and, based on the results of the processing, may send a control signal to adjust a parameter to improve transmission.

Figure 36:
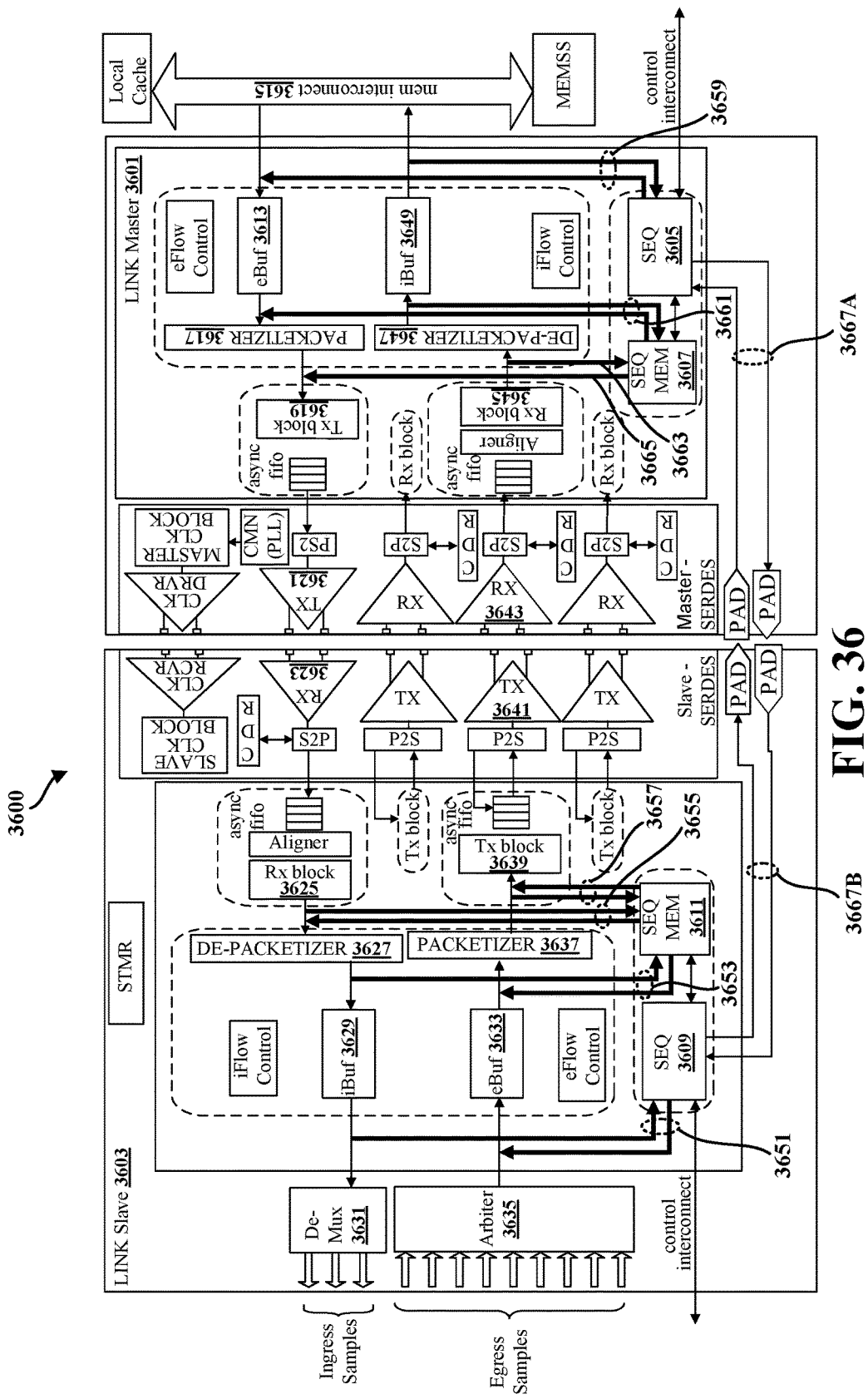
FIG. 36 is an example high-speed serial link with programmable distributed data processing functionality.

FIG. 36 is an example high-speed serial link apparatus 3600 with programmable distributed data processing functionality in accordance with various embodiments. Link apparatus 3600 can include a link master 3601 and a link slave 3603. Link master can include a sequencer 3605 and a sequencer memory 3607, which operate as a programmable controller, such as programmable controller 3523 of FIG. 35. Likewise, link slave can include a sequencer 3609 and a sequencer memory 3611, which operate as a programmable controller, such as programmable controller 3523 of FIG. 35.

In various embodiments, link slave 3603 can be an RFIC, and link master 3601 can be a BBIC. Link apparatus 3600 can include a data uplink channel that includes an egress channel of link master 3601, including LEEs, such as an egress buffer (eBuf) 3613 that can receive data from a memory interconnect 3615, and a packetizer 3617, and TEEs, such as a transmitter block 3619 (which can include an asynchronous first-in-first-out (fifo) buffer), and a transmitter 3621 (which can include a parallel-to-serial (P2S) converter). The data uplink channel can also include an ingress channel of link slave 3603, including TIEs, such as a receiver 3623 (which can include a serial-to-parallel (S2P) converter), and a receiver block 3625 (which can include an asynchronous fifo and an aligner), and LIEs, such as a de-packetizer 3627, and an ingress buffer (iBuf) 3629, which can send data to a de-multiplexer (de-mux) 3631.

Link apparatus 3600 can include a data downlink channel that includes an egress channel of link slave 3603, including LEEs, such as an eBuf 3633 that can receive data from an arbiter 3635, and a packetizer 3637, and TEEs, such as a transmitter block 3639 (which can include an asynchronous fifo buffer), and a transmitter 3641 (which can include a P2S converter). The data downlink channel can also include an ingress channel of link master 3601, including TIEs, such as a receiver 3643 (which can include a S2P converter), and a receiver block 3645 (which can include an asynchronous fifo and an aligner), and LIEs, such as a de-packetizer 3647, and an iBuf 3649, which can send data to memory interconnect 3615.

A link layer interconnect 3651 can connect sequencer 3609 of link slave 3603 to signal lines into and out of, respectively, eBuf 3633 and iBuf 3629. A link layer interconnect 3653 can connect sequencer memory 3611 to a signal line from de-packetizer 3627 to iBuf 3629 and to a signal line from eBuf 3633 to packetizer 3637. An interconnect 3655 can connect sequencer memory 3611 to a signal line from receiver block 3625 to de-packetizer 3627. It should be noted that interconnect 3655 serves both as a data layer interconnect and a PHY interconnect. Specifically, interconnect 3655 allows sequencer memory 3611 to send data to de-packetizer 3627 (a link layer data processing element) and to receive data from receiver block 3625 (a PHY data processing element). In this regard, interconnect 3655 is a dual-layer interconnect. Likewise, an interconnect 3657 can allow sequencer memory 3611 to send data to transmitter block 3639 and to receive data from packetizer 3637. Thus, interconnect 3657 is also a dual-layer interconnect.

A link layer interconnect 3659 can connect sequencer 3605 of link master 3601 to signal lines into and out of, respectively, eBuf 3613 and iBuf 3649. A link layer interconnect 3661 can connect sequencer memory 3607 to a signal line from de-packetizer 3647 to iBuf 3649 and to a signal line from eBuf 3613 to packetizer 3617. An interconnect 3663 can connect sequencer memory 3607 to a signal line from receiver block 3645 to de-packetizer 3647. An interconnect 3665 can connect sequencer memory 3607 to a signal line from packetizer 3617 to transmitter block 3619.

Sequencer 3605 of link master 3601 and sequencer 3609 of link slave 3603 can communicate via a sideband, which includes sideband lines 3667A on the link master's side and sideband lines 3667B on the link slave's side.

While FIGS. 33-36 illustrate various embodiments of the physical structures, e.g., programmable controller, interconnects, layer elements, etc., that can be included in programmable distributed data processors, various examples of operations and functionality that can be performed by programmable distributed data processors will now be described with reference to FIGS. 37-41.

Figure 37:
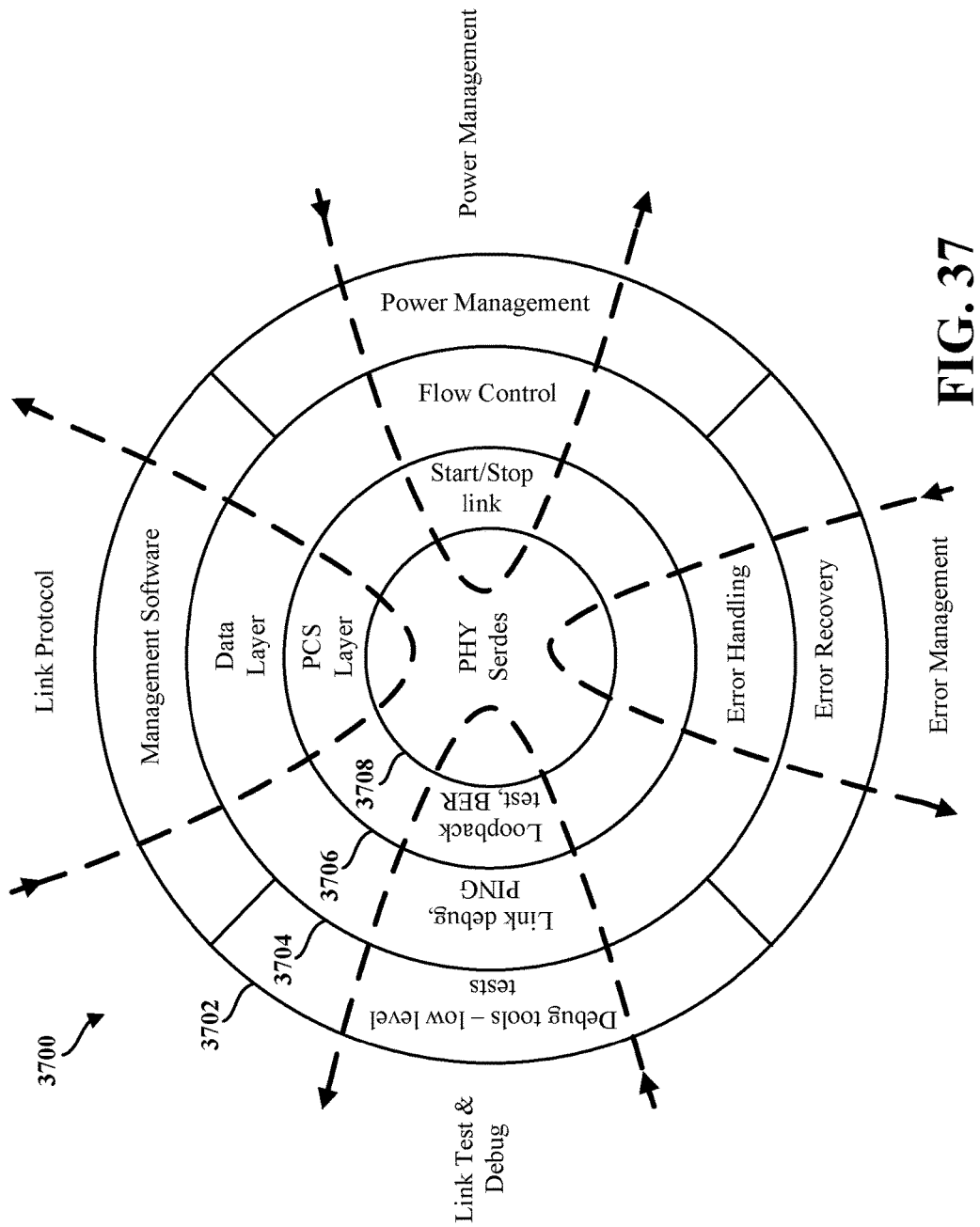
FIG. 37 is a diagram illustrating an example representation of a link kernel.

FIG. 37 is a diagram illustrating an example representation of a link kernel of computer instructions that can be executed by a programmable distributed data processor in accordance with various embodiments. The data processing paths of a reprogrammable distributed data processor utilized by the following examples will be readily understood by one skilled in the art in light of the foregoing description of the physical structures of such a system, therefore, a detailed description of the specific data processing paths will not be provided. In various embodiments, the programmable controller can create data processing paths from transport layer to transport layer, which can be used for flow control, error messaging, diagnostics. In various embodiments, data processing paths from SEQ MEM to link layer or PHY layer can be used for equalization by injecting patterns, and can be used for training through injecting patterns. In various embodiments, intercepting at data signals at a receiver PHY or link layer (after de-packetizer) can be used for equalization and/or training. In various embodiments, error patterns can be injected and error counts checked at another location along data processing paths. In various embodiments, a raw bitstream can be captured in SEQ MEM for logical analyzer diagnostic, which can be used to diagnose complex faults, such as system faults.

Diagram 3700 includes an outer ring 3702 that represents the software stack. At the software stack level the inter-device link may perform various sanity tests such as loopback tests. The software stack includes debugging tools for low-level tests and management software. At the software stack level power management, error recovery and debugging tool sets may also reside.

The diagram also includes a data layer 3704 for flow control, error handling, and inter-device link debugging, including pinging. The inter-device link protocol data layer may impact power management using flow control, may implement error handling, and may implement testing using the ping feature.

In the PCS layer 3706, power management may be impacted by starting or stopping of links. Additionally, loopback test and the error handling may be implemented at the PCS layer. The PCS layer 3706 may include automatic testing using digital loopback, bit error rate testing, loopback testing of analog and digital circuitry, pattern injection, physical layer start and stop, boot and, power modes.

The physical layer SERDES 3708 may implement SER-DES test and characterization jitter tolerance transmit and receive measurements, built in self test, error injection and other testing.

For example, some errors can include link lock errors, which can be identified when one party repeatedly receives NACKs for messages sent, or repeatedly transmits without receiving an ACK. For example, in a case that master sends to slave, but slave repeatedly sends NACKs in response, it is likely that master Tx to slave Rx lane has lost lock. To recover from this error condition, master can indicate transition to link power down/hibernate using link_en, and then can indicate transition to link power up in order to re-acquire lock. Another possible error condition is when slave sends to master, master sends ACKS in response, but master sees that slave is repeating. In this case, it is likely that master Tx to slave Rx lane has lost lock. To recover from this error condition, master can indicate transition to link power down/hibernate using link_en, and then can indicate transition to link power up in order to re-acquire lock. Another possible error condition is when slave sends to master, master doesn't receive, so slave repeats, and slave keeps trying indefinitely. In this error condition, it is likely that slave Tx to master Rx lane has lost lock. One method of recovery can be to signal to master out of band. If there is an out of band mechanism available, slave can signal to master that the link should be reset by transitioning to link power down and back again. However, if slave does not have a mechanism to signal to the master out of band, the slave should keep trying.

Some errors can include state transition errors. For example, an error can occur during device power up, e.g., transition from QL2 to QL1. In this case, if master waits for alignment to indicate transition is complete, and master doesn't receive alignment in allotted time, slave has not powered up correctly. Master can inform top level controller (for power cycling). An error can occur during the first ping, e.g., QL1. If master does not receive ping from slave, then link power down/up using link_en should be tried. If that fails, master should inform top level controller (for power cycling). An error can occur during a speed change from QL1 to QL0, or vice versa. If master does not receive ping from slave, then link power down/up using link_en should be tried. However, it may not be clear which mode to 'hibernate' to, e.g., high speed or low speed. In this case, low speed should be the default at this time. If that fails, master should inform top level controller (for power cycling). An error can occur during link power down, e.g., QL0 to QL0p, or QL1 to QL1p. For example, master requests power-down via message and does not receive an ACK, and master retries. It is mandatory for slave to comply. If slave is not acknowledging transition then this is treated as a fatal error and top controller should be informed. An error can occur during link power up, e.g., QL0p to QL0, or QL1p to QL1. For example, master requests link power-up via link_en, but cannot complete sequence through to ping/ACK. In this case, master retries, if possible. It is mandatory for slave to comply. If slave is not acknowledging transition then this is treated as a fatal error and top controller should be informed. An error can occur when slave requests link power-up via link_req, but cannot complete sequence through to ping/ACK. In this case, slave retries, if possible. Other than that, there is not much that slave can do about it.

Some errors can occur during test modes. For example, during a link test mode, e.g., QL01 or QL1l, when slave is looping back, master may see a large error count. In this case, master can move link to link-power-down and back again. In some cases, when master is looping back, slave may see a large error count. In this case, if the link is timed, slave waits until the time is up and then reports errors to master. If the link is not timed, and in-band signaling is still monitored by master, slave indicates errors to master.

In various embodiments, testing and debugging can be performed by a programmable distributed data processing system. Some examples of testing and debugging are described below. In an external loopback mode, the sequencer can be programmed, for example, to one of three loopback options. A clock can be provided for RFIC because RFIC SERDES does not generate its own clock. This mode can be used to measure jitter tolerance including Physical Layer and PCS Layer. In the link loopback mode, the SERDES receive data (RX) can be routed back to the SERDES transmit data (TX). The loopback data path is routed from the output of the RX async fifo to the input of TX asynch fifo. This can be enabled on either BBIC or RFIC. Only one of the three RX/TX lanes can be enabled; hence lane number parameters are used to configure the lane selection. This mode is used by the tester or scope to verify the data are traveling cleanly across SERDES RX/TX and QL async fifo. There are no exit transition to other mode/state. Must power off/reset in order to switch to other modes.

The clock has to be provided by the external equipment, tester, or lab equipment because the RFIC SERDES does not generate its clock. This test can be used in LS or HS mode, depending on the external clock. An internal RFIC clock, wmss_clk, can be setup according to a clock setup procedure.

Thus, programmable distributed data processors can be programmed to perform, for example, boot up sequence management, power management, testing, initiation of the physical layer link, bit alignment of a signal received by a receiver, bit alignment of a signal transmitted by a transmitter, training, loop-back modes, debugging modes, error handling, ☐phase-locked-loop (PLL) initialization, and reset handling.

Some further examples of boot up sequence management performed by a programmable distributed data processor can include insertion of equalization and synchronization bursts for the SERDES, side band communication, e.g., one side band signal in each direction to provide a mechanism for reset/wake and error recovery (e.g., link_en and link_req can be used for wakeup signaling), training sequences for fast wakeup, hibernate wake-up, initial boot and recovery, involving equalization, CDR and alignment (distributed data processing can handle all training sequences and timing), low speed (LS) mode and high speed (HS) mode handling (the PHY can handles the packetization and de-packetization of SERDES data from/into blocks of data that can be further processed by the physical layer and upper layers, programmable Tx amplitudes (Tx parameters can be reprogrammed by distributed data processing based on field conditions), multiple TX and Rx termination settings can be used, multiple power states can be programmed for boot up, signal detection during boot up, CDR on and off times can be set, multiple calibrated PLL settings for fast frequency switching can be used (two sideband signals can be used to control the operation states of the serial interconnect, e.g. link_en and link_req).

Some further examples of power management performed by a programmable distributed data processor can include adjusting transmission credit, and sending power management messages. For example, ACK messages can be used for credit-based flow control communication. Flow control occurs independently between MSG and DATA channels of the frame package. ACK messages serve two purposes: flow control and error management. A programmable controller get notified when an ACK message is received and can decide to go into various power management states or stay awake due to various usages or power management schemes, and can send instructions to the various elements to adjust power states.

Some further examples of testing performed by a programmable distributed data processor can include pinging operations to separate bit error rate (BER) profiling at the PHY and DLL layer. While bit detection and monitoring can be done by other dedicated hardware, the error handling/testing report mechanisms can be handled by a distributed data processor. Test patterns can be generated and programmed by a distributed data processor. A control register bus can be managed by a distributed data processor.

Some further examples of initiation of a PHY link performed by a programmable distributed data processor can include 128b/130b encoding by providing sync symbol insertion differentiating between PHY burst (physical layer communication) or DLL burst, switching between PHY and DLL burst modes can be controlled/managed by a distributed data processor, equalization (the start of the EQ sequence can handled by a distributed data processor), a PHY burst mode, and a packet burst mode.

Some further examples of training performed by a programmable distributed data processor can include injecting custom packets to train links, and adding physical layer framing tokens to the DLL packet stream.

Some further examples of error handling performed by a programmable distributed data processor can include enforcing PHY layer framing rules at the receiver (frame rules can be detected by PHY layer hardware and can be reported back to a programmable controller for decision making, and, e.g., the controller can ignore, react, or wait until the appreciate time to reset the link), framing and alignment of received bit stream, channel identification (ID), which can be protected by cyclic redundancy check (CRC). In some examples, a bulk acknowledge scheme, in which an ACK MSG is sent once the credit for the traffic class has been exhausted, a programmable controller can change the frequency of ACK message sent by the downstream/receiver.

FIGS. 38-41 illustrate example tests that can be performed by a programmable distributed data processor in accordance with various embodiments.

Figure 38:
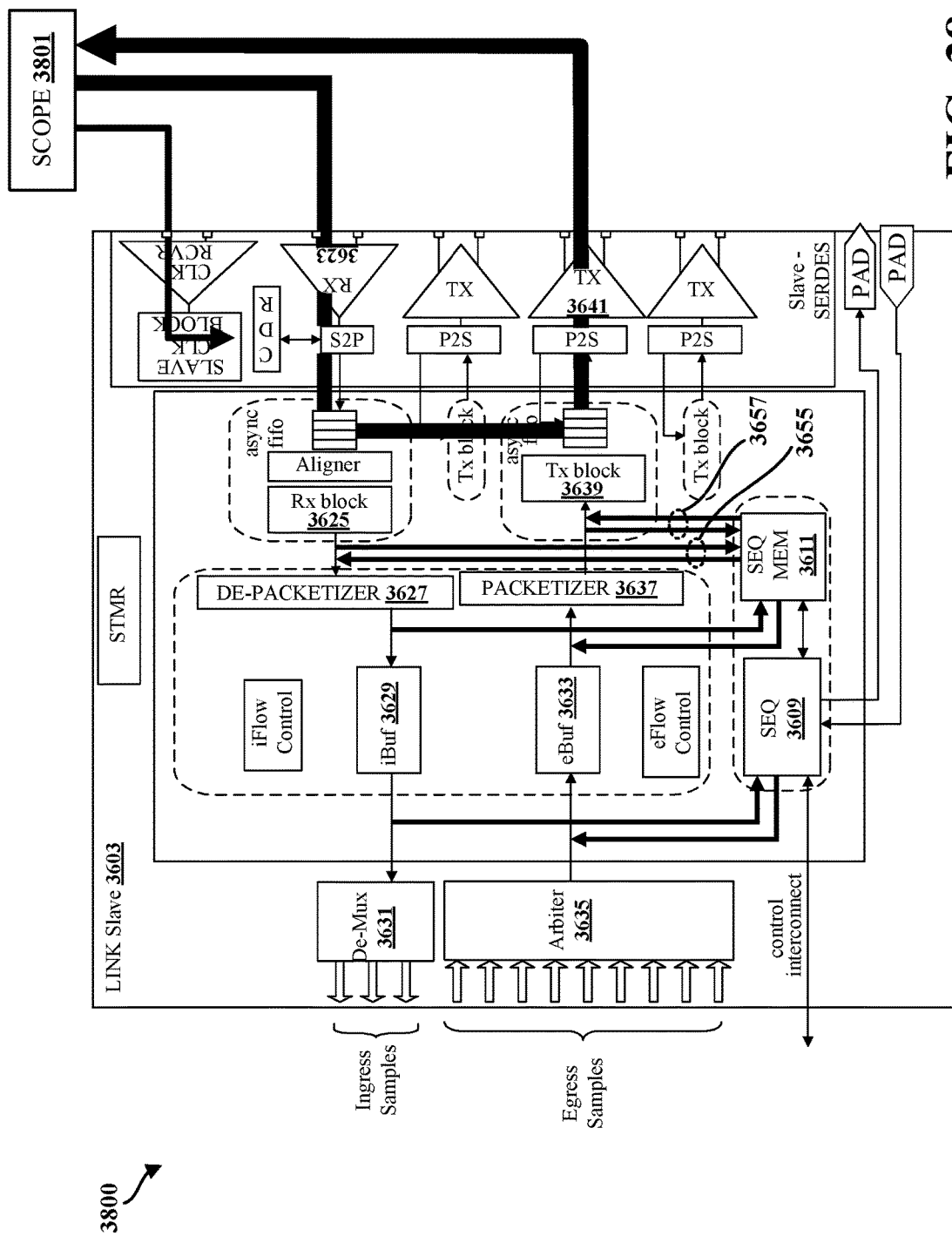
FIG. 38 illustrates an example slave external loopback testing mode.

FIG. 38 illustrates an example slave external loopback testing mode in which a scope 3801 provides a clock signal to link slave 3803, and provides a testing signal to receiver 3823. Sequencer 3809 sends control signals via interconnect 3855 to control the asynchronous fifo of receiver block 3825 to provide the data received from receiver 3823 to the asynchronous fifo of transmitter block 3839, and sends control signals via interconnect 3657 to transmitter 3641 to control the transmitter to receive the data. Transmitter 3641 retrieves the data and transmits the data to scope 3801 to be analyzed. In this way, for example, sequencer 3609 can control a loopback testing that tests receiver 3623 and transmitter 3641.

Figure 39:
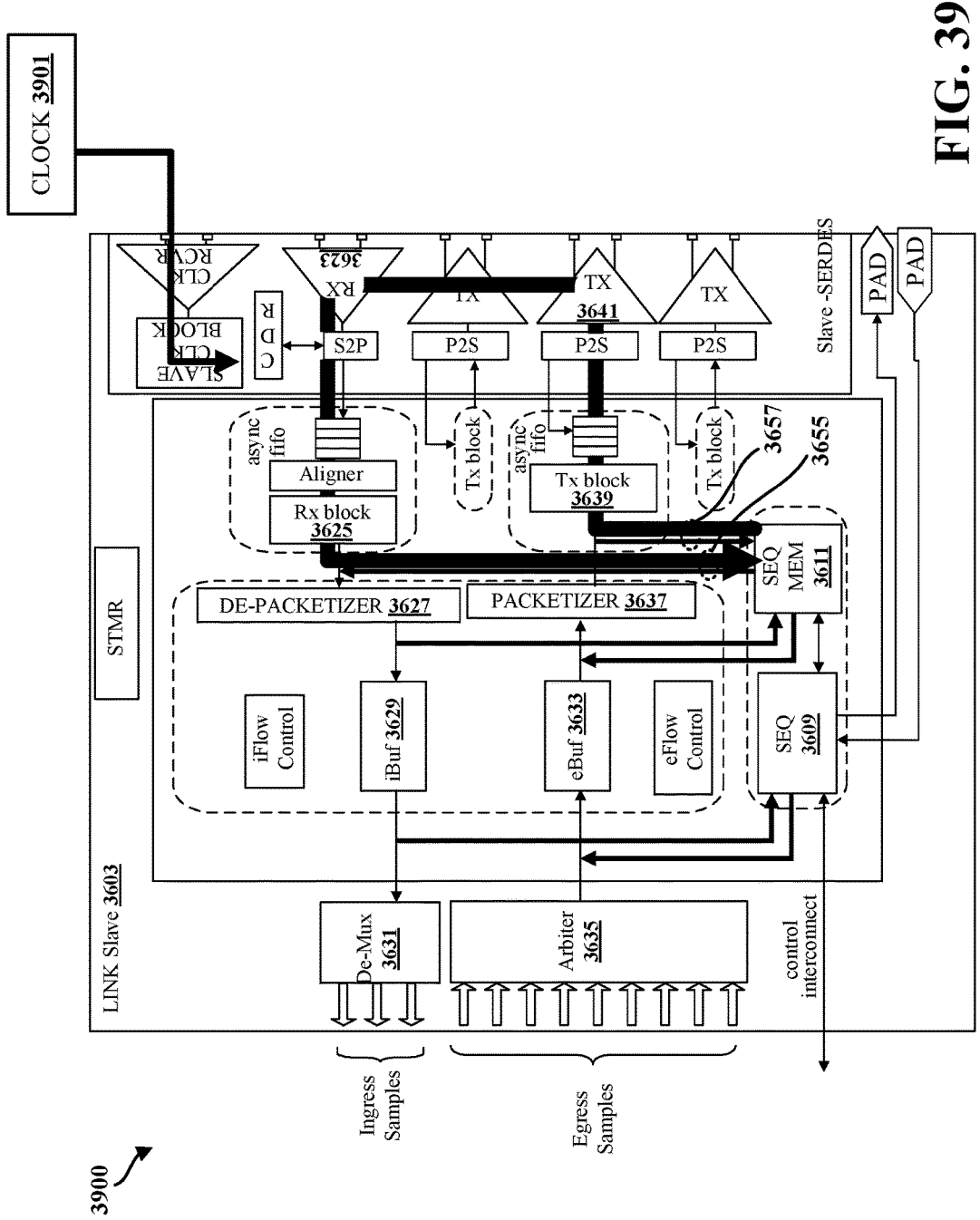
FIG. 39 illustrates an example slave internal loopback testing mode.

FIG. 39 illustrates an example slave internal loopback testing mode in which a clock 3901 can provide a clock signal to link slave 3603, and sequencer 3609 can control transmitter block 3639 to read test data from sequencer memory 3611 via interconnect 3657. Transmitter block 3639 can then send the test data to transmitter 3641. Sequencer 3609 can control transmitter 3639 to send the test data to receiver 3623, can control the receiver to send the test data to receiver block 3625, and can control the receiver block to send the test data to sequencer memory 3611 via interconnect 3655. In this way, for example, distributed data processing can be used to test transmitter block 3639, transmitter 3641, receiver 3623, and receiver block 3625. In this example, only one Tx lane is selected but it is possible to select any of the Tx lanes to perform the test. For each loopback it is possible to select the level of the loop, this selection can be controlled through SERDES CSR. The loop is closed outside the IC at the board level. The loop is closed internally to the IC at the SERDES buffer level (using SERDES CSRs). This test can include an internal Bit-Error-Rate BER test, in which a test pattern is self-generated and verified internally while SERDES path is being configured in loopback mode. An LFSR data pattern can be generated and sent out on TX Lane to SERDES TX block via async fifo. A SERDES loopback mode can be enabled. TX data on one of the lanes can be looped back to an RX block. At least two options can be used. In a first option, sequencer can send a fix idle token, and the scrambler/de-scrambler (LSFR) can be enabled. In a second option, the sequencer can send a pre-loaded pattern (PRBS x), and the scrambler/de-scrambler can be disabled.

Figure 40:
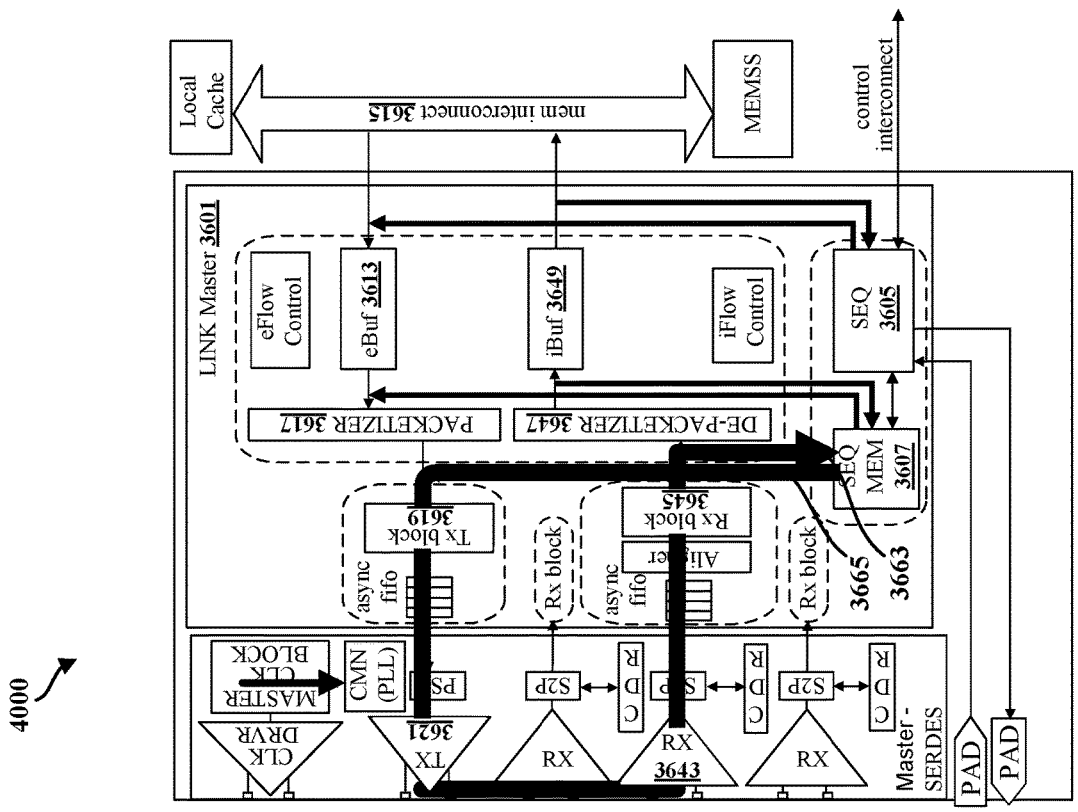
FIG. 40 illustrates an example master internal loopback testing mode.

FIG. 40 illustrates an example master internal loopback testing mode in which sequencer 3605 can control transmitter block 3619 to read test data from sequencer memory 3607 via interconnect 3665. Transmitter block 3619 can send the test data to transmitter 3621, and sequencer 3605 can control the transmitter to send the test data to receiver 3643, can control the receiver to send the test data to receiver block 3645, and can control the receiver block to send the test data to sequencer memory 3607 via interconnect 3663. In this way, for example, distributed data processing can be used to test transmitter block 3619, transmitter 3621, receiver 3643, and receiver block 3645.

Figure 41:
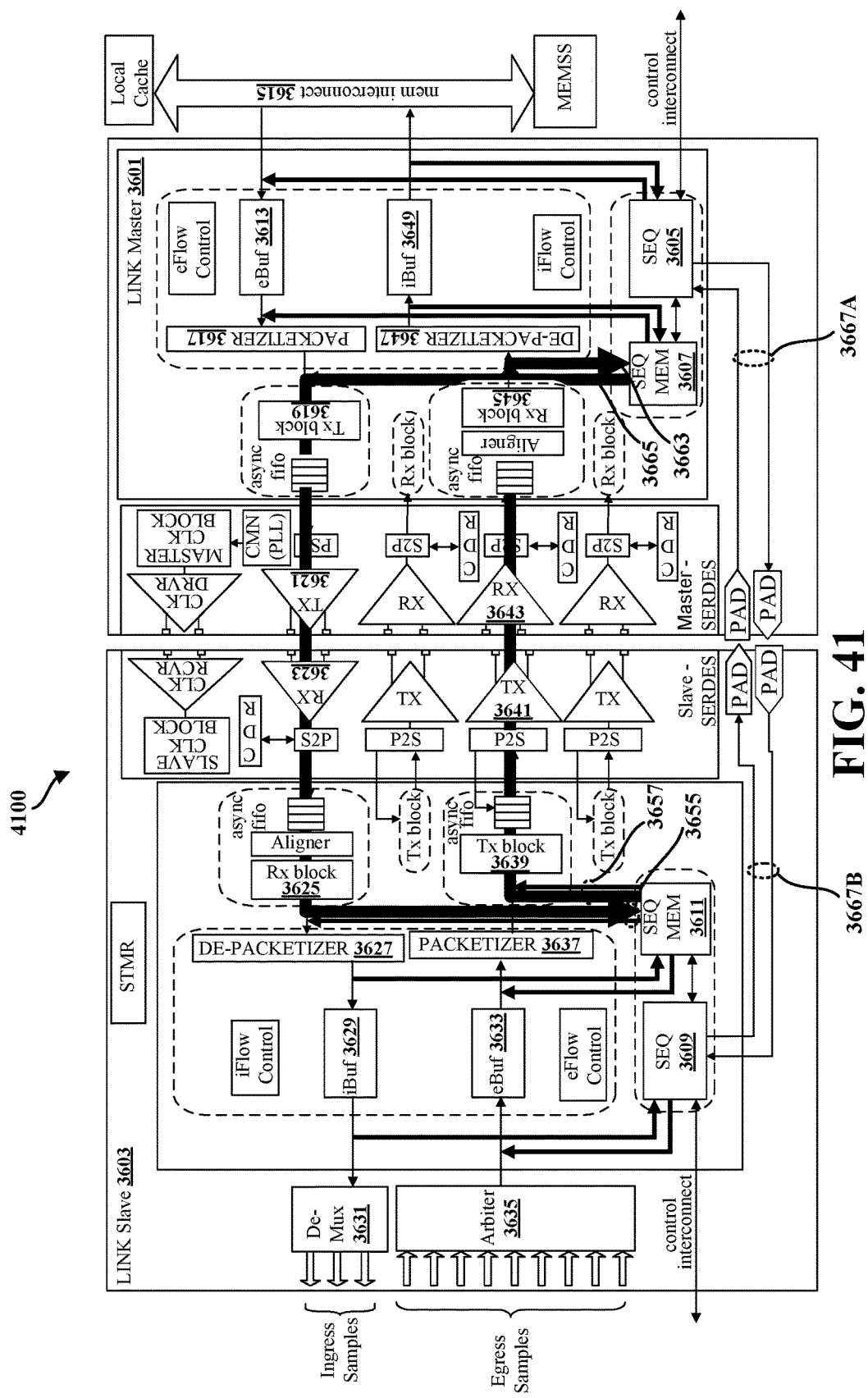
FIG. 41 illustrates an example link-to-link loopback testing mode.

FIG. 41 illustrates an example link-to-link loopback testing mode in which sequencer 3605 of link master 3601 can set a test data path including interconnect 3665, transmitter block 3619, transmitter 3621, receiver 3643, receiver block 3645, and interconnect 3663. Sequencer 3605 can send control signals via sideband 3667A and 3667B to instruct sequencer 3609 of link slave 3603 to control various elements of the link slave in order to complete the test data path. In response to the instructions, sequencer 3609 can set the remainder of the test data path to include receiver 3623, receiver block 3625, interconnect 3655, interconnect 3657, transmitter block 3639, and transmitter 3641. In this way, for example, sequencer 3605 of link master 3601 can cause test data to be read from sequencer memory 3607, sent along the illustrated data processing path to sequencer memory 3611 of link slave 3603, read from the sequencer memory of the link slave, and sent back to sequencer memory 3607 of the link master. In this test, a remote/end-to-end Bit-Error-Rate (BER) mode can perform a comprehensive bit error rate analysis end-to-end. The test pattern can be sent across all TX DLs, and the BER analysis can be collected independently on either UL or DL, or both. The test pattern can be configured in both a boot mode and a high speed mode. A LFSR data pattern can be generated and sent out across all major components: TX async fifo, SERDES TX block, pad, board wire, SERDES RX block, RX async fifo and SEQ MEM, for example.

Figure 42:
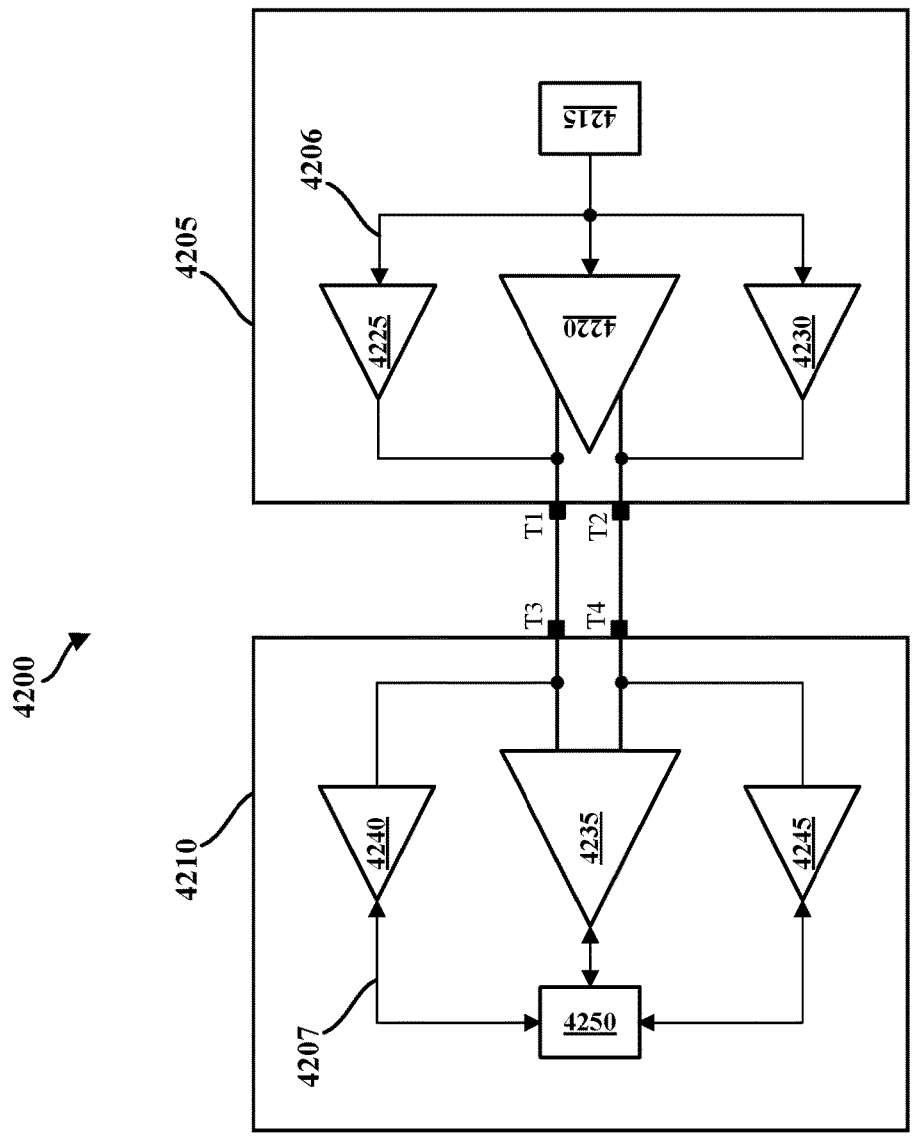
FIG. 42 illustrates an example dual-mode serial interface according to various embodiments.

FIG. 42 shows a dual-mode system 4200 including a master integrated circuit 4205 and a slave integrated circuit 4210. A controller 4215 controls whether a transmitting dual-mode interface 4206 in master integrated circuit 4205 operates in a high-speed mode or a low-speed mode of operation. In the high-speed mode of operation, a SerDes transmitter 4220 serializes an input data stream into a differential serial output data stream transmitted over a pair of terminals T1 and T2. Example data rates for the high-speed mode of operation may vary from approximately 5 Gbps to 10 Gbps. In the low-speed mode of operation a first single-ended driver 4225 drives a first single-ended data signal over terminal T1. Similarly, a second single-ended driver 4230 drives a second single-ended data signal over terminal T2 in the low-speed mode of operation. Example data rates for the low-speed mode of operation may vary from 100 Mbps to 400 Mbps. The data rates for the high-speed mode of operation will thus be approximately an order of magnitude greater than the data rates for the low-speed mode of operation.

A receiving dual-mode interface 4207 in slave integrated circuit 4210 is analogous to transmitting dual-mode interface 4206. In that regard, a controller 4250 controls whether receiving dual-mode interface 4207 operates in the high-speed or low-speed mode of operation. In the high-speed mode of operation, a SerDes receiver 4235 deserializes the differential data stream from master integrated circuit 4205 as received over a pair of terminals T3 and T4. Conversely, a first singled-ended receiver 4240 receives the first single-ended data signal from master integrated circuit 4205 as received over terminal T3 in the low-speed mode of operation. Similarly, an second single-ended receiver 4245 receives the second single-ended data signal over terminal T4 in the low-speed mode of operation.

The re-configuration of transmitting dual-mode interface 4206 and receiving dual-mode interface 4207 for either the high-speed mode of operation or low-speed mode of operation is quite advantageous with regard to limiting pin count since the same pins or terminals used for the high-speed mode of operation can be repurposed to function in the low-speed mode of operation. For example, referring to FIG. 3, clock driver 352 and clock receiver 350 could be implemented, respectively, in a transmitting dual-mode interface, such as interface 4206, and a receiving dual-mode interface, such as interface 4207 along with a corresponding serial differential transmitter and receiver of FIG. 3. In this way, for example, the pin count may be reduced even further. In contrast, the use of conventional low-speed I/O interfaces such as general purpose input output (GPIO) would require a dedicated pin for each low-speed signal. Moreover, board space is also conserved since the traces for the high-speed signaling may be repurposed to serve as traces for low-speed signaling.

Thus, FIG. 42 discloses a dual-mode transmitter including a first terminal, a second terminal, a SerDes transmitter configured to drive a serial differential data stream over the first terminal and the second terminal in a high-speed mode of operation, a first single-ended driver configured to drive a first single-ended data signal over the first terminal in a low-speed mode of operation, a second single-ended driver configured to drive a second single-ended data signal over the second terminal in the low-speed mode of operation, and a controller configured to control whether the dual-mode transmitter operates in the high-speed mode of operation or in the low-speed mode of operation. FIG. 42 also discloses a dual-mode receiver including a first terminal, a second terminal, a SerDes transmitter configured to deserialize a serial differential data stream received over the first terminal and the second terminal in a high-speed mode of operation, a first single-ended receiver configured to receive a first single-ended data signal over the first terminal in a low-speed mode of operation, a second single-ended receiver configured to receive a second single-ended data signal over the second terminal in the low-speed mode of operation, and a controller configured to control whether the dual-mode receiver operates in the high-speed mode of operation or in the low-speed mode of operation.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of a master device for transmission of data over a serial link using a unidirectional clock signal, the method comprising:
generating the unidirectional clock signal based on a first clock of the master device;
sending the unidirectional clock signal from a serializer-deserializer (SERDES) of the master device to a SERDES of a slave device that is connected to the serial link, wherein the slave device is configured to generate an intermediate clock signal based on the unidirectional clock signal;

transmitting data from the SERDES of the master device to the SERDES of the slave device over the serial link based on the first clock; and receiving data from the SERDES of the slave device over the serial link based on the intermediate clock signal.

2. The method of claim 1, wherein the unidirectional clock is generated to have a same rate as the first clock.

3. The method of claim 1, wherein the unidirectional clock signal is generated such that a rate of the unidirectional clock signal is a fraction of a rate of the first clock.

4. The method of claim 1, wherein the unidirectional clock signal is sent over the serial link to the slave device.

5. The method of claim 1, wherein the unidirectional clock signal is sent over a sideband to the slave device.

6. A method of a slave device for transmission of data over a serial link using a unidirectional clock signal, the method comprising:

receiving the unidirectional clock signal from a serializer-deserializer (SERDES) of a master device at a SERDES of the slave device, wherein the unidirectional clock signal is based on a first clock of the master device;

generating an intermediate clock signal based on the unidirectional clock signal; and transmitting data from the SERDES of the slave device over the serial link to the SERDES of the master device based on the intermediate clock signal.

7. The method of claim 6, wherein a rate of the unidirectional clock is the same as a rate of the first clock.

8. The method of claim 6, wherein a rate of the unidirectional clock signal is a fraction of a rate of the first clock.

9. The method of claim 6, wherein the unidirectional clock signal is received over a second serial link from the master device.

10. The method of claim 6, wherein the unidirectional clock signal is received over a sideband from the master device.

11. An apparatus configured to transmit data over a serial link using a unidirectional clock signal, the apparatus comprising:

a master device including
a clock signal generator configured to generate the unidirectional clock signal based on a first clock;
a first transmitter configured to send the unidirectional clock signal from a serializer-deserializer (SERDES) of the master device to a SERDES of a slave device that is connected to the serial link, wherein the slave device is configured to generate an intermediate clock signal based on the unidirectional clock signal;
a second transmitter configured to send data from the SERDES of the master device to the SERDES of the slave device over the serial link based on the first clock; and
a receiver configured to receive data from the from the SERDES of the slave device over the serial link based on the intermediate clock signal.

12. The apparatus of claim 11, wherein the clock signal generator is configured to generate the unidirectional clock to have a same rate as the first clock.

13. The apparatus of claim 11, wherein the clock signal generator is configured to generate the unidirectional clock such that a rate of the unidirectional clock signal is a fraction of a rate of the first clock.

14. The apparatus of claim 11, wherein the first transmitter is configured to transmit the unidirectional clock signal over a second serial link to the slave device.

15. The apparatus of claim 11, wherein the first transmitter is configured to transmit the unidirectional clock signal over a sideband to the slave device.

16. An apparatus configured to transmit data over a serial link using a unidirectional clock signal, the apparatus comprising:

a slave device including
a receiver of a serializer-deserializer (SERDES) of the slave device, wherein the receiver is configured to receive the unidirectional clock signal from a SERDES of a master device, wherein the unidirectional clock signal is based on a first clock of the master device,
a clock signal generator configured to generate an intermediate clock signal based on the unidirectional clock signal; and
a transmitter configured to transmit data from the SERDES of the slave device over the serial link to the SERDES of the master device based on the intermediate clock signal.

17. The apparatus of claim 16, wherein a rate of the unidirectional clock is the same as a rate of the first clock.

18. The apparatus of claim 16, wherein a rate of the unidirectional clock signal is a fraction of a rate of the first clock.

19. The apparatus of claim 16, wherein the receiver is configured to receive the unidirectional clock signal over a second serial link from the master device.

20. The apparatus of claim 16, wherein the receiver is configured to receive the unidirectional clock signal over a sideband from the master device.

* * * * *